United States Patent
Nishino et al.

(10) Patent No.: US 12,233,903 B2
(45) Date of Patent: Feb. 25, 2025

(54) IN-VEHICLE DEVICE AND DRIVING ASSIST METHOD

(71) Applicant: DENSO CORPORATION, Kariya (JP)

(72) Inventors: Sakiko Nishino, Nisshin (JP); Osamu Shimomura, Nisshin (JP); Atsushi Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 17/658,795

(22) Filed: Apr. 11, 2022

(65) Prior Publication Data

US 2022/0234615 A1 Jul. 28, 2022

Related U.S. Application Data

(63) Continuation of application No. PCT/JP2020/038746, filed on Oct. 14, 2020.

(30) Foreign Application Priority Data

Oct. 14, 2019 (JP) .................. 2019-188281

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/16* (2013.01);
(Continued)

(58) Field of Classification Search
CPC .. B60W 60/0011; B60W 30/09; B60W 30/16; B60W 40/04; B60W 40/072;
(Continued)

(56) References Cited

U.S. PATENT DOCUMENTS

2004/0064240 A1 4/2004 Sugano
2006/0161331 A1 7/2006 Kumon et al.
(Continued)

FOREIGN PATENT DOCUMENTS

GB 2579026 A * 6/2020 ............ B60W 30/09
JP 2000-16117 A 1/2000
(Continued)

OTHER PUBLICATIONS

English Translation of the Written Opinion of the International Searching Authority for WO2021075454; Retrieved from https://patentscope.wipo.int/search/en/detail.jsf?docId=WO2021075454 (Year: 2022).*

(Continued)

*Primary Examiner* — Calvin Cheung
(74) *Attorney, Agent, or Firm* — Maschoff Brennan

(57) ABSTRACT

An in-vehicle device includes a travel planning portion configured to plan, as a travel plan, at least positioning of a vehicle during traveling according to a driving policy; and a verification portion that is configured to: evaluate the travel plan set by the travel planning portion based on driving rule determination information in conformity with a traffic rule; and determine whether to permit the travel plan based on an evaluation result. The travel planning portion is configured to plan positioning of the vehicle according to the driving policy that is set to reduce a frequency of occurrence of a blind area entry situation under which a different vehicle other than the vehicle causes a moving object other than the different vehicle to be positioned within a blind area of a detection range for a periphery monitoring sensor that is configured to monitor surroundings of the vehicle.

19 Claims, 33 Drawing Sheets

(51) Int. Cl.
| | |
|---|---|
| *B60W 30/16* | (2020.01) |
| *B60W 40/04* | (2006.01) |
| *B60W 40/072* | (2012.01) |
| *B60W 40/076* | (2012.01) |
| *G01S 17/08* | (2006.01) |
| *G01S 17/931* | (2020.01) |
| *G06V 20/58* | (2022.01) |

(52) U.S. Cl.
CPC .......... *B60W 40/04* (2013.01); *B60W 40/072* (2013.01); *B60W 40/076* (2013.01); *B60W 60/0015* (2020.02); *G01S 17/08* (2013.01); *G01S 17/931* (2020.01); *G06V 20/58* (2022.01); *B60W 2420/403* (2013.01); *B60W 2420/408* (2024.01); *B60W 2552/15* (2020.02); *B60W 2552/30* (2020.02); *B60W 2554/801* (2020.02); *B60W 2554/802* (2020.02); *B60W 2555/60* (2020.02)

(58) Field of Classification Search
CPC ........... B60W 40/076; B60W 60/0015; B60W 2420/403; B60W 2420/408; B60W 2552/15; B60W 2552/30; B60W 2554/801; B60W 2554/802; B60W 2555/60; B60W 60/0016; B60W 30/10; G01S 17/08; G01S 17/931; G01S 13/862; G01S 13/865; G01S 13/867; G01S 13/931; G01S 15/931; G01S 2013/9323; G01S 2013/9324; G01S 2013/9325; G01S 2013/93271; G01S 2013/93274; G06V 20/58; G08G 1/16
See application file for complete search history.

(56) References Cited

U.S. PATENT DOCUMENTS

| | | |
|---|---|---|
| 2007/0171121 A1 | 7/2007 | Munakata |
| 2017/0183007 A1 | 6/2017 | Oh et al. |
| 2018/0095466 A1* | 4/2018 | Allan .............. B60W 60/00276 |
| 2019/0202450 A1 | 7/2019 | Maeda et al. |
| 2019/0291727 A1 | 9/2019 | Shalev-Shwartz et al. |
| 2019/0295179 A1 | 9/2019 | Shalev-Shwartz et al. |
| 2019/0299983 A1 | 10/2019 | Shalev-Shwartz et al. |
| 2019/0329768 A1 | 10/2019 | Shalev-Shwartz et al. |
| 2019/0329769 A1 | 10/2019 | Shalev-Shwartz et al. |
| 2019/0329773 A1 | 10/2019 | Shalev-Shwartz et al. |
| 2019/0329782 A1 | 10/2019 | Shalev-Shwartz et al. |
| 2019/0329783 A1 | 10/2019 | Shalev-Shwartz et al. |
| 2019/0333381 A1 | 10/2019 | Shalev-Shwartz et al. |
| 2020/0218269 A1 | 7/2020 | Kanoh et al. |
| 2020/0401147 A1* | 12/2020 | Lim .................. B60W 60/0011 |
| 2021/0110483 A1 | 4/2021 | Shalev-Shwartz et al. |
| 2021/0110484 A1 | 4/2021 | Shalev-Shwartz et al. |
| 2021/0142421 A1 | 5/2021 | Shalev-Shwartz et al. |
| 2021/0166325 A1 | 6/2021 | Shalev-Shwartz et al. |
| 2021/0269021 A1 | 9/2021 | Shalev-Shwartz et al. |

FOREIGN PATENT DOCUMENTS

| | | |
|---|---|---|
| JP | 2003-288691 A | 10/2003 |
| JP | 2007-030655 A | 2/2007 |
| JP | 2014-67165 A | 4/2014 |
| JP | 2016-143137 A | 8/2016 |
| JP | 2018-94943 A | 6/2018 |
| JP | 2018-151208 A | 9/2018 |
| JP | 2019-156269 A | 9/2019 |

OTHER PUBLICATIONS

Marianne Matthews, How to Safely Share the Road with Big date published Feb. 15, 2019, https://www.automotive-fleet.com/325232/how-to-safely-share-the-road-with-big-rigs (Year: 2019).*

* cited by examiner

IN-VEHICLE DEVICE AND DRIVING ASSIST METHOD

CROSS REFERENCE TO RELATED APPLICATION

This application is a continuation application of International Patent Application No. PCT/JP2020/038746 filed on Oct. 14, 2020, which designated the U.S. and claims the benefit of priority from Japanese Patent Application No. 2019-188281 filed on Oct. 14, 2019. The entire disclosure of all of the above application is incorporated herein by reference.

TECHNICAL FIELD

The present disclosure relates to an in-vehicle device and a driving assist method.

BACKGROUND

For example, autonomous driving needs to maintain a minimum safe distance to obstacles such as different vehicles and pedestrians. The safety distance provides a basis to evaluate the safety that is calculated by a mathematical formula model known as an RSS (Responsibility Sensitive Safety) model. A vehicle is responsible for an accident if the vehicle does not apply braking by using a reasonable force when the safety distance is not satisfied. The description of this Patent Literature is incorporated by reference as an explanation of the technical elements in the present specification.

For example, there has been known technology that controls braking on a subject vehicle based on the inter-vehicular distance and the relative speed calculated from scan results of a radar apparatus between a subject vehicle and a frontward vehicle. The technology corrects setup values for the critical inter-vehicular distance according to vehicle models of frontward vehicles or the inertial mass estimated from the vehicle weight. The brake system of the subject vehicle is controlled to operate when a measurement for the inter-vehicular distance is smaller than the setup value for the critical inter-vehicular distance.

SUMMARY

A first in-vehicle device according to the present disclosure includes: a travel planning portion that is configured to plan, as a travel plan, at least positioning of a vehicle during traveling according to a driving policy; and a verification portion that is configured to: evaluate the travel plan set by the travel planning portion based on driving rule determination information in conformity with a traffic rule; and determine whether to permit the travel plan based on an evaluation result. The travel planning portion is configured to plan positioning of the vehicle according to the driving policy that is set to reduce a frequency of occurrence of a blind area entry situation under which a different vehicle other than the vehicle causes a moving object other than the different vehicle to be positioned within a blind area of a detection range for a periphery monitoring sensor that is configured to monitor surroundings of the vehicle.

DESCRIPTION OF EMBODIMENTS

Figure 1:
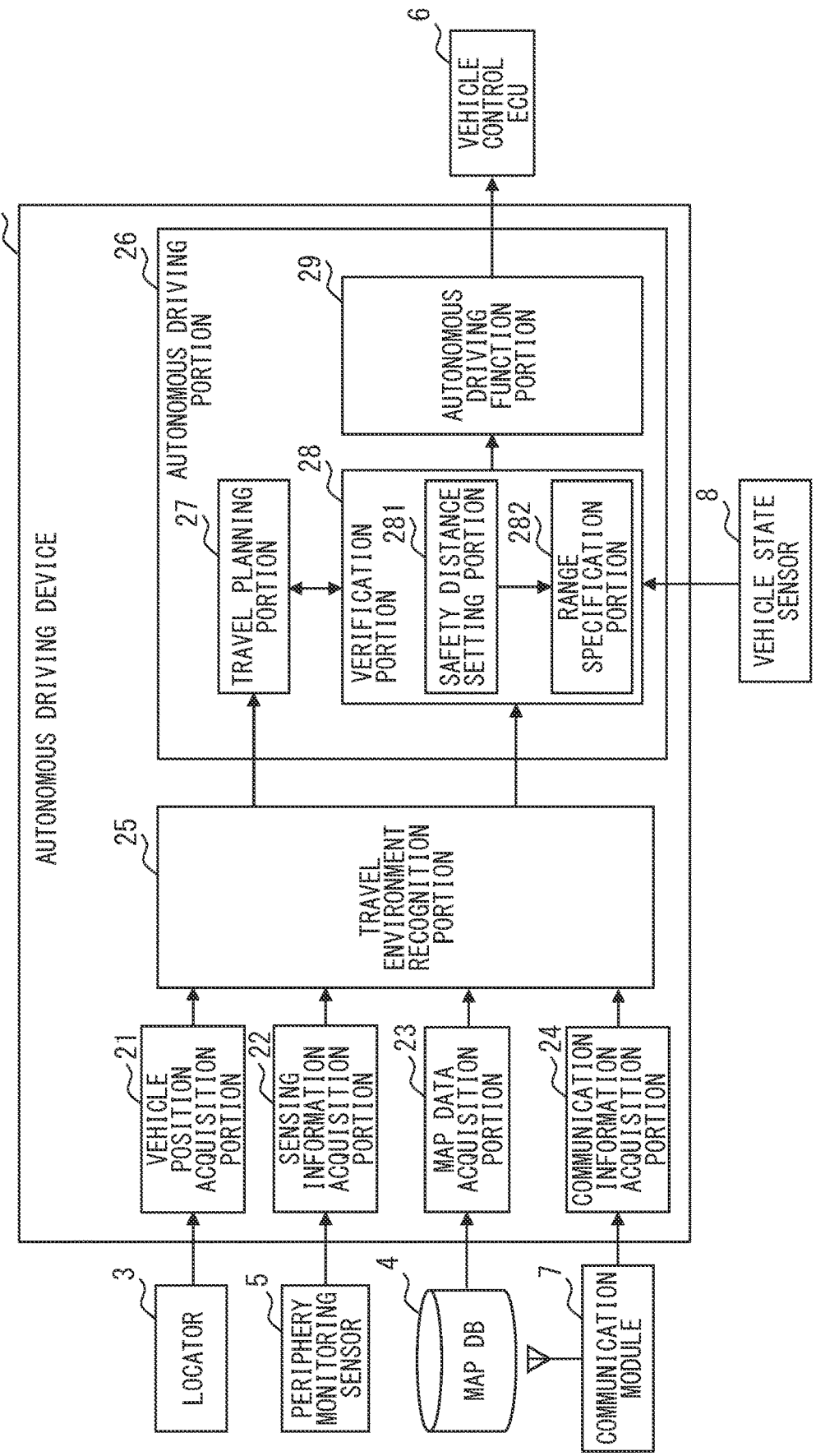
FIG. 1 is a diagram illustrating a schematic configuration of a vehicle system and an autonomous driving device.

To begin with, a relevant technology will be described first only for understanding the following embodiments.

According to the technology disclosed above, the subject vehicle can start passing close by a frontward obstacle if the safety distance to an oncoming vehicle is satisfied. However, the safety distance to the oncoming vehicle may not be satisfied while passing close by the frontward obstacle. In such a case, the subject vehicle may have to brake and stop while passing. If the subject vehicle stops while passing, the obstacle and the subject vehicle stop side by side in the width direction of the road, obstructing a traffic flow.

The other technology also disclosed above requires improvement to avoid an approach to anything other than frontward vehicles. The details are as follows.

The technology can maintain an inter-vehicular distance to avoid an approach to the frontward vehicle but does not assume that moving objects suddenly rush out of anterolateral sides. According to the technology, the frontward vehicle may significantly obstruct the scanning range of a radar apparatus and delay the detection of moving objects rushing out of anterolateral sides depending on the height and width of the frontward vehicle. In this case, it may be difficult to avoid an approach to the moving object even if braking is applied after the moving object is detected.

The technology does not assume turning of oncoming vehicles or parallel traveling vehicles. When an oncoming vehicle or parallel traveling vehicle makes a turn, the range for the oncoming vehicle or parallel traveling vehicle to pass through may significantly vary with the vehicle length of the oncoming vehicle or parallel traveling vehicle. It may be difficult to avoid an approach to the oncoming vehicle or the parallel traveling vehicle when the oncoming vehicle or the parallel traveling vehicle makes a turn.

In addition, the technology requires improvement to reduce the potential possibilities of the subject vehicle to deviate from traffic rules. The details are as follows.

A frontward vehicle may substantially obstruct the scanning range of the radar apparatus. Then, it is difficult to accurately recognize the position of a moving object located in the blind area of the scanning range caused by the frontward vehicle. In this case, it is difficult to evaluate the subject vehicle's travel plan suitable for avoiding an approach to moving objects located in the blind area.

It is a first objective of the present disclosure to provide an in-vehicle device and a driving assist method capable of reducing the potential possibilities of a subject vehicle to deviate from traffic rules.

It is a second objective of the present disclosure to provide an in-vehicle device and a driving assist method capable of easily avoiding an approach to moving objects.

It is a third objective of the present disclosure to provide an in-vehicle device and a driving assist method capable of passing close by obstacles ahead without interfering with the traffic flow even if a minimum safety distance from a subject vehicle is provided to avoid an approach between the subject vehicle and obstacles during autonomous driving.

The above-described objectives are achieved by a combination of the features described in the independent claims. The sub-claims provide further advantageous embodiments of the disclosure. Parenthesized reference numerals described in the claims indicate the correspondence with practical measures described in the embodiments described below as one aspect and are not intended to limit the technical scope of the present disclosure.

To achieve the above-described first objective, the first in-vehicle device according to the present disclosure includes: a travel planning portion that is configured to plan, as a travel plan, at least positioning of a vehicle during traveling according to a driving policy; and a verification portion that is configured to: evaluate the travel plan set by the travel planning portion based on driving rule determination information in conformity with a traffic rule; and determine whether to permit the travel plan based on an evaluation result. The travel planning portion is configured to plan positioning of the vehicle according to the driving policy that is set to reduce a frequency of occurrence of a blind area entry situation under which a different vehicle other than the vehicle causes a moving object other than the different vehicle to be positioned within a blind area of a detection range for a periphery monitoring sensor that is configured to monitor surroundings of the vehicle.

To achieve the above-described first objective, a first driving assist method according to the present disclosure includes: planning, as a travel plan, at least positioning of a subject vehicle during traveling according to a driving policy that is set to reduce a frequency of occurrence of a blind area entry situation under which a different vehicle other than the subject vehicle causes a moving object other than the different vehicle to be positioned within a blind area of a detection range for a periphery monitoring sensor that is configured to monitor surroundings of the subject vehicle; evaluating the travel plan based on driving rule determination information in conformity with a traffic rule; and determining whether to allow the travel plan based on an evaluation result.

The method schedules at least the subject vehicle positioning while traveling as a travel plan according to the driving policy that forces the blind area entry situation to occur less frequently. The blind area entry situation occurs when a different vehicle causes a moving object other than the different vehicle to be positioned in the blind area for the detection range of the periphery monitoring sensor. It is possible to provide the travel plan of the subject vehicle positioning while traveling so that the blind area entry situation occurs less frequently. The method evaluates such a travel plan based on the driving rule determination information configured corresponding to the traffic rules and determines whether to permit the travel plan. It is highly possible to more accurately recognize moving objects and evaluate travel plans based on the driving rule determination information. Consequently, it is possible to reduce the potential possibility for the subject vehicle to deviate from the traffic rules.

To achieve the above-described second objective, a second in-vehicle device according to the present disclosure includes: a safety distance setting portion that is configured to set a minimum safety distance between a vehicle and an obstacle to avoid an approach between the vehicle and the obstacle; a leading vehicle identification portion that is configured to identify a size of a leading vehicle in front of the vehicle; and a safety distance adjustment portion that is configured to adjust the safety distance in a longitudinal direction of the vehicle set by the safety distance setting portion according to the size of the leading vehicle identified by the leading vehicle identification portion so that an angular range within which the leading vehicle is expected to be encompassed is equal to or smaller than a predetermined range, the angular range being included in a detection range of a periphery monitoring sensor that is configured to detect an obstacle around the vehicle.

To achieve the above-described second objective, a second driving assist method according to the present disclosure includes: setting a minimum safety distance to an obstacle to avoid an approach between a vehicle and the obstacle; identifying a size of a leading vehicle in front of the vehicle; and adjusting the safety distance in a longitudinal direction of the vehicle according to the size of the identified leading vehicle so that an angular range within which the leading vehicle is expected be encompassed is equal to or smaller than a predetermined range, the angular range being included in a detection range of a periphery monitoring sensor that is configured to detect an obstacle around the vehicle.

The method adjusts the intended forward safety distance for the vehicle according to the leading vehicle size so that an angular range is smaller than or equal to a predetermined range. The angular range is included in a detection range for a periphery monitoring sensor to detect obstacles around the vehicle and is estimated to encompass the leading vehicle. The safety distance is the minimum distance provided between the vehicle and an obstacle to avoid an approach between the vehicle and the obstacle. It is possible to provide the distance to the leading vehicle so that at least the angular range is not smaller than or equal to the predetermined range. The angular range is included in a detection range for a periphery monitoring sensor to detect obstacles around the vehicle and is estimated to encompass the leading vehicle. When the angular range is maintained not to be smaller than or equal to the predetermined range, it is possible to inhibit an extent of the leading vehicle that hinders the detection range of the periphery monitoring sensor. Even if the leading vehicle is horizontally wide, the periphery monitoring sensor can easily detect moving objects rushing out of anterolateral sides. Consequently, it is possible to more easily avoid an approach to moving objects.

To achieve the above-described second objective, a third in-vehicle device according to the present disclosure includes: a safety distance setting portion that is configured to set a minimum safety distance to an obstacle to avoid an approach between a vehicle and the obstacle; a surrounding vehicle identification portion that is configured to identify a size of a surrounding vehicle around the vehicle; and a safety distance adjustment portion that is configured to adjust the safety distance in a longitudinal direction or a lateral direction of the vehicle that is set by the safety distance setting portion according to the size of the surrounding vehicle identified by the surrounding vehicle identification portion so that the vehicle does not enter a range expected to be occupied by the surrounding vehicle during turning.

To achieve the above-described second objective, a third driving assist method according to the present disclosure includes: setting a minimum safety distance to an obstacle to avoid an approach between a vehicle and the obstacle; identifying a size of a surrounding vehicle around the vehicle; and adjusting the safety distance in either a longitudinal direction or a lateral direction of the vehicle according to the size of the surrounding vehicle so that the vehicle does not enter a range that is expected to be occupied by the surrounding vehicle during turning.

The method adjusts the safety distance ahead of or to the side of a target vehicle so that the vehicle does not enter the range estimated to be occupied by a surrounding vehicle, when making a turn, according to the surrounding vehicle size. The safety distance is the minimum distance provided by the vehicle between the vehicle and an obstacle to avoid an approach between the vehicle and the obstacle. The safety distance can provide a distance to avoid contact with the turning surrounding vehicle. Even if a surrounding vehicle is long, it is possible to avoid contact with the surrounding vehicle when making a turn. Consequently, it is possible to more easily avoid an approach to moving objects.

To achieve the above-described third objective, a fourth in-vehicle device according to the present disclosure includes: a safety distance setting portion that is configured to set a minimum safety distance to an obstacle to avoid an approach between a vehicle capable of performing autonomous driving and the obstacle; an obstacle identification portion that is configured to identify the obstacle around the vehicle; a range specification portion that is configured to specify, when a front obstacle is identified, by the obstacle identification portion, as the obstacle to be passed, a required range within which an oncoming vehicle should not be located in order for the vehicle to complete passing the obstacle identified by the obstacle identification portion while maintaining the safety distance to the oncoming vehicle that is set by the safety distance setting portion; and an autonomous driving function portion that is configured to automatically perform passing by the front obstacle when the oncoming vehicle does not located within the required range specified by the range specification portion.

To achieve the above-described third objective, a fourth driving assist method according to the present disclosure includes: setting a minimum safety distance to an obstacle to avoid an approach between a vehicle capable of performing autonomous driving and the obstacle; identifying the obstacle around the vehicle; upon identifying a front obstacle as the obstacle to be passed, specifying a required range within which an oncoming vehicle should not be located in order for the vehicle to complete passing the specified front obstacle while maintaining the set safety distance to the oncoming vehicle; and automatically performing passing the front obstacle when the oncoming vehicle does not located within the specified required range.

The method automatically passes close by an identified frontward obstacle when no oncoming vehicle exists in the specified required range. The vehicle needs to complete passing close by a frontward obstacle while ensuring at least the specified safety distance between the vehicle and the oncoming vehicle. For this purpose, the required range is estimated to inhibit the existence of the oncoming vehicle. When no oncoming vehicle exists in the required range, it is supposed to complete passing close by the frontward obstacle while ensuring the safety distance to the oncoming vehicle. The safety distance is the minimum distance provided between the vehicle and the obstacle to prevent the vehicle from approaching the obstacle. The vehicle may be able to complete passing close by the frontward obstacle while ensuring the safety distance to the oncoming vehicle. In this case, no braking is needed while passing to maintain the safety distance. It is possible to avoid a situation where the vehicle stops while passing close by the frontward obstacle. Consequently, it is possible to pass close by frontward obstacles while hardly hindering the traffic flow even when the minimum safety distance from the subject vehicle is provided to avoid an approach between the subject vehicle and obstacles during autonomous driving.

The description below explains embodiments for carrying out the present disclosure by reference to the drawings. The same reference numerals may be given to parts having the same functions illustrated in the drawings used to describe the embodiments hitherto and the related description may be omitted for convenience sake. The parts given the same reference numerals can be made clear by reference to the description in the other embodiments. The embodiments described below apply to communities that legislate left-hand traffic. The right and the left in the embodiments can be reversed in communities that legislate right-hand traffic.

First Embodiment

<Outline Configuration of Vehicle System 1>

The description below explains the first embodiment of the present disclosure by reference to the drawings. A vehicle system 1 illustrated in FIG. 1 is used in a vehicle capable of autonomous driving. The vehicle is hereinafter referred to as an autonomous driving vehicle. As illustrated in FIG. 1, the vehicle system 1 includes an autonomous driving device 2, a locator 3, a map database (map DB) 4, a periphery monitoring sensor 5, a vehicle control ECU 6, a communication module 7, and a vehicle state sensor 8. Vehicles that use the vehicle system 1 are not necessarily limited to automobiles. However, the description below explains examples of using the vehicle system 1 for automobiles.

The autonomous driving vehicle according to the first embodiment may be available as a vehicle capable of autonomous driving as described above. There are multiple degrees of autonomous driving, namely, automation levels as defined by SAE, for example. SAE defines automation levels 0 through 5 as follows.

At level 0, a driver performs all operation tasks without system intervention. The operation tasks include steering and acceleration/deceleration, for example. Level 0 is comparable to so-called manual operation. At level 1, the system assists in either steering or acceleration/deceleration. At level 2, the system assists in both steering and acceleration/deceleration. Levels 1 and 2 are comparable to so-called operation assistance.

At level 3, the system can perform all operation tasks in specific places such as highways. The driver performs the driving operation in an emergency. At level 3, the driver needs to be able to provide a fast response when the system requests to change the operation. Level 3 is comparable to so-called conditional autonomous driving. At level 4, the system can perform all operation tasks except under particular circumstances such as irrelevant roads and extreme environments. Level 4 is comparable to so-called advanced autonomous driving. At level 5, the system can perform all operation tasks under any environment. Level 5 is comparable to so-called fully autonomous driving. Levels 3 through 5 are comparable to so-called autonomous driving.

For example, the autonomous driving vehicle according to the first embodiment may satisfy automation level 3 or automation level 4 or higher. The automation level may be selectable. For example, it may be possible to switch between the autonomous driving of automation level 3 or higher and the manual operation of level 0. The description below explains cases where the autonomous driving vehicle performs the autonomous driving of at least automation level 3 or higher.

The locator 3 includes a GNSS (Global Navigation Satellite System) receiver and an inertial sensor. The GNSS receiver receives positioning signals from multiple positioning satellites. The inertial sensor includes a gyro sensor and an acceleration sensor, for example. The locator 3 combines positioning signals received by the GNSS receiver with measurement results of the inertial sensor to successively measure the positions of the subject vehicle equipped with the locator 3. The vehicle positions are represented as the coordinates of latitude and longitude, for example. The vehicle positioning may use the mileage acquired from signals successively output from a vehicle speed sensor mounted on the vehicle.

The map DB 4 is non-volatile memory and stores map data such as link data, node data, road shapes, and structures. The link data contains link ID to identify a link, link length to indicate the length of a link, link orientation, link travel time, link shape information (link shape), node coordinates corresponding to the beginning and end of a link, and road attribute, for example. A link can be shaped into a coordinate sequence indicating the coordinate positions corresponding to shape interpolation points representing both ends of the link and the shape therebetween. The road attribute includes road name, road type, road width, lane count information indicating the number of lanes, and speed regulation value, for example. The node data includes node ID as a unique number assigned to each node on the map, node coordinates, node name, node type, and connection link ID denoting the link ID of a link connected to the node, for example. The link data may be subdivided into lanes in addition to road sections.

The lane number information and/or road type can be used to determine whether the road section (link) corresponds to a multi-lane road on one side, a one-lane road on one side, or a two-way traffic road with no center line, for example. Two-way traffic roads with no center line exclude one-way roads. Two-way traffic roads with no center line apply to general roads except expressways and limited highways.

The map data may include a three-dimensional map composed of a group of feature points representing road shapes and structures. When a three-dimensional map is used as the map data, the locator 3 may specify positions of the subject vehicle by using the three-dimensional map and detection results from the periphery monitoring sensor 5 without using the GNSS receiver. The periphery monitoring sensor 5 is available as LIDAR (Light Detection and Ranging/Laser Imaging Detection and Ranging) or a periphery monitoring camera, for example. LIDAR detects a group of feature points representing road shapes and structures. The three-dimensional map may be generated by REM (Road Experience Management) based on captured images.

The periphery monitoring sensor 5 is an autonomous sensor that monitors the periphery of the subject vehicle. For example, the periphery monitoring sensor 5 detects objects around the subject vehicle such as pedestrians, non-human animals, moving objects (moving objects) such as vehicles other than the subject vehicle, and motionless objects such as guardrails, curbstones, trees, and fallen objects on the road. The periphery monitoring sensor 5 also detects road markings such as lane lines around the subject vehicle. The periphery monitoring sensor 5 includes distance measuring sensors such as a periphery monitoring camera to capture a predetermined range around the subject vehicle, a millimeter-wave radar to transmit exploration waves to a predetermined range around the subject vehicle, a sonar, and LIDAR, for example.

The vehicle control ECU 6 is an electronic control device that provides travel control over the subject vehicle. The travel control includes acceleration/deceleration control and/or steering control. The vehicle control ECU 6 includes a steering ECU to provide steering control, a power unit control ECU to provide acceleration/deceleration control, and a brake ECU, for example. The vehicle control ECU 6 provides travel control by outputting control signals to travel control devices such as an electronically controlled throttle, a brake actuator, and an EPS (Electric Power Steering) motor mounted on the subject vehicle.

The communication module 7 transmits and receives information from the communication module 7 of the vehicle system 1 installed in a surrounding vehicle regarding the subject vehicle through the use of wireless communication (vehicle-to-vehicle communication). The communication module 7 may transmit and receive information from a roadside unit installed on the roadside through the use of wireless communication (road-to-vehicle communication). In this case, the communication module 7 may use a roadside machine to receive the information about the surrounding vehicle transmitted from the communication module 7 of the vehicle system 1 installed in the surrounding vehicle regarding the subject vehicle.

The communication module 7 may transmit and receive information from a center outside the subject vehicle through the use of wireless communication (wide area communication). The wide area communication may be adjusted via the center so that vehicle information including vehicle positions can be transmitted and received between vehicles within a predetermined range based on the vehicle positions maintained at the center. The description below explains examples where the communication module 7 receives information on surrounding vehicles around the subject vehicle by using at least one of the vehicle-to-vehicle communication, the road-to-vehicle communication, and the wide area communication.

When an external server distributes map data, the communication module 7 may use the wide area communication, for example, to receive map data from the external server and store the map data in the map DB 4. In this case, the map DB 4 may be configured as volatile memory. The communication module 7 may successively acquire map data on an area corresponding to the positions of the subject vehicle.

The vehicle state sensor 8 provides a group of sensors to detect various states of the subject vehicle. The vehicle state sensor 8 includes a vehicle speed sensor, a steering sensor, an acceleration sensor, and a yaw rate sensor, for example. The vehicle speed sensor detects the vehicle speeds of the subject vehicle. The steering sensor detects the steering angles of the subject vehicle. The acceleration sensor detects accelerations such as front-back accelerations and lateral accelerations of the subject vehicle. The acceleration sensor may also detect deceleration as an acceleration in the negative direction. The yaw rate sensor detects angular speeds of the subject vehicle.

The autonomous driving device 2 includes a processor, memory, I/O, and a bus connecting these, for example, and performs processes related to autonomous driving by executing a control program stored in the memory. The memory is a non-transitory tangible storage medium to permanently store computer-readable programs and data. The non-transitory tangible storage medium is available as semiconductor memory or a magnetic disk, for example. The details of the autonomous driving device 2 is described below.

<Outline Configuration of Autonomous Driving Device 2>

The description below explains an outline configuration of the autonomous driving device 2 by reference to FIG. 1. As illustrated in FIG. 1, the autonomous driving device 2 includes functional blocks such as a vehicle position acquisition portion 21, a sensing information acquisition portion 22, a map data acquisition portion 23, a communication information acquisition portion 24, a travel environment recognition portion 25, and an autonomous driving portion 26. All or part of the functions executed by the autonomous driving device 2 may be configured as hardware through the use of one or more ICs, for example. All or part of the functional blocks included in the autonomous driving device 2 may be provided as a combination of software executed by the processor and hardware members. The autonomous driving device 2 is comparable to an in-vehicle device.

The vehicle position acquisition portion 21 acquires subject vehicle positions that are successively measured by the locator 3. The sensing information acquisition portion 22 acquires detection results (sensing information) successively detected by the periphery monitoring sensor 5.

The map data acquisition portion 23 acquires the map data stored in the map DB 4. The map data acquisition portion 23 may acquire map data around the subject vehicle according to subject vehicle positions acquired by the vehicle position acquisition portion 21. The map data acquisition portion 23 is preferably configured to acquire map data in a range wider than a detection range of the periphery monitoring sensor 5.

The communication information acquisition portion 24 acquires information about surrounding vehicles around the subject vehicle from the communication module 7. For example, the information about surrounding vehicles includes identification information, speed information, acceleration information, yaw rate information, and position information on surrounding vehicles. The identification information is provided as vehicle IDs, for example, to identify individual vehicles. For example, the identification information may include a car model or a vehicle class, namely, classification information indicating a predetermined classification to which the subject vehicle belongs.

The travel environment recognition portion 25 recognizes the travel environment of the subject vehicle from subject vehicle positions acquired by the vehicle position acquisition portion 21, sensing information acquired by the sensing information acquisition portion 22, map data acquired by the map data acquisition portion 23, and surrounding vehicle information acquired by the communication information acquisition portion 24, for example. Using these pieces of information, for example, the travel environment recognition portion 25 can recognize positions, shapes, and movements of objects around the subject vehicle or positions of road markings around the subject vehicle and generate a virtual space reproducing the actual travel environment. The travel environment recognition portion 25 is comparable to an obstacle identification portion.

From the sensing information acquired by the sensing information acquisition portion 22, the travel environment recognition portion 25 may also recognize the travel environment such as distances between the subject vehicle and surrounding objects, relative velocities of surrounding objects regarding the subject vehicle, and shapes and sizes of surrounding objects. The communication information acquisition portion 24 may be able to acquire information on a surrounding vehicle. In this case, the travel environment recognition portion 25 may use the information about the surrounding vehicle to recognize the travel environment. For example, the position, speed, acceleration, and yaw rate of the surrounding vehicle may be recognized from information about the position, speed, acceleration, and yaw rate of the surrounding vehicle. It may be also favorable to recognize the performance information such as the maximum deceleration or acceleration of the surrounding vehicle from the identification information about the surrounding vehicle. For example, the non-volatile memory of the autonomous driving device 2 can previously store the correspondence relationship between the identification information and the performance information. The correspondence relationship may be referenced to recognize the performance information. The above-described classification information may be used as the identification information.

The travel environment recognition portion 25 favorably recognizes a peripheral object detected by the periphery monitoring sensor 5 by distinguishing whether the peripheral object is a moving object or a motionless object. It is favorable to recognize peripheral objects by distinguishing the types thereof. The types of peripheral objects may be distinctively recognized by performing pattern matching on images captured by a peripheral monitoring camera, for example. The types may be recognized by distinguishing structures such as guardrails, fallen objects on the road, pedestrians, bicycles, motorcycles, or automobiles, for example. When the peripheral object is a car, the type of the peripheral object may be the vehicle class or car model. Whether the peripheral object is a moving object or a motionless object may be recognized according to the type of the peripheral object. For example, the peripheral object may be recognized as a motionless object when the type of the peripheral object is the structure or fallen object on the road. The peripheral object may be recognized as a moving object when the type of the peripheral object is the pedestrian, bicycle, motorcycle, or automobile. An object such as a parked vehicle is less likely to move immediately and may be recognized as a motionless object. The parked vehicle may be recognized based on the recognition that the vehicle stops and the brake lamp is not lit according to the image recognition.

The autonomous driving portion 26 performs processes concerning the replacement for driving operations by the driver. As illustrated in FIG. 1, the autonomous driving portion 26 includes sub-function blocks such as a travel planning portion 27, a verification portion 28, and an autonomous driving function portion 29.

The travel planning portion 27 uses the travel environment recognized by the travel environment recognition portion 25 to generate travel plans that allow the subject vehicle to travel based on autonomous driving. For example, a route search process is performed to generate a medium- to long-term travel plan that generates recommended routes from the subject vehicle's position to a destination. To travel according to the medium- to long-term travel plan, short-term travel plans are generated to change lanes, travel the center of the lane, follow the leading vehicle, or avoid obstacles, for example.

For example, the travel planning portion 27 may generate a travel plan that provides a route constantly distanced from the recognized lane line or following the center of the lane line or a route corresponding to the recognized behavior or vehicular swept path of the leading vehicle. The travel planning portion 27 may generate a travel plan that provides a route to change the lane of the subject vehicle to a vacant area of the adjacent lane in the same travel direction. The travel planning portion 27 may generate a travel plan that provides a route to avoid obstacles and maintain the travel or activates deceleration to stop behind obstacles. The travel planning portion 27 may generate a travel plan assumed to be optimal based on machine learning, for example. The travel planning portion 27 calculates, for example, one or more routes as a short-term travel plan. The travel planning portion 27 may generate a short-term travel plan that includes acceleration/deceleration information for speed adjustment on the calculated route, for example.

For example, the travel environment recognition portion 25 may recognize a frontward obstacle or a travel obstacle that hinders the subject vehicle from traveling. In this case, the travel planning portion 27 may generate a travel plan appropriate to the situation while allowing the verification portion 28 (to be described) to evaluate the safety. The description below explains a case where a travel obstacle is recognized and identified. The travel obstacle may be a fallen object on the road, a parked vehicle, or a leading vehicle in the lane traveled by the subject vehicle. A leading vehicle assumed to be the travel obstacle may be identified by its average vehicle speed significantly lower than the speed regulation value for the cruising path even though no traffic congestion occurs. Narrow roads often require reduced speed and may favorably exclude leading vehicles from the travel obstacles. When the cruising path for the subject vehicle corresponds to a two-way road with no center line, the description below does not assume a moving object such as a leading vehicle to be the travel obstacle and assumes a motionless object such as a parked vehicle to be the travel obstacle.

For example, the travel planning portion 27 performs processes according to cruising paths for the subject vehicle when the travel environment recognition portion 25 recognizes and identifies travel obstacles. For example, the cruising path for the subject vehicle may correspond to a two-way road with no center line. Then, the travel planning portion 27 determines whether the subject vehicle can travel within the cruising lane while ensuring a horizontal distance to the travel obstacle so that the horizontal distance is greater than or equal to a threshold value. The threshold value may be a lower limit specifiable as a safety distance described later. The lower limit may correspond to the value of the safety distance required for the subject vehicle to travel at the minimum speed, for example. In other words, the travel planning portion 27 maintains a horizontal safety distance to the travel obstacle and determines whether the subject vehicle can travel within the cruising lane. The threshold value may be a predetermined fixed value or may vary with the behavior of a moving object assumed to be the travel obstacle.

For example, suppose part of the cruising lane for the subject vehicle is not occupied by the travel obstacle and leaves the width larger than the width of the subject vehicle plus the above-described threshold. Then, the travel planning portion 27 determines that the subject vehicle can travel within the cruising lane by ensuring the horizontal safety distance to the travel obstacle. Suppose the travel planning portion 27 determines that the subject vehicle can travel within the cruising lane by ensuring the horizontal safety distance to the travel obstacle. Then, the travel planning portion 27 may generate a travel plan that passes close by the travel obstacle while maintaining the cruising lane for the subject vehicle and avoiding oncoming vehicles.

Suppose part of the cruising lane for the subject vehicle is not occupied by the travel obstacle and leaves the width smaller than or equal to the width of the subject vehicle plus the above-described threshold. Then, it is determined that the subject vehicle cannot travel within the cruising lane by ensuring the horizontal safety distance to the travel obstacle. The vehicle width of the subject vehicle may use values previously stored in the non-volatile memory of the autonomous driving device 2. The cruising lane width may be specified from the map data acquired by the map data acquisition portion 23. Suppose it is determined that the subject vehicle cannot travel within the cruising lane by ensuring the horizontal safety distance to the travel obstacle. Then, the travel planning portion 27 may generate a travel plan to stop the vehicle. This is because no passing is possible when the cruising path for the subject vehicle corresponds to a two-way road with no center line and it is determined that the subject vehicle cannot travel within the cruising lane by ensuring the horizontal safety distance to the travel obstacle. In this case, the autonomous driving device 2 may change the autonomous driving to manual operation, for example. When the autonomous driving is changed to the manual operation, it may be favorable to make a notification about the operation change and then transition to the manual operation.

The cruising path for the subject vehicle may correspond to a multi-lane road on one side. Then, the travel planning portion 27 may generate a travel plan that changes the lane to an adjacent lane in the same direction as the cruising lane for the subject vehicle. The cruising path for the subject vehicle may correspond to a one-lane road on one side. Then, in the same manner, as described above, the travel planning portion 27 may maintain a horizontal distance to the travel obstacle, being greater than or equal to the threshold, and determine whether the subject vehicle can travel within the cruising lane. The travel planning portion 27 may ensure the horizontal safety distance to the travel obstacle and determine that the subject vehicle can travel within the cruising lane. Then, the travel planning portion 27 may generate a travel plan that passes close by the travel obstacle while maintaining the cruising lane for the subject vehicle. Contrastingly, the cruising path for the subject vehicle may correspond to a one-lane road on one side and it may be determined that the subject vehicle cannot travel within the cruising lane while ensuring the horizontal safety distance to the travel obstacle. Then, the travel planning portion 27 may generate a travel plan that passes close by the travel obstacle while straying from the cruising lane for the subject vehicle and avoiding oncoming vehicles.

The verification portion 28 evaluates the safety of travel plans generated by the travel planning portion 27. To more easily evaluate the safety of travel plans, for example, the verification portion 28 may evaluate the safety of travel plans by using mathematical formula models that mathematize the concept of safe driving. The verification portion 28 may evaluate the safety based on whether an object-to-object distance is greater than or equal to the safety distance. The object-to-object distance signifies a distance between the subject vehicle and surrounding objects. The safety distance signifies a distance that is calculated by a predetermined mathematical formula model and provides the basis for evaluating the safety between objects. The object-to-object distance may include front-back and horizontal distances from the subject vehicle, for example.

As a model to ensure the prescribed safety, the mathematical formula model may provide the soundness that rational people agree with. The mathematical formula model signifies that the subject vehicle can constantly follow operation rules corresponding to the traffic rules as long as appropriate actions are taken. The appropriate action includes braking by reasonable force, for example. The braking by reasonable force includes braking at the maximum deceleration possible for the subject vehicle, for example. The safety distance calculated by the mathematical formula model can also signify the minimum distance between the subject vehicle and an obstacle required for the subject vehicle to avoid an approach to the obstacle.

The verification portion 28 includes sub-functional blocks such as a safety distance setting portion 281 and a range specification portion 282. The safety distance setting portion 281 calculates a safety distance by using the above-described mathematical formula model and defines the calculated safety distance as the safety distance. The safety distance setting portion 281 calculates and defines the safety distance by using at least information about the vehicle behavior. The safety distance setting portion 281 may use an RSS (Responsibility Sensitive Safety) model as the mathematical formula model, for example.

The safety distance setting portion 281 sets safety distances ahead of the subject vehicle horizontally, for example. The safety distance setting portion 281 may calculate the shortest possible distance for the subject vehicle to stop as the safety distance ahead of the subject vehicle as a reference based on the information about the subject vehicle's behavior. For example, take into account the speed, maximum acceleration, maximum deceleration, and response time of the subject vehicle. The subject vehicle travels forward at the maximum acceleration from the current vehicle speed during the response time and then decelerates at the maximum deceleration to stop. The distance traveled to stop the subject vehicle may be calculated as the forward safety distance. The speed, maximum acceleration, and maximum deceleration of the subject vehicle are assumed to apply in the front-back direction of the subject vehicle. The response time may be assumed to be a period from the time to issue an instruction to start operating the brake system to the time to start the operation when the autonomous driving stops the subject vehicle. As an example, the maximum acceleration, maximum deceleration, and response time of the subject vehicle may be previously stored in the non-volatile memory of the autonomous driving device 2 to be able to specify these. The safety distance setting portion 281 may set the forward safety distance as a reference also when no moving object is recognized but a motionless object is recognized ahead of the subject vehicle.

When a moving object is recognized ahead of the subject vehicle, the safety distance setting portion 281 may calculate the forward safety distance, namely, a distance that enables the subject vehicle and the forward moving object to stop without contact based on the information on the behavior of the subject vehicle and the forward moving object. The example here assumes the moving object to be a car. Examples of the forward moving object include leading vehicles or oncoming vehicles. For example, take into account the speed, maximum acceleration, maximum deceleration, and response time of each of the subject vehicle and the forward moving object. When the subject vehicle and the forward moving object move in the opposite direction, the subject vehicle and the forward moving object each travel forward at the maximum accelerations from the current speeds during the response time and then decelerate at the maximum decelerations. The distance enabling both to stop without contact may be calculated as the forward safety distance. When the subject vehicle and the forward moving object move in the forward direction, the forward moving object decelerates at the maximum deceleration from the current speed. The subject vehicle travels forward at the maximum acceleration from the current speed during the response time and then decelerates at the maximum deceleration. The distance enabling both to stop without contact may be calculated as the forward safety distance.

The communication information acquisition portion 24 may be able to acquire the speed, maximum acceleration, maximum deceleration, and response time of moving objects. Then, the safety distance setting portion 281 may use the information acquired by the communication information acquisition portion 24. Information that can be recognized by the travel environment recognition portion 25 may be used, if any. Further, the non-volatile memory of the autonomous driving device 2 can previously store values of the maximum acceleration, maximum deceleration, and response time for moving objects assumed to be ordinary vehicles. The safety distance setting portion 281 may use these values for ordinary vehicles.

When a moving object is recognized behind the subject vehicle, the safety distance setting portion 281 may calculate the backward safety distance based on the information about the behavior of the subject vehicle and the moving object behind (backward moving object). In this case, the backward safety distance is equal to a distance enabling the subject vehicle and the backward moving object to stop without contact. Examples of the backward moving object include a succeeding vehicle and a vehicle (sideways succeeding vehicle) traveling behind the subject vehicle on an adjacent lane. The safety distance setting portion 281 may estimate the safety distance for the backward moving object in the same manner as calculating the forward safety distance, for example, and thereby set the safety distance behind the subject vehicle.

The safety distance setting portion 281 may calculate the safety distance in the lateral direction as a reference from the subject vehicle based on the behavior information about the subject vehicle. In this case, the safety distance is equal to the shortest distance traveled by the subject vehicle in the lateral direction until the horizontal speed can be zeroed. For example, take into account the speed, maximum acceleration, maximum deceleration, and response time of the subject vehicle in the lateral direction. The subject vehicle moves in the lateral direction at the maximum acceleration from the current horizontal speed during the response time. Then, the subject vehicle decelerates at the maximum deceleration until the horizontal speed can be zeroed. The distance traveled by the subject vehicle may be calculated as the horizontal safety distance. The response time may be assumed to be a period from the time to issue an instruction to operate a steering apparatus to the time to start the operation so that the autonomous driving can steer the subject vehicle. The safety distance setting portion 281 may set the horizontal safety distance as a reference also when no moving object is recognized but a motionless object is recognized in the lateral direction from the subject vehicle.

When a moving object is recognized in the lateral direction of the subject vehicle, the safety distance setting portion 281 may calculate the safety distance in the direction toward the moving object based on the information about the behavior of the subject vehicle and the moving object. In this case, the safety distance is equal to a distance traveled by the subject vehicle and the moving object in the lateral direction until the horizontal speeds of the subject vehicle and the moving object can be zeroed without contact. For example, take into account the speed, maximum acceleration, maximum deceleration, and response time of each of the subject vehicle and the moving object. The subject vehicle and the moving object move in the lateral direction at the maximum accelerations from the current speeds during the response time and then decelerate at the maximum decelerations. The distance enabling both to stop without contact may be calculated as the horizontal safety distance.

Suppose a case of generating a travel plan that passes close by a travel obstacle while avoiding an oncoming vehicle. In this case, the subject vehicle needs to complete passing close by a frontward obstacle while ensuring at least the safety distance set by the safety distance setting portion 281 between the subject vehicle and the oncoming vehicle. For this purpose, the range specification portion 282 specifies a required range estimated to inhibit the existence of the oncoming vehicle. In other words, the required range is assumed to keep the oncoming vehicle away from the safety distance for the subject vehicle until the subject vehicle completes passing close by the travel obstacle if no oncoming vehicle enters that range.

The range specification portion 282 may specify the required range comparable to an area estimated to occupy the range from the subject vehicle to the safety distance provided by the safety distance setting portion 281 until the subject vehicle completes passing close by the travel obstacle. The subject vehicle forms a locus until completing passing close by the travel obstacle. The locus may be estimated from the travel plan generated by the travel planning portion 27 to pass close by the travel obstacle. The safety distance may be set as described above based on the information about the behavior of the subject vehicle and the oncoming vehicle. The safety distance may be used as a fixed value until the subject vehicle completes passing close by the travel obstacle.

Figure 2:
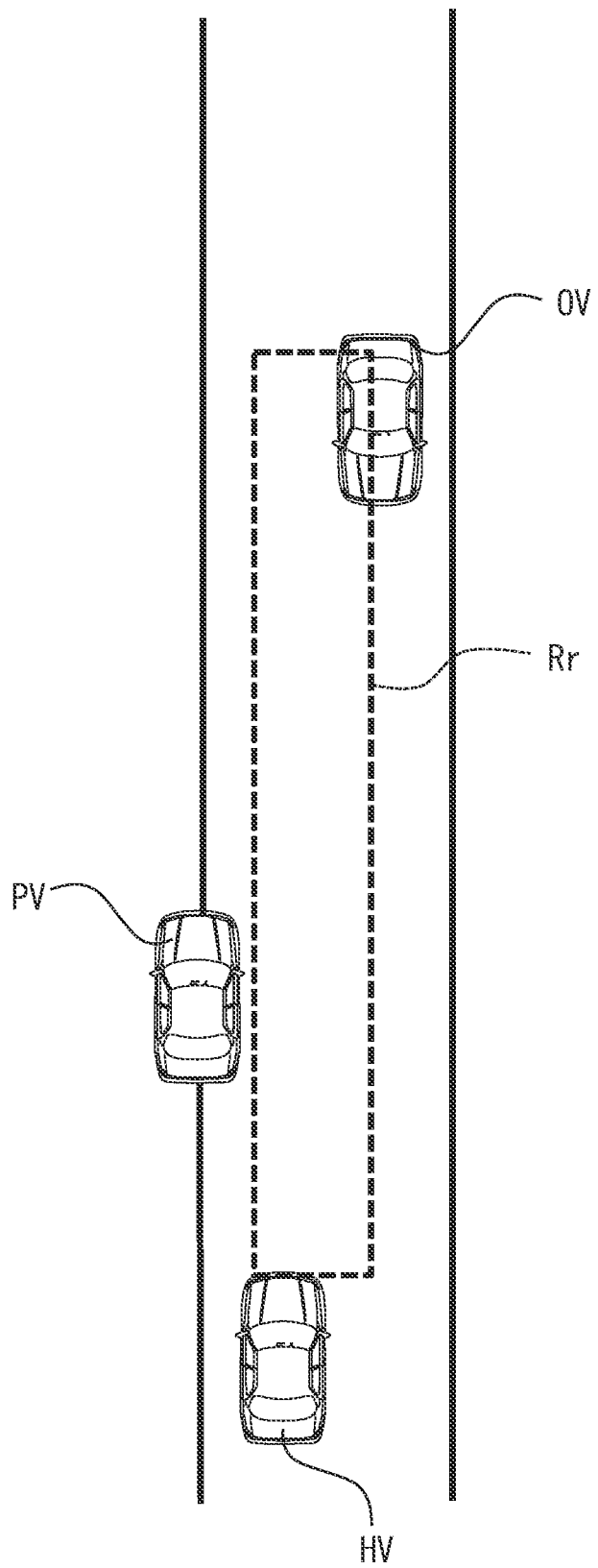
FIG. 2 is a diagram illustrating an example of specifying required range that enables a travel environment recognition portion to recognize an oncoming vehicle as an obstacle regarding a subject vehicle and identify the oncoming vehicle.
Figure 3:
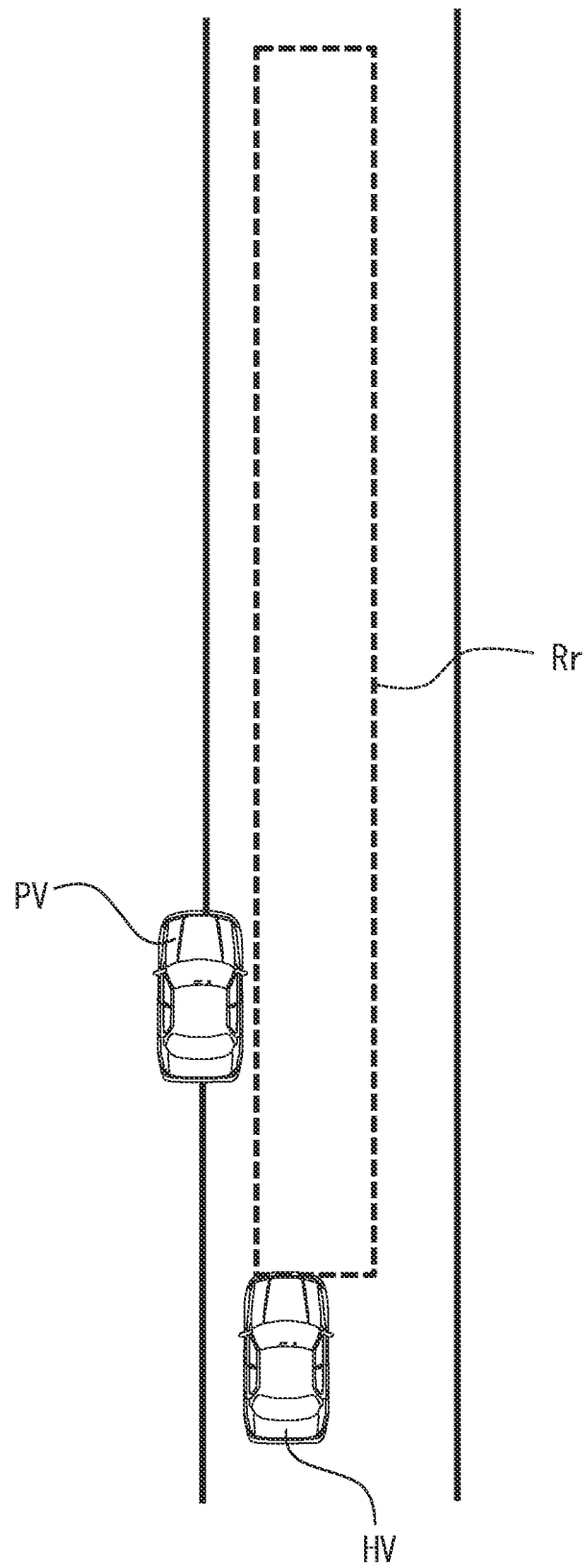
FIG. 3 is a diagram illustrating an example of specifying required range that disables the travel environment recognition portion from recognizing an oncoming vehicle as an obstacle regarding the subject vehicle and identifying the oncoming vehicle.

The range specification portion 282 may perform processes depending on whether the travel environment recognition portion 25 can recognize an oncoming vehicle as an obstacle for the subject vehicle and identify the oncoming vehicle. The description below explains the processes by reference to FIGS. 2 and 3. In FIGS. 2 and 3, HV denotes the subject vehicle, PV denotes the travel obstacle, and Rr denotes the required range. In FIG. 2, OV denotes the oncoming vehicle.

As illustrated in FIG. 2, the travel environment recognition portion 25 may be able to recognize oncoming vehicle OV for subject vehicle HV as an obstacle and identify this oncoming vehicle OV. Then, the range specification portion 282 may specify required range Rr by using the information about the nearest identified oncoming vehicle OV for the subject vehicle. The information about the nearest identified oncoming vehicle OV may be based on the sensing information acquired by the sensing information acquisition portion 22 or based on the surrounding vehicle information acquired by the communication information acquisition portion 24. In this case, the range specification portion 282 specifies required range Rr by using the safety distance to actually oncoming vehicle OV. The safety distance is calculated based on the behavior information about subject vehicle HV and nearest identified oncoming vehicle OV.

As illustrated in FIG. 3, the travel environment recognition portion 25 does not recognize an oncoming vehicle as an obstacle for subject vehicle HV and cannot identify an oncoming vehicle. In this case, the range specification portion 282 may identify required range Rr by using the information about predetermined virtual oncoming vehicles. The information about predetermined virtual oncoming vehicles may include the speed, maximum acceleration, maximum deceleration, and response time, for example. The information about predetermined virtual oncoming vehicles may be available as values for ordinary vehicles previously stored in the non-volatile memory of the autonomous driving device 2. The speed may be equal to the speed regulation value of a cruising path for the subject vehicle, for example, to be consistent with the cruising path for the subject vehicle. In this case, the range specification portion 282 identifies required range Rr by using the safety distance to a virtual oncoming vehicle. The safety distance is calculated based on the behavior information about subject vehicle HV and the virtual oncoming vehicle.

The object-to-object distance may be greater than or equal to the safety distance set by the safety distance setting portion 281. In this case, the verification portion 28 may evaluate that the travel plan generated by the travel planning portion 27 ensures safety. When the object-to-object distance is smaller than the safety distance, the verification portion 28 may evaluate that the travel plan generated by the travel planning portion 27 ensures no safety. The verification portion 28 may output the travel plan to the autonomous driving function portion 29 based on the evaluation of the ensured safety. The verification portion 28 does not output the travel plan to the autonomous driving function portion 29 when the travel plan is evaluated to ensure no safety.

The verification portion 28 may modify the travel plan according to the safety distance set by the safety distance setting portion 281 so that the travel plan is evaluated to be safe, for example. The verification portion 28 may allow the travel planning portion 27 to modify the travel plan. For example, a route satisfying the safety distance may be selected when the travel planning portion 27 generates multiple route candidates. When there is no route satisfying the safety distance, it may be favorable to modify the travel plan to decrease the subject vehicle speed until the safety distance is satisfied to evaluate the travel plan to be safe. Alternatively, when there is no route satisfying the safety distance, it may be favorable to modify the travel plan to provide a brief stop and await a situation that enables a route satisfying the safety distance.

Suppose the travel planning portion 27 generates a travel plan to pass close by travel obstacles while avoiding oncoming vehicles. In this case, no oncoming vehicle may exist in the required range specified by the range specification portion 282. Then, the verification portion 28 outputs this travel plan to the autonomous driving function portion 29. Suppose the travel planning portion 27 generates a travel plan to pass close by travel obstacles while avoiding oncoming vehicles. In this case, an oncoming vehicle may exist in the required range specified by the range specification portion 282. Then, the verification portion 28 does not output this travel plan to the autonomous driving function portion 29. The travel plan may be modified to provide a brief stop, for example. It may be favorable to await a situation where no oncoming vehicle exists in the required range specified by the range specification portion 282. The verification portion 28 determines whether an oncoming vehicle exists in the required range specified by the range specification portion 282, based on the result of recognizing the travel environment from the travel environment recognition portion 25.

The autonomous driving function portion 29 allows the vehicle control ECU 6 to automatically accelerate/decelerate and/or steer the subject vehicle according to the travel plan output from the verification portion 28, thereby providing the autonomous driving, namely, a replacement for driving operations by the driver. The autonomous driving function portion 29 performs autonomous driving according to the travel plans evaluated by the verification portion 28 to be used for autonomous driving. The autonomous driving function portion 29 performs the autonomous driving along the route according to the travel plan. The autonomous driving function portion 29 causes the vehicle to automatically stop or decelerate according to the travel plan. The autonomous driving function portion 29 performs the autonomous driving according to the travel plan output from the verification portion 28 while avoiding an approach between the subject vehicle and surrounding objects.

<Autonomous Driving Processes in the Autonomous Driving Device 2>

Figure 4:
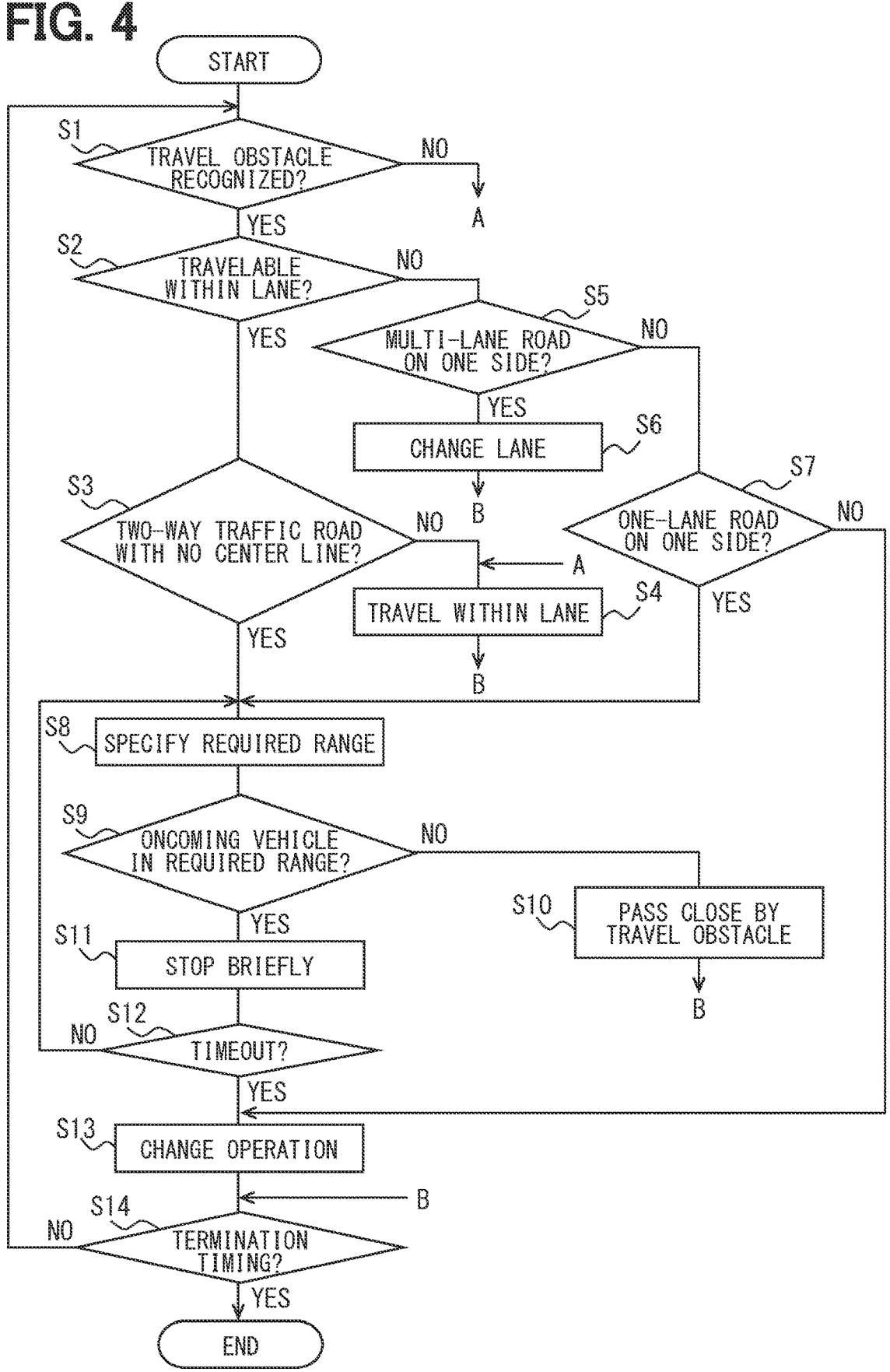
FIG. 4 is a flowchart illustrating a flow of an autonomous driving process in the autonomous driving device.

The flowchart in FIG. 4 is used to explain an example flow of the process (autonomous driving process) related to autonomous driving in the autonomous driving device 2. Execution of steps included in the autonomous driving process by the computer is comparable to execution of the driving assist method.

The flowchart in FIG. 4 may start when a power switch is turned on to start the autonomous driving. The power switch is used to start the subject vehicle's internal combustion engine or motor generator. It may be possible to switch between manual operation and autonomous driving of the subject vehicle. In this case, the flowchart may start when the power switch is turned on while the autonomous driving is enabled. Moreover, the flowchart may start when the setting to perform autonomous driving during manual operation is enabled and the manual operation changes to the autonomous driving. The flowchart in FIG. 4 assumes that the travel environment recognition portion 25 successively recognizes the travel environment of the subject vehicle. The description below explains an example where a moving object such as a leading vehicle is not identified as a travel obstacle.

At step S1, the travel environment recognition portion 25 may recognize a travel obstacle (YES at S1). Then, the process proceeds to step S2. The travel environment recognition portion 25 may not recognize any travel obstacle (NO at S1). Then, the process proceeds to step S4. As above, the travel obstacle is a frontward obstacle that hinders the subject vehicle from traveling.

At step S2, for example, the travel planning portion 27 determines whether the subject vehicle can travel within the cruising lane (travelable within the lane) while ensuring a horizontal distance to the travel obstacle. The horizontal distance is larger than or equal to the threshold. The process may determine that the subject vehicle can travel within the cruising lane (YES at S2). Then, the process proceeds to step S3. The process may determine that the subject vehicle cannot travel within the cruising lane (NO at S2). Then, the process proceeds to step S5. Not only the travel planning portion 27 but also other function blocks in the autonomous driving device 2 such as the verification portion 28 may determine whether the subject vehicle can travel within the cruising lane.

At step S3, the subject vehicle's cruising path may correspond to a two-way traffic road with no center line (YES at S3). Then, the process proceeds to step S8. The subject vehicle's cruising path may not correspond to a two-way traffic road with no center line (NO at S3). Then, the process proceeds to step S4. When the subject vehicle's cruising path does not correspond to a two-way traffic road with no center line, the subject vehicle's cruising path corresponds to a multi-lane road on one side or a one-lane road on one side. The travel environment recognition portion 25 may determine whether the subject vehicle's cruising path corresponds to a two-way traffic road with no center line, for example.

At step S4, the travel planning portion 27 generates a travel plan that passes close by a travel obstacle while maintaining the subject vehicle's cruising path. The subject vehicle may need to decelerate to travel within the subject vehicle's cruising lane while ensuring the horizontal safety distance to the travel obstacle. Then, the travel planning portion 27 generates a travel plan to provide the required deceleration. The autonomous driving function portion 29 allows the subject vehicle to automatically travel within the specified cruising lane while ensuring the horizontal safety distance to the travel obstacle. Then, the process proceeds to step S14. The autonomous driving function portion 29 allows the subject vehicle to automatically pass close by the travel obstacle while maintaining the specified cruising lane under the condition that the travel environment recognition portion 25 identifies a frontward obstacle necessitating close-by passing; the subject vehicle can travel within the lane; and the subject vehicle's cruising path does not correspond to a two-way traffic road with no center line.

At step S5, the subject vehicle's cruising path may correspond to a multi-lane road on one side (YES at S5). Then, the process proceeds to step S6. The subject vehicle's cruising path may not correspond to a multi-lane road on one side (NO at S5). Then, the process proceeds to step S7. The travel environment recognition portion 25 may determine whether the subject vehicle's cruising path corresponds to a multi-lane road on one side.

At step S6, the travel planning portion 27 generates a travel plan that changes the lane to an adjacent lane in the same direction as the subject vehicle's cruising lane. The distance between the subject vehicle and the sideways succeeding vehicle may be smaller than the safety distance to the sideways succeeding vehicle set by the safety distance setting portion 281. In this case, the travel planning portion 27 may generate a travel plan that changes the lane after waiting until the safety distance to the sideways succeeding vehicle or more is ensured. The autonomous driving function portion 29 automatically changes the lane to the adjacent lane in the same direction as the subject vehicle's cruising lane. Then, the process proceeds to step S14. The autonomous driving function portion 29 automatically changes the lane to the adjacent lane in the same direction as the subject vehicle's cruising lane under the condition that the travel environment recognition portion 25 identifies a frontward obstacle necessitating close-by passing; and the subject vehicle's cruising path corresponds to a multi-lane road on one side.

At step S7, the subject vehicle's cruising path may correspond to a one-lane road on one side (YES in S7). Then, the process proceeds to step S8. The subject vehicle's cruising path may not correspond to a one-lane road on one side (NO in S7). Then, the process proceeds to step S13. When the subject vehicle's cruising path may not correspond to a one-lane road on one side, the subject vehicle's cruising path is a two-way traffic road with no center line or a one-way road. The travel environment recognition portion 25 may determine whether the subject vehicle's cruising path corresponds to a one-lane road on one side.

At step S8, the range specification portion 282 specifies the required range. When the required range is specified, the subject vehicle needs to complete passing close by a travel obstacle while ensuring at least the safety distance set by the safety distance setting portion 281 between the subject vehicle and an oncoming vehicle. For this purpose, the range specification portion 282 may specify the required range estimated to inhibit the existence of oncoming vehicles.

At step S9, an oncoming vehicle may exist in the required range specified at S8 (YES in S9). Then, the process proceeds to step S11. No oncoming vehicle may exist in the required range specified at S8 (NO in S9). Then, the process proceeds to step S10. The verification portion 28 may determine whether an oncoming vehicle exists in the required range based on the result of recognizing the travel environment in the travel environment recognition portion 25, for example.

At step S10, the travel planning portion 27 generates a travel plan to pass close by the travel obstacle. When the subject vehicle's cruising path is a two-way traffic road with no center line, the travel planning portion 27 generates a travel plan to pass close by the travel obstacle while maintaining the subject vehicle's cruising lane. This travel plan assumes that no oncoming vehicle exists in the required range and any oncoming vehicle does not enter the safety distance for the subject vehicle until passing close by the travel obstacle is completed. Namely, the travel plan is comparable to passing close by the travel obstacle while maintaining the subject vehicle's cruising lane and avoiding oncoming vehicles. When the subject vehicle's cruising path is a one-lane road on one side, the travel planning portion 27 may generate a travel plan to pass close by the travel obstacle while straying from the subject vehicle's cruising lane. This travel plan assumes that no oncoming vehicle exists in the required range and any oncoming vehicle does not enter the safety distance for the subject vehicle until passing close by the travel obstacle is completed. Namely, the travel plan is comparable to passing close by the travel obstacle while straying from the subject vehicle's cruising lane and avoiding oncoming vehicles.

At S10, the autonomous driving function portion 29 automatically passes close by the travel obstacle. Then, the process proceeds to step S14. The autonomous driving function portion 29 automatically passes close by the travel obstacle while maintaining the subject vehicle's cruising lane under the condition that the travel environment recognition portion 25 identifies a frontward obstacle necessitating close-by passing; the subject vehicle can travel within the lane; the subject vehicle's cruising path corresponds to a two-way traffic road with no center line; and no oncoming vehicle exists in the required range. The autonomous driving function portion 29 automatically pass close by the travel obstacle while straying from the subject vehicle's cruising lane under the condition that the travel environment recognition portion 25 identifies a frontward obstacle necessitating close-by passing; the subject vehicle cannot travel within the lane; the subject vehicle's cruising path corresponds to a one-lane road on one side; and no oncoming vehicle exists in the required range.

It is possible to automatically pass close by a travel obstacle at the timing estimated to ensure that the oncoming vehicle does not enter the safety distance for the subject vehicle while passing close by the travel obstacle. It is possible to avoid a situation where the subject vehicle stops because the safety distance for the subject vehicle cannot be ensured while passing close by the travel obstacle.

At step S11, the travel planning portion 27 generates a travel plan that causes the subject vehicle to briefly stop. The autonomous driving function portion 29 briefly stops the subject vehicle without automatically passing close by the travel obstacle. Then, the process proceeds to step S12. The autonomous driving function portion 29 briefly stops the subject vehicle without automatically passing close by the travel obstacle under the condition that the travel environment recognition portion 25 identifies a frontward obstacle necessitating close-by passing; the subject vehicle can travel within the lane; the subject vehicle's cruising path corresponds to a two-way traffic road with no center line; and an oncoming vehicle exists in the required range. The autonomous driving function portion 29 briefly stops the subject vehicle without automatically passing close by the travel obstacle under the condition that the travel environment recognition portion 25 identifies a frontward obstacle necessitating close-by passing; the subject vehicle cannot travel within the lane; the subject vehicle's cruising path corresponds to a one-lane road on one side; and an oncoming vehicle exists in the required range.

At step S12, a timeout may occur at the predetermined time elapsed from the brief stop started at S11 (YES at S12). Then, the process proceeds to step S13. No timeout may occur (NO at S12). Then, the process returns to step S8. The range specification portion 282 re-specifies the required range and repeats the process. The predetermined time can be optionally configured. The autonomous driving function portion 29 causes the subject vehicle to briefly stop and automatically pass close by the frontward obstacle based on the absence of oncoming vehicles in the required range re-specified by the range specification portion 282 under the condition that the travel environment recognition portion 25 identifies a frontward obstacle as a motionless object necessitating close-by passing; an oncoming vehicle exists in the required range; and the subject vehicle's cruising path corresponds to a one-lane road on one side or a two-way traffic road with no center line.

Even if an oncoming vehicle exists in the required range, the autonomous driving function portion 29 awaits the timing when no oncoming vehicle exists in the required range, and then enables automatic passing close by the travel obstacle. It may be impossible to automatically pass close by the travel obstacle at the timing estimated to ensure that the oncoming vehicle does not enter the safety distance for the subject vehicle while passing close by the travel obstacle. Even in this case, it is possible to automatically pass close by the travel obstacle while awaiting the timing estimated to ensure that the oncoming vehicle does not enter the safety distance for the subject vehicle while passing close by the travel obstacle.

At step S13, the autonomous driving device 2 changes the autonomous driving to the manual operation. Then, the process proceeds to step S14. The manual operation enables the travel by avoiding travel obstacles when the autonomous driving cannot ensure the travel by avoiding travel obstacles. The process at S13 is not limited to changing the autonomous driving to the manual operation. For example, the communication module 7 may enable communication with a center that can remotely control the subject vehicle. In this case, a notification may be issued to the center at S13 and the center may remotely control the subject vehicle and enable the travel by avoiding travel obstacles.

At step S14, the autonomous driving process may reach the termination timing (YES at S14). Then, the autonomous driving process terminates. The autonomous driving process may not reach the termination timing (NO at S14). Then, the process returns to step S1 and is repeated. Examples of the termination timing of the autonomous driving process include turning off the power switch of the subject vehicle and changing the operation to the manual operation. The flowchart of FIG. 4 is just an example, and the order of the process may be partially changed.

The flowchart in FIG. 4 illustrates the case where a moving object such as the leading vehicle is not identified as a travel obstacle. The following may be advantageous when a moving object such as the leading vehicle is identified as a travel obstacle. For example, the subject vehicle's cruising path may correspond to a two-way road with no center line. In this case, a moving object such as the leading vehicle is not identified as a travel obstacle. The subject vehicle's cruising path may correspond to a multi-lane road on one side or a one-lane road on one side. In this case, a moving object such as the leading vehicle may be identified as a travel obstacle as well as a motionless object such as the parked vehicle. When the travel obstacle is a moving object, the autonomous driving function portion 29 may continue keeping track of the travel obstacle as a moving object for a specified period at S11. Then, the process may proceed to step S14.

Overview of the First Embodiment

The first embodiment automatically passes close by a travel obstacle when no oncoming vehicle exists in the required range. The subject vehicle needs to complete passing close by a travel obstacle while ensuring at least the safety distance set by the safety distance setting portion 281 between the subject vehicle and the oncoming vehicle. For this purpose, the required range is estimated as a range within which the oncoming vehicle should not be located in order for the subject vehicle to complete passing the obstacle. When no oncoming vehicle exists in the required range, it is supposed to complete passing close by a travel obstacle while ensuring the safety distance to the oncoming vehicle. The safety distance is the minimum distance provided between the subject vehicle and the obstacle to prevent the subject vehicle from approaching the obstacle. The subject vehicle may be able to complete passing close by the travel obstacle while ensuring the safety distance to the oncoming vehicle. In this case, no braking is needed while passing to ensure the safety distance. It is possible to avoid a situation where the subject vehicle stops while passing close by the travel obstacle. Consequently, it is possible to pass close by frontward obstacles while hardly hindering the traffic flow even when the minimum safety distance from the subject vehicle is provided to avoid an approach between the subject vehicle and obstacles during autonomous driving.

Second Embodiment

According to the configuration of the first embodiment, the verification portion 28 evaluates the safety of travel plans generated by the travel planning portion 27. However, the configuration is not limited thereto. For example, the travel planning portion 27 may also include the function of the verification portion 28 and may generate travel plans to satisfy the same safety as evaluated by the verification portion 28.

Third Embodiment

According to the configuration of the first embodiment, the travel environment recognition portion 25 recognizes and identifies travel obstacles. However, the configuration is not limited thereto. For example, the control unit of the periphery monitoring sensor 5 may recognize travel obstacles. The travel environment recognition portion 25 may identify travel obstacles based on recognition results from the periphery monitoring sensor 5. The control unit of the periphery monitoring sensor 5 may recognize part of the driving environment such as recognition of obstacles from captured images.

Fourth Embodiment

<Outline Configuration of Vehicle System 1a>

Figure 5:
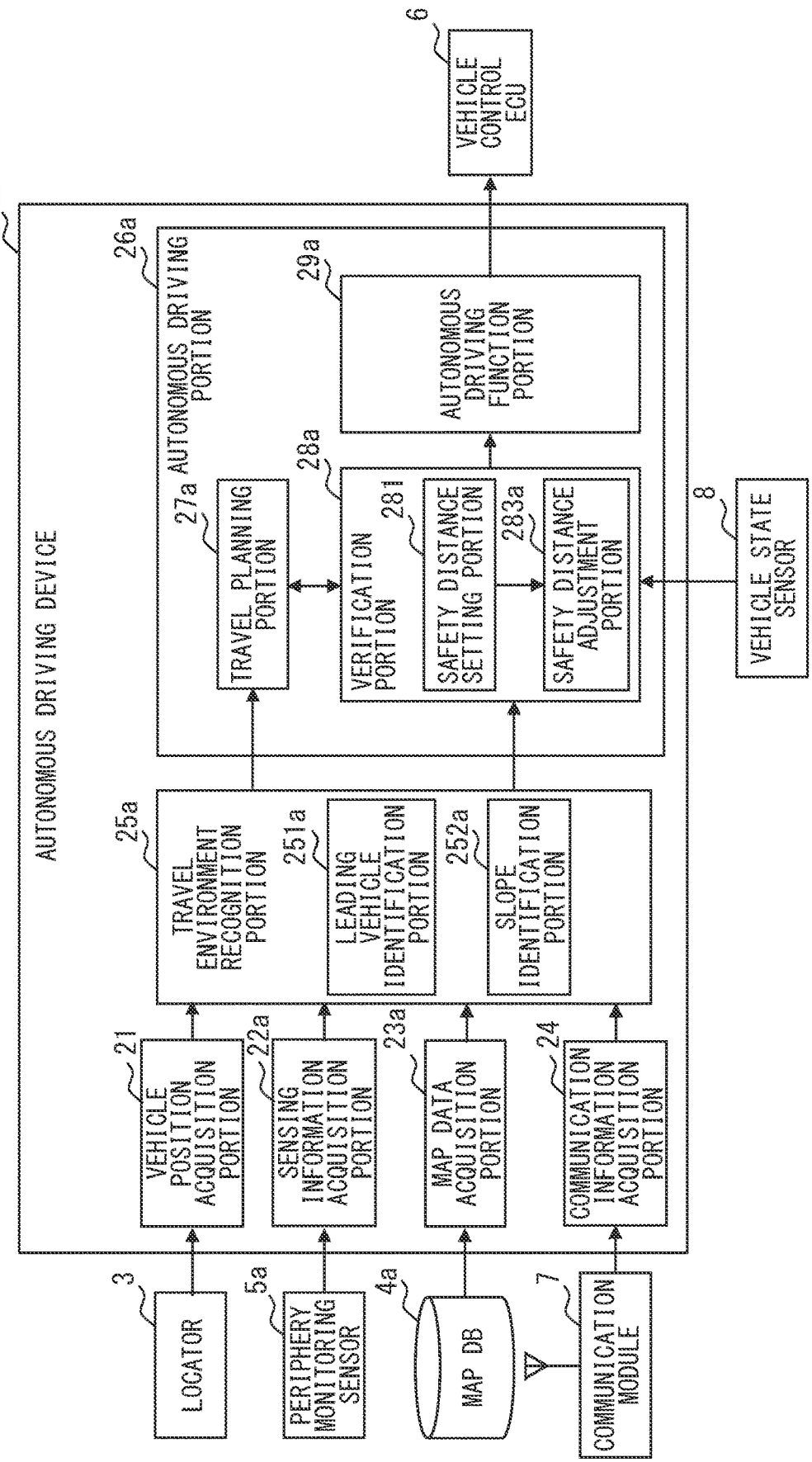
FIG. 5 is a diagram illustrating a schematic configuration of a vehicle system and an autonomous driving device.

The description below explains the fourth embodiment of the present disclosure by reference to the drawings. The vehicle system 1a illustrated in FIG. 5 is used for an autonomous driving vehicle. The autonomous driving vehicle is interpreted similarly to the first embodiment. For example, the fourth embodiment may use the vehicle system 1a for autonomous driving vehicles that perform the autonomous driving of automation level 3 or higher.

As illustrated in 5, the vehicle system 1a includes an autonomous driving device 2a, the locator 3, a map DB 4a, a periphery monitoring sensor 5a, the vehicle control ECU 6, the communication module 7, and the vehicle state sensor 8. Vehicles that use the vehicle system 1a are not necessarily limited to automobiles. However, the description below explains examples of using the vehicle system 1a for automobiles. The locator 3, the vehicle control ECU 6, the communication module 7, and the vehicle state sensor 8 may be interpreted similarly to the first embodiment, for example.

The map DB 4a is similar to the map DB 4 according to the first embodiment except that the map data also contains vertical slope data as road shape data, for example. The vertical slope data may correspond to at least spots on roads or observation points in the map data, for example. Transverse slope data may use positive values to represent uphill and negative values to represent downhill, for example.

The periphery monitoring sensor 5a is similar to the periphery monitoring sensor 5 according to the first embodiment except that the detection range includes at least a specified range ahead of the subject vehicle. The periphery monitoring sensor 5a may be available as a camera as well as distance measuring sensors such as millimeter-wave radar, sonar, and LIDAR. The detection range of the periphery monitoring sensor 5a may be comparable to the field of view. The detection range of the periphery monitoring sensor 5a may be comparable to the angle of view when the periphery monitoring sensor 5a is a camera. The detection range of the periphery monitoring sensor 5a may be comparable to the scan angle when the periphery monitoring sensor 5a is a scanning distance measuring sensor. The detection range (forward detection range) ahead of the subject vehicle may be at least horizontally wider than a predetermined range described later. The forward detection range is not limited to one type of sensor. For example, the forward detection range may be a combination of detection ranges resulting from multiple types of sensors that provide different detection ranges.

The autonomous driving device 2a includes a processor, memory, I/O, and a bus connecting these, for example, and performs processes related to autonomous driving by executing a control program stored in the memory. The memory is a non-transitory tangible storage medium to permanently store computer-readable programs and data. The non-transitory tangible storage medium is available as semiconductor memory or a magnetic disk, for example. The details of the autonomous driving device 2a is described below.

<Outline Configuration of Autonomous Driving Device 2a>

The description below explains an outline configuration of the autonomous driving device 2a by reference to FIG. 5. As illustrated in FIG. 5, the autonomous driving device 2a includes functional blocks such as the vehicle position acquisition portion 21, a sensing information acquisition portion 22a, a map data acquisition portion 23a, the communication information acquisition portion 24, a travel environment recognition portion 25a, and an autonomous driving portion 26a. All or part of the functions executed by the autonomous driving device 2a may be configured as hardware through the use of one or more ICs, for example. All or part of the functional blocks included in the autonomous driving device 2a may be provided as a combination of software executed by the processor and hardware members. The autonomous driving device 2a is comparable to the in-vehicle device.

The vehicle position acquisition portion 21 and the communication information acquisition portion 24 are equal to the vehicle position acquisition portion 21 and the communication information acquisition portion 24 according to the first embodiment. The sensing information acquisition portion 22a acquires detection results (sensing information) successively detected by the periphery monitoring sensor 5a. The map data acquisition portion 23a acquires the map data stored in map DB 4a. The map data acquisition portion 23a may acquire map data around the subject vehicle depending on subject vehicle positions acquired by the vehicle position acquisition portion 21. It is favorable that the map data acquisition portion 23a acquires map data in a range wider than the detection range of the periphery monitoring sensor 5a.

The travel environment recognition portion 25a recognizes the travel environment of the subject vehicle based on subject vehicle positions acquired by the vehicle position acquisition portion 21, sensing information acquired by the sensing information acquisition portion 22a, map data acquired by the map data acquisition portion 23a, and information about surrounding vehicles acquired by the communication information acquisition portion 24, for example. Using these pieces of information, for example, the travel environment recognition portion 25a recognizes positions, shapes, sizes, or movement states of objects, and road markings positions around the subject vehicle and generates a virtual space that reproduces the actual travel environment.

It is favorable that the travel environment recognition portion 25a distinctively recognizes whether the peripheral object detected by the periphery monitoring sensor 5a is a moving object or a motionless object. It is favorable that the travel environment recognition portion 25a distinctively recognizes the types of peripheral objects. When the periphery monitoring sensor 5a includes a camera, for example, pattern matching may be performed on images captured by the camera to distinctively recognize the types of peripheral objects. The types may be recognized by distinguishing structures such as guardrails, fallen objects on the road, pedestrians, bicycles, motorcycles, or automobiles, for example. When the peripheral object is a car, the type of the peripheral object may be the vehicle class or car model. Whether the peripheral object is a moving object or a motionless object may be recognized according to the type of the peripheral object. For example, the peripheral object may be recognized as a motionless object when the type of the peripheral object is the structure or fallen object on the road. The peripheral object may be recognized as a moving object when the type of the peripheral object is the pedestrian, bicycle, motorcycle, or automobile. An object such as a parked vehicle is less likely to move immediately and may be recognized as a motionless object. The parked vehicle may be recognized based on the recognition that the vehicle stops and the brake lamp is not lit according to the image recognition.

From the sensing information acquired by the sensing information acquisition portion 22a, the travel environment recognition portion 25a recognizes at least peripheral objects and road markings within the forward detection range. From the sensing information acquired by the sensing information acquisition portion 22a, the travel environment recognition portion 25a may recognize the distance between the subject vehicle and a peripheral object, the relative speed of a peripheral object regarding the subject vehicle, and the shape and size of a peripheral object, for example, as the travel environment.

When the communication information acquisition portion 24 can acquire the information about a surrounding vehicle, the travel environment recognition portion 25a may recognize the travel environment by using the information about the surrounding vehicle. For example, the position, speed, acceleration, and yaw rate of the surrounding vehicle may be recognized from information about the position, speed, acceleration, and yaw rate of the surrounding vehicle. The identification information about the surrounding vehicle may be used to recognize the vehicle size or the performance information such as the maximum deceleration and the maximum acceleration. The vehicle size may represent size values such as the vehicle height, vehicle width, and vehicle length or may indicate vehicle classes, namely, classifications of different scales of these values.

The travel environment recognition portion 25a includes sub-functional blocks such as a leading vehicle identification portion 251a and a slope identification portion 252a. The leading vehicle identification portion 251a identifies the size of a leading vehicle regarding the subject vehicle. The leading vehicle regarding the subject vehicle may be assumed to be the nearest frontward vehicle the travel environment recognition portion 25a recognizes on the same lane as the subject vehicle's cruising lane. It may be possible to specify the leading vehicle size from the sensing information acquired by the sensing information acquisition portion 22a. Then, the leading vehicle identification portion 251a may identify the leading vehicle size from the sensing information. The communication information acquisition portion 24 may be able to determine the leading vehicle size by using the information acquired from the leading vehicle. Then, the leading vehicle identification portion 251a may identify the leading vehicle size from this information.

The leading vehicle identification portion 251a may identify the leading vehicle size assumed to be equal to the leading vehicle's vehicle class, vehicle height, or vehicle width recognized by the travel environment recognition portion 25a. The leading vehicle identification portion 251a may identify the leading vehicle size based on the classification such as the leading vehicle's car model or vehicle class recognized by the travel environment recognition portion 25a. The leading vehicle identification portion 251a may reference the correspondence relationship between the classification and values of vehicle height and vehicle width, for example, of the leading vehicle and identify the values of vehicle height and vehicle width, for example, of the leading vehicle as the leading vehicle size. In this case, the leading vehicle identification portion 251a may be able to use the correspondence relationship previously stored in the non-volatile memory of the autonomous driving device 2a.

The leading vehicle size identified by the leading vehicle identification portion 251a is assumed to maintain at least an approximate correlation with the leading vehicle width. The vehicle width favorably represents the leading vehicle size identified by the leading vehicle identification portion 251a. However, even the vehicle height, vehicle length, or vehicle class maintains an approximate correlation with the vehicle width. Therefore, the leading vehicle size may correspond to the vehicle height, vehicle length, or vehicle class, for example.

The slope identification portion 252a identifies whether the subject vehicle's cruising path is an uphill slope or a downhill slope. For example, the slope identification portion 252a may use map data acquired by the map data acquisition portion 23a, specifically, vertical slope data concerning the subject vehicle's cruising path to identify whether the subject vehicle's cruising path is an uphill slope or a downhill slope. For example, the vertical slope of the subject vehicle's cruising path may be greater than or equal to a threshold for distinguishing between flat roads and slopes. Then, the subject vehicle's cruising path may be identified as an uphill slope or a downhill slope. The vertical slope of the subject vehicle's cruising path may be smaller than the threshold. Then, the subject vehicle's cruising path may not be identified as an uphill slope or a downhill slope. In other words, the slope identification portion 252a may identify that the subject vehicle's cruising path is a slope.

The slope identification portion 252a may or may not distinctively identify whether the subject vehicle's cruising path is an uphill slope or a downhill slope. It is possible to reduce processing loads by an amount equal to the distinction when identifying whether the subject vehicle's cruising path is an uphill slope or a downhill slope, without distinction. The slope identification portion 252a may distinctively identify whether the subject vehicle's cruising path is an uphill slope or a downhill slope, based on a positive or negative value representing the transverse slope, for example.

The autonomous driving portion 26a performs processes concerning the replacement for driving operations by the driver. As illustrated in FIG. 5, the autonomous driving portion 26a includes sub-function blocks such as a travel planning portion 27a, a verification portion 28a, and an autonomous driving function portion 29a.

The travel planning portion 27a generates travel plans to run the subject vehicle based on autonomous driving by using the travel environment recognized by the travel environment recognition portion 25a. For example, the ravel planning portion 27a performs a route search process and generates, as a medium- to long-term travel plan, a recommended route from the subject vehicle position to the destination. To travel according to the medium- to long-term travel plan, short-term travel plans are generated to change lanes, travel the center of the lane, follow the leading vehicle, or avoid obstacles, for example. The travel planning portion 27a may generate travel plans by calculating a route maintaining a constant distance or the center from the recognized lane line or calculating a route corresponding to the behavior of the recognized leading vehicle or the vehicular swept path, for example. The travel planning portion 27a may generate travel plans by calculating routes estimated to be optimal by machine learning, for example. The travel planning portion 27a calculates one or more routes as short-term travel plans. For example, the travel planning portion 27a may allow a short-term travel plan to include acceleration/deceleration information for adjusting speeds on calculated routes.

The verification portion 28a evaluates the safety of travel plans generated by the travel planning portion 27a. To more easily evaluate the safety of travel plans, for example, the verification portion 28a may evaluate the safety of travel plans by using mathematical formula models described in the first embodiment. The verification portion 28 may evaluate the safety based on whether an object-to-object distance is greater than or equal to the safety distance. The object-to-object distance signifies a distance between the subject vehicle and surrounding objects. The safety distance signifies a distance that provides the basis for evaluating the safety between objects. The object-to-object distance may apply to at least a distance ahead of the subject vehicle in the front-back direction and the lateral direction, for example.

The verification portion 28a includes sub-function blocks such as a safety distance setting portion 281a and a safety distance adjustment portion 283a. The safety distance setting portion 281a may be similar to the safety distance setting portion 281 according to the first embodiment. Similar to the first embodiment, the safety distance setting portion 281a may use the RSS (Responsibility Sensitive Safety) model as a mathematical formula model, for example. The safety distance setting portion 281a sets at least a forward safety distance for the subject vehicle.

For example, the safety distance setting portion 281a may calculate the shortest possible distance for the subject vehicle to stop as the safety distance ahead of the subject vehicle as a reference based on the information about the subject vehicle's behavior. For example, take into account the speed, maximum acceleration, maximum deceleration, and response time of the subject vehicle. The subject vehicle travels forward at the maximum acceleration from the current vehicle speed during the response time and then decelerates at the maximum deceleration to stop. The distance traveled to stop the subject vehicle may be calculated as the forward safety distance. The speed, maximum acceleration, and maximum deceleration of the subject vehicle are assumed to apply in the front-back direction of the subject vehicle. The response time may be assumed to be a period from the time to issue an instruction to start operating the brake system to the time to start the operation when the autonomous driving stops the subject vehicle. As an example, the maximum acceleration, maximum deceleration, and response time of the subject vehicle may be previously stored in the non-volatile memory of the autonomous driving device 2 to be able to specify these. The safety distance setting portion 281a may set the forward safety distance as a reference also when no moving object is recognized but a motionless object is recognized ahead of the subject vehicle.

When recognizing the leading vehicle for the subject vehicle, the safety distance setting portion 281a may calculate the forward safety distance based on the information about the behavior of the subject vehicle and the leading vehicle. The forward safety distance is equal to a distance that enables the subject vehicle and the leading vehicle to stop without contact. For example, take into account the speed, maximum deceleration, and response time of the subject vehicle and the leading vehicle, and the maximum acceleration of the subject vehicle. The leading vehicle decelerates at the maximum deceleration from the current speed. The subject vehicle travels forward at the maximum acceleration from the current speed during the response time and then decelerates at the maximum deceleration. The distance enabling both to stop without contact may be calculated as the forward safety distance.

The communication information acquisition portion 24 may be able to acquire the speed, maximum acceleration, maximum deceleration, and response time of the moving object. Then, the safety distance setting portion 281a may use the information acquired by the communication information acquisition portion 24. Information recognized by the travel environment recognition portion 25a may be used if any. The non-volatile memory of the autonomous driving device 2a may previously store the maximum acceleration, maximum deceleration, and response time for leading vehicles as values for ordinary vehicles. The safety distance setting portion 281a may use the values for ordinary vehicles.

The safety distance adjustment portion 283a adjusts the safety distance set by the safety distance setting portion 281a. The slope identification portion 252a may identify whether the subject vehicle's cruising path is an uphill slope or a downhill slope. Then, the safety distance adjustment portion 283a increases the safety distance set by the safety distance setting portion 281a according to an increase in the leading vehicle size identified by the leading vehicle identification portion 251a regardless of whether the subject vehicle's cruising path is an uphill slope or a downhill slope. When the subject vehicle's cruising path is a slope, the safety distance set by the safety distance setting portion 281a increases according to an increase in the leading vehicle size identified by the leading vehicle identification portion 251a.

Figure 6:
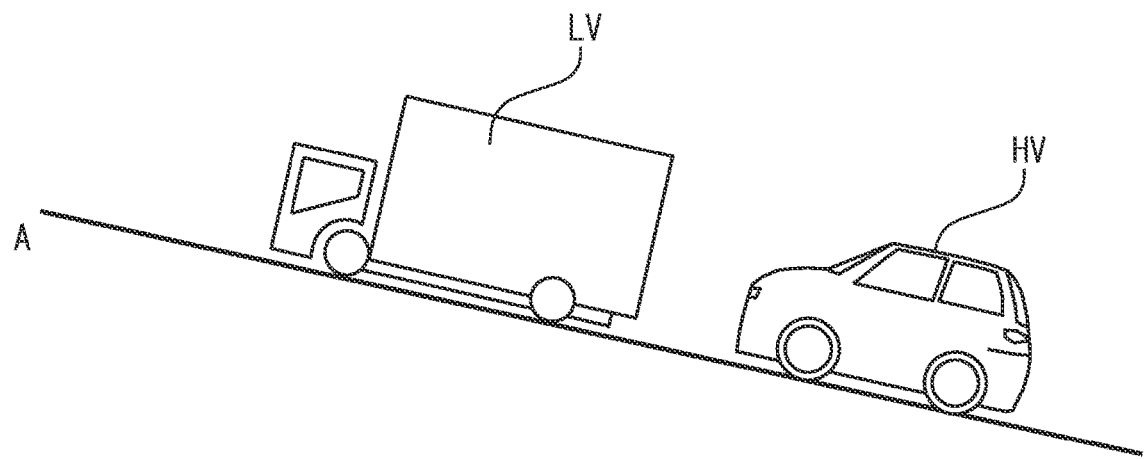
FIG. 6 is a diagram illustrating slopes.
Figure 6:
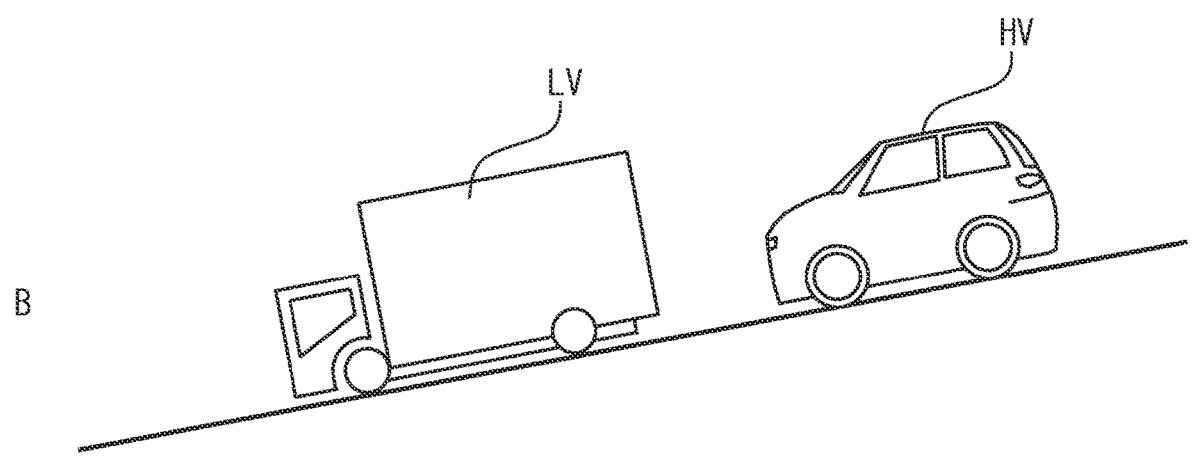

The description below uses FIG. 6. Reference symbol A in FIG. 6 illustrates an uphill slope and reference symbol B illustrates a downhill slope. Reference symbol HV in FIG. 6 denotes the subject vehicle and reference symbol LV denotes the leading vehicle. A braking distance tends to decrease as the leading vehicle size increases when the subject vehicle's cruising path is an uphill slope as illustrated by A in FIG. 6. This is because the vehicle weight tends to increase and the brake performance tends to increase as the leading vehicle size increases. It is favorable to increase the safety distance and thereby easily avoid an approach. A braking distance may increase or decrease as the leading vehicle size increases when the subject vehicle's cruising path is a downhill slope. This is because an increase in the vehicle weight may increase the braking distance or a decrease in the payload may decrease the braking distance due to the brake performance. From the viewpoint of risk reduction, it is favorable to increase the safety distance in case of a decreased braking distance and thereby easily avoid an approach.

The amount of increase in the safety distance according to the leading vehicle size may be determined through the use of the correspondence relationship between the leading vehicle size and the increase in the safety distance, for example. The correspondence relationship is previously stored in the non-volatile memory of the autonomous driving device 2. The safety distance may increase in proportion to the degree of decrease in the braking distance. The degree of decrease is assumed when the braking distance decreases depending on leading vehicle sizes. The slope identification portion 252a may distinctively identify whether the subject vehicle's cruising path is an uphill slope or a downhill slope. Then, it may be favorable to change the amount of increase in the safety distance according to the leading vehicle size depending on whether the subject vehicle's cruising path is an uphill slope or a downhill slope. In this case, the correspondence relationship between the leading vehicle size and the increase in the safety distance may be separated into the correspondence relationship for uphill slopes and the correspondence relationship for downhill slopes.

The safety distance adjustment portion 283a adjusts the subject vehicle's forward safety distance set by the safety distance setting portion 281a according to the leading vehicle size identified by the leading vehicle identification portion 251a. The forward safety distance is adjusted so that a leading vehicle range is smaller than or equal to the predetermined range. The leading vehicle range is defined as an angular range that is included in the detection range of the periphery monitoring sensor 5a and is estimated to encompass the leading vehicle. The leading vehicle range varies with the leading vehicle width. More favorably, the leading vehicle range corresponds to a horizontal angular range, for example. However, an increase in the vehicle size may often increase both the vehicle width and the vehicle height. Therefore, the leading vehicle range can correspond to a vertical angular range.

Figure 7:
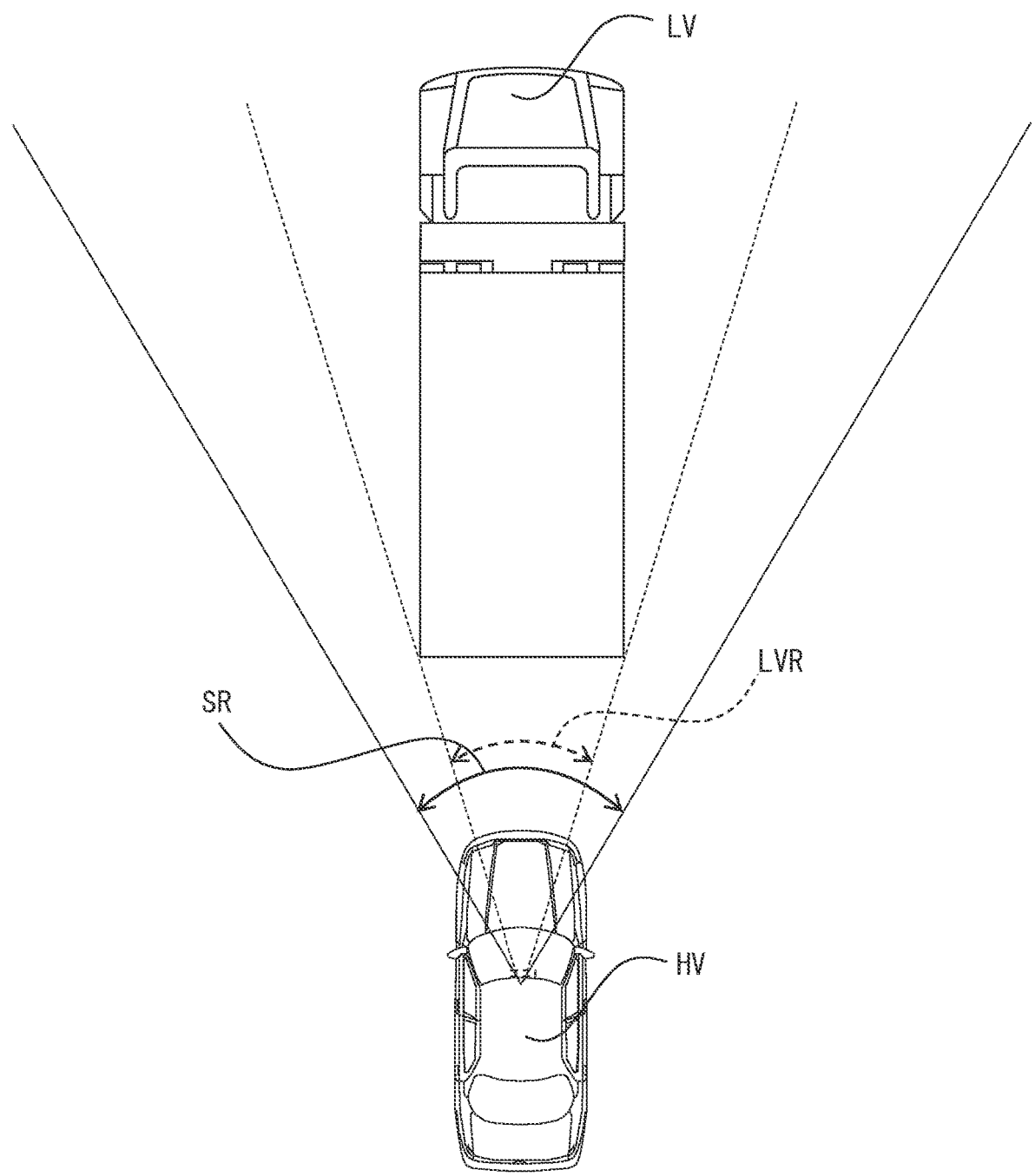
FIG. 7 is a diagram illustrating a leading vehicle range.

As illustrated in FIG. 7, the description below explains examples where the leading vehicle range corresponds to a horizontal angular range. In FIG. 7, HV denotes the subject vehicle, LV denotes the leading vehicle, SR denotes the detection range of the periphery monitoring sensor 5a, and LVR denotes the leading vehicle range.

The vehicle width increases as the leading vehicle size increases. The leading vehicle range increases as the leading vehicle size increases even if the same inter-vehicular distance is maintained between the subject vehicle and the leading vehicle. However, an increase in the leading vehicle range increases part of the detection range of the periphery monitoring sensor 5a hindered by the leading vehicle. It is likely to delay the detection of moving objects rushing out of anterolateral sides. Contrastingly, the present embodiment keeps the leading vehicle range smaller than or equal to the predetermined range regardless of leading vehicle sizes, hardly causing a delay in the detection of moving objects rushing out of anterolateral sides.

The safety distance adjustment portion 283a may specify a size-dependent distance based on the leading vehicle size specified by the leading vehicle identification portion 251a. The size-dependent distance is equal to a distance that allows the leading vehicle range to be smaller than or equal to the predetermined range. For example, the size-dependent distance can be specified through the use of the correspondence relationship between the leading vehicle size and the size-dependent distance. This correspondence relationship can be previously stored in the non-volatile memory of the autonomous driving device 2. The correspondence relationship between the leading vehicle size and the size-dependent distance may be previously acquired by experiments or simulations, for example.

For example, the predetermined range may be assumed to be equal to an angular range that allows the leading vehicle to enter the detection range of the periphery monitoring sensor 5a as frequently as a threshold number of times or more during the manual operation by a model driver. The model driver signifies a driver who drives safely. For example, the model driver drives by increasing the inter-vehicular distance to the leading vehicle as the leading vehicle size increases to respond to moving objects rushing out of the anterolateral side. For example, the predetermined range may be configured as an angular range of 20 to 40 degrees ahead of the subject vehicle.

The size-dependent distance may become smaller than the safety distance set by the safety distance setting portion 281a. In such a case, it is favorable that the safety distance adjustment portion 283a does not change the safety distance set by the safety distance setting portion 281a depending on the leading vehicle size identified by the leading vehicle identification portion 251a. In other words, it is favorable that the safety distance adjustment portion 283a does not adjust the safety distance set by the safety distance setting portion 281a to the size-dependent distance when the size-dependent distance becomes smaller than the safety distance set by the safety distance setting portion 281a. This is because the adjustment to decrease the safety distance is unfavorable even when the size-dependent distance becomes smaller than the safety distance set by the safety distance setting portion 281a.

Contrastingly, the size-dependent distance may become larger than or equal to the safety distance set by the safety distance setting portion 281a. In such a case, the safety distance adjustment portion 283a may increase the safety distance set by the safety distance setting portion 281a as the leading vehicle size identified by the leading vehicle identification portion 251a increases. In other words, the safety distance adjustment portion 283a may adjust the safety distance set by the safety distance setting portion 281a to the size-dependent distance when the size-dependent distance becomes larger than or equal to the safety distance set by the safety distance setting portion 281a. It is possible to adjust the safety distance to the size-dependent distance and provide the safety distance with a margin corresponding to the leading vehicle size only when the size-dependent distance is greater than or equal to the safety distance set by the safety distance setting portion 281a.

There may be a system in which the size-dependent distance cannot be smaller than the safety distance set by the safety distance setting portion 281a. In such a case, the safety distance may be adjusted to the size-dependent distance regardless of whether the size-dependent distance is smaller than the safety distance set by the safety distance setting portion 281a. Moreover, there may be another case of permitting the size-dependent distance to be smaller than the safety distance set by the safety distance setting portion 281a. Also in such a case, the safety distance may be adjusted to the size-dependent distance regardless of whether the size-dependent distance is smaller than the safety distance set by the safety distance setting portion 281a.

The object-to-object distance may be larger than or equal to the safety distance set by the safety distance setting portion 281a. Then, the verification portion 28a may evaluate the travel plan generated by the travel planning portion 27a as being safe. Contrastingly, the object-to-object distance may be smaller than the safety distance. Then, the verification portion 28a may evaluate the travel plan generated by the travel planning portion 27a as being unsafe. The verification portion 28a may output the travel plan to the autonomous driving function portion 29a based on the evaluation that the travel plan is safe. The verification portion 28a may correct the travel plan evaluated as being unsafe so that the travel plan is evaluated as being safe and is output to the autonomous driving function portion 29a. When the travel planning portion 27a calculates a route, whether to use this route for autonomous driving is determined based on whether the object-to-object distance is larger than or equal to the safety distance.

The autonomous driving function portion 29a allows the vehicle control ECU 6 to automatically accelerate/decelerate and/or steer the subject vehicle according to the travel plan output from the verification portion 28a, thereby effectuating the replacement (autonomous driving) for driving operations by the driver. The autonomous driving function portion 29a performs the autonomous driving according to the travel plan the verification portion 28a evaluates as being used for the autonomous driving. The object-to-object distance may become smaller than the safety distance set by the safety distance setting portion 281a. Then, the autonomous driving function portion 29a automatically performs swerving action to avoid an approach between the subject vehicle and obstacles. When the object-to-object distance is smaller than the safety distance, the autonomous driving function portion 29a ensures the safety distance or more by braking the subject vehicle, for example. The safety distance adjustment portion 283a may adjust the safety distance set by the safety distance setting portion 281a. Then, the autonomous driving function portion 29a automatically performs swerving action to avoid an approach between the subject vehicle and obstacles when the object-to-object distance becomes smaller than the safety distance adjusted by the safety distance adjustment portion 283a.

<Safety Distance Adjustment Process in the Autonomous Driving Device 2a>

Figure 8:
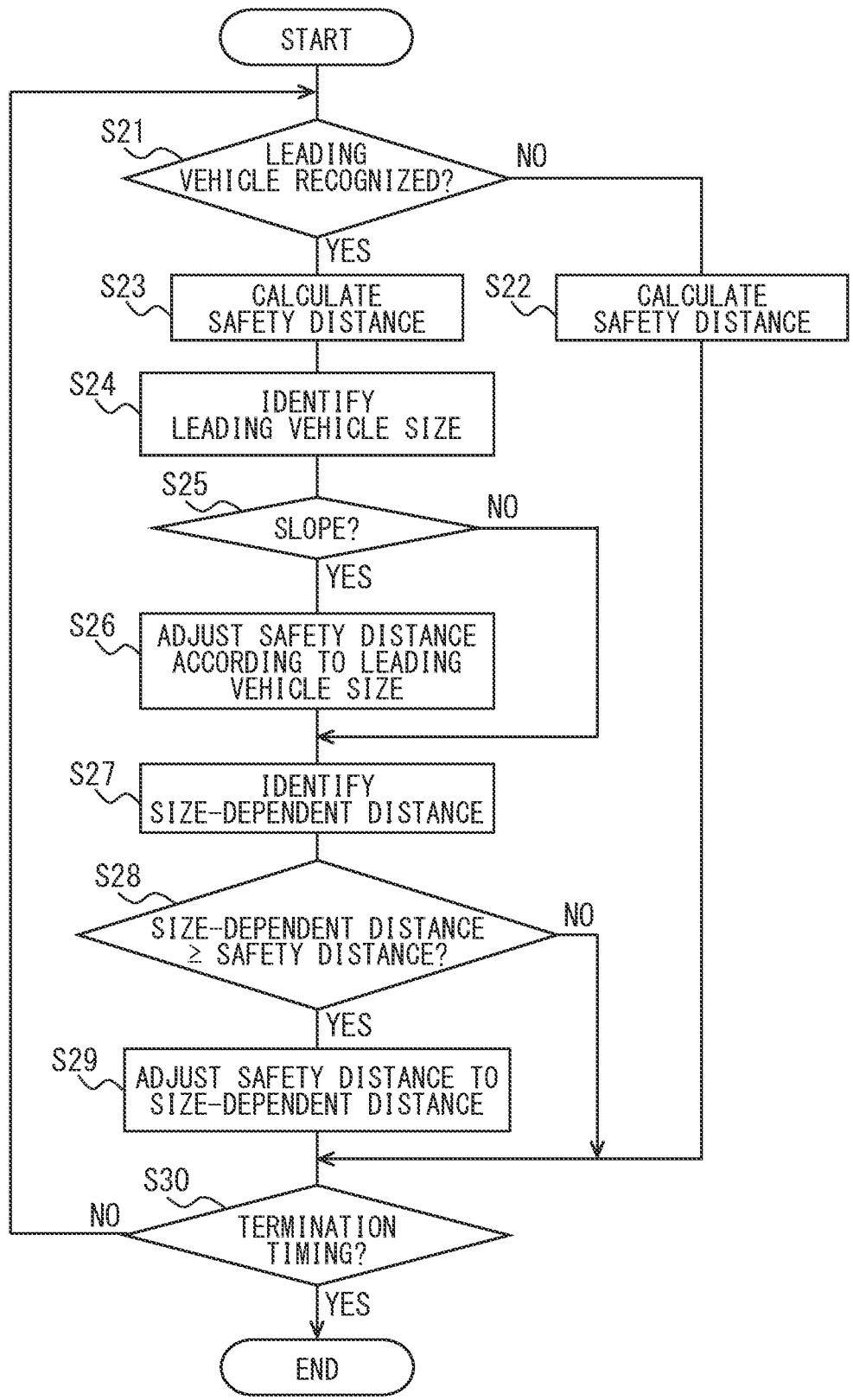
FIG. 8 is a flowchart illustrating a flow of a safety distance adjustment process in the autonomous driving device.

The flowchart in FIG. 8 is used to explain an example flow of the process (safety distance adjustment process) related to the safety distance adjustment in the autonomous driving device 2a. Execution of steps included in the safety distance adjustment process by the computer is comparable to execution of the driving assist method.

The flowchart in FIG. 8 may start when the subject vehicle's power switch is turned on to start the autonomous driving. It may be possible to switch between manual operation and autonomous driving of the subject vehicle. In this case, the flowchart may start when the power switch is turned on while the autonomous driving is enabled. Moreover, the flowchart may start when the setting to perform autonomous driving during manual operation is enabled and the manual operation changes to the autonomous driving. The flowchart in FIG. 8 assumes that the travel environment recognition portion 25a successively recognizes the subject vehicle's travel environment.

At step S21, the traveling environment recognition portion 25a may recognize a leading vehicle (YES at S21). Then, the process proceeds to step S23. The traveling environment recognition portion 25a may not recognize any leading vehicle (NO at S21). Then, the process proceeds to step S22.

At step S22, the safety distance setting portion 281a calculates the forward safety distance based on the information about the subject vehicle behavior. The forward safety distance is assumed to be the shortest distance to stop the subject vehicle, for example. The calculated safety distance is set as the forward safety distance for the subject vehicle. Then, the process proceeds to step S30. At step S23, the safety distance setting portion 281a calculates the forward safety distance based on the information about the behavior of the subject vehicle and the leading vehicle. The forward safety distance is assumed to be a distance enabling the subject vehicle and the leading vehicle to stop without contact. The calculated safety distance is set as the forward safety distance for the subject vehicle. Then, the process proceeds to step S24.

At step S24, the leading vehicle identification portion 251a identifies the size of the recognized leading vehicle. The process at S24 may be performed before the process at S23. The process at S24 may be performed concurrently with the recognition of the leading vehicle in the travel environment recognition portion 25a.

At step S25, the subject vehicle's cruising path may be a slope (YES at S25). Then, the process proceeds to step S26. The subject vehicle's cruising path may not be a slope (NO at S25). Then, the process proceeds to step S27. For example, the slope identification portion 252a may identify that the subject vehicle's cruising path is either an uphill slope or a downhill slope. In this case, the subject vehicle's cruising path may be assumed to be a slope. The slope identification portion 252a may not identify that the subject vehicle's cruising path is either an uphill slope or a downhill slope. In this case, the subject vehicle's cruising path may not be assumed to be a slope.

At step S26, the safety distance adjustment portion 283a performs adjustment to increase the safety distance set by the safety distance setting portion 281a as the leading vehicle size specified at S24 increases. At step S27, the safety distance adjustment portion 283a identifies the size-dependent distance that allows the leading vehicle range to be smaller than or equal to the predetermined range based on the leading vehicle size specified at S24.

At step S28, the size-dependent distance specified at S27 may be larger than or equal to the safety distance set by the safety distance setting portion 281a (YES at S28). Then, the process proceeds to step S29. The size-dependent distance specified at S27 may be smaller than the safety distance set by the safety distance setting portion 281a (NO at S28). Then, the process proceeds to step S30. If the subject vehicle's cruising path is determined to be a slope at S25, the safety distance compared with the size-dependent distance at S28 is equal to the safety distance that is set at S23 and is adjusted at S26. If the subject vehicle's cruising path is determined not to be a slope at S25, the safety distance compared with the size-dependent distance at S28 is equal to the safety distance set at S23.

At step S29, the safety distance adjustment portion 283a adjusts the safety distance set by the safety distance setting portion 281a to the size-dependent distance specified at S27. At step S30, the safety distance adjustment process may reach the termination timing (YES at S30). Then, the safety distance adjustment process terminates. The safety distance adjustment process may not reach the termination timing (NO at S30). Then, the process returns to step S21 and is repeated. Examples of the termination timing of the safety distance adjustment process include turning off the power switch of the subject vehicle or changing the operation to the manual operation. The flowchart of FIG. 8 is just an example, and the order of the process may be partially changed.

Overview of the Fourth Embodiment

The fourth embodiment adjusts the forward safety distance intended for the subject vehicle to the size-dependent distance according to the leading vehicle size. The size-dependent distance allows the leading vehicle range to be smaller than or equal to the predetermined range. The leading vehicle range is comparable to an angular range that is included in the detection range of the periphery monitoring sensor 5a and is estimated to encompass the leading vehicle. The safety distance is the minimum distance between the vehicle and an obstacle to avoid an approach between the vehicle and the obstacle. It is possible to provide the distance to the leading vehicle so that at least the leading vehicle range is maintained not to be smaller than or equal to the predetermined range. When the leading vehicle range is maintained not to be smaller than or equal to the predetermined range, it is possible to inhibit an extent of the leading vehicle that hinders the detection range of the periphery monitoring sensor 5a. Even if the leading vehicle is horizontally wide, the periphery monitoring sensor 5a can easily detect moving objects rushing out of the anterolateral side. Consequently, it is possible to more easily avoid an approach to moving objects.

Fifth Embodiment

According to the configuration of the fourth embodiment, the slope identification portion 252a may identify whether the subject vehicle's cruising path is an uphill slope or a downhill slope. In such a case, the safety distance adjustment portion 283a may increase the safety distance set by the safety distance setting portion 281a as the leading vehicle size identified by the leading vehicle identification portion 251a increases. However, the configuration is not limited thereto. For example, it is possible to dismiss the above-described process that depends on identification results from the slope identification portion 252a. In this case, the autonomous driving device 2a may exclude the slope identification portion 252a. The process at S25 and S26 may be omitted from the flowchart in FIG. 8.

Sixth Embodiment

According to the configuration of the fourth embodiment, the vehicle system 1a is used for autonomous driving vehicles that perform the autonomous driving of automation level 3 or higher. However, the configuration is not limited thereto. For example, the vehicle system 1a may be used for autonomous driving vehicles corresponding to automation level 2 or lower.

For example, suppose the vehicle system 1a is used for autonomous driving vehicles that perform the operation assistance of automation level 1 or 2. The acceleration/deceleration is automatically performed so that the inter-vehicular distance to the leading vehicle satisfies a predetermined value. This inter-vehicular distance may be replaced with the above-described safety distance. Even in this case, the periphery monitoring sensor 5a can easily detect moving objects rushing out of the anterolateral side by increasing the inter-vehicular distance according to the leading vehicle size. Consequently, it is possible to more easily avoid an approach to moving objects.

Suppose the vehicle system 1a is used for autonomous driving vehicles corresponding to automation level 0. Special attention is given when the inter-vehicular distance to the leading vehicle becomes smaller than or equal to a predetermined value. This inter-vehicular distance may be replaced with the above-described safety distance. Even in this case, the driver can easily notice moving objects rushing out of the anterolateral side at an earlier time by increasing the inter-vehicular distance as a condition to give attention according to the leading vehicle size. Consequently, it is possible to more easily avoid an approach to moving objects.

Seventh Embodiment

Figure 9:
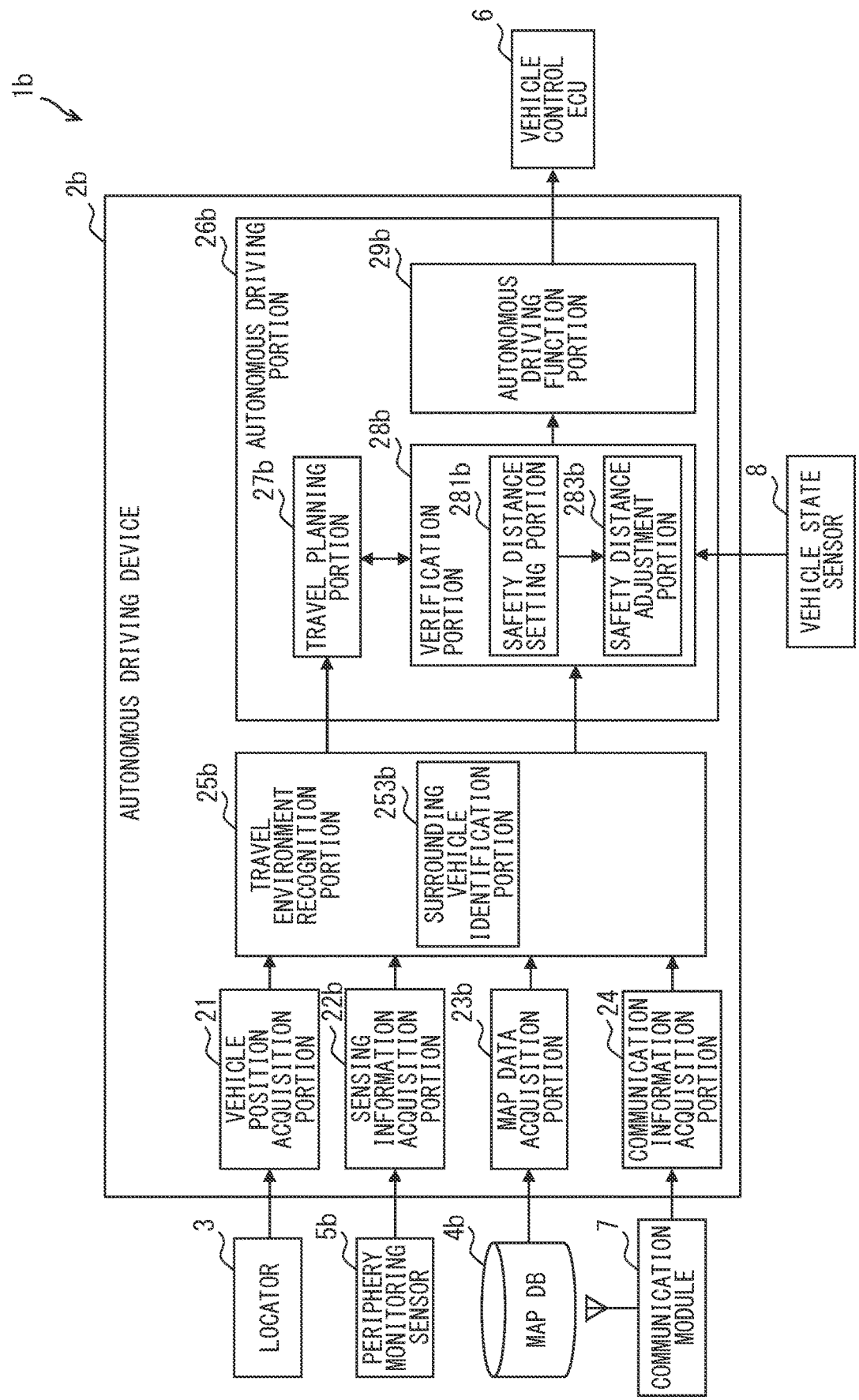
FIG. 9 is a diagram illustrating a schematic configuration of a vehicle system and an autonomous driving device.

The description below explains the seventh embodiment of the present disclosure by reference to the drawings. A vehicle system 1b illustrated in FIG. 9 is used for an autonomous driving vehicle. The autonomous driving vehicle is interpreted similarly to the first embodiment. The seventh embodiment may use the vehicle system 1b for autonomous driving vehicles performing the autonomous driving of automation level 3 or higher, for example.

As illustrated in FIG. 9, the vehicle system 1b includes an autonomous driving device 2b, the locator 3, a map DB 4b, a periphery monitoring sensor 5b, the vehicle control ECU 6, the communication module 7, and the vehicle state sensor 8. Vehicles that use the vehicle system 1b are not necessarily limited to automobiles. However, the description below explains examples of using the vehicle system 1b for automobiles. The locator 3, the vehicle control ECU 6, the communication module 7, and the vehicle state sensor 8 may be interpreted similarly to the first embodiment, for example.

The map DB 4b is similar to the map DB 4 according to the first embodiment except that the map data also contains curvature data as road shape data, for example. The curvature data may include at least link-based data or data between shape interpolation points on the road, for example. The curvature data may be calculated from shape interpolation points, for example.

The periphery monitoring sensor 5b is similar to the periphery monitoring sensor 5 according to the first embodiment except that the detection range includes a predetermined range ahead of the subject vehicle and/or sideways of the subject vehicle. The description below explains examples where the periphery monitoring sensor 5b allows the detection range to include a predetermined range ahead of the subject vehicle and sideways of the subject vehicle. The detection range ahead of the subject vehicle is favorably at least horizontally wider than the predetermined range described in the fourth embodiment, but not limited thereto.

The autonomous driving device 2b includes a processor, memory, I/O, and a bus connecting these, for example, and performs processes related to autonomous driving by executing a control program stored in the memory. The memory is a non-transitory tangible storage medium to permanently store computer-readable programs and data. The non-transitory tangible storage medium is available as semiconductor memory or a magnetic disk, for example. The details of the autonomous driving device 2b is described below.

<Outline Configuration of Autonomous Driving Device 2b>

The description below explains an outline configuration of the autonomous driving device 2b by reference to FIG. 9. As illustrated in FIG. 9, the autonomous driving device 2b includes functional blocks such as the vehicle position acquisition portion 21, a sensing information acquisition portion 22b, a map data acquisition portion 23b, the communication information acquisition portion 24, a travel environment recognition portion 25b, and an autonomous driving portion 26b. All or part of the functions executed by the autonomous driving device 2b may be configured as hardware through the use of one or more ICs, for example. All or part of the functional blocks included in the autonomous driving device 2b may be provided as a combination of software executed by the processor and hardware members. The autonomous driving device 2b is comparable to the in-vehicle device.

The vehicle position acquisition portion 21 and the communication information acquisition portion 24 are equal to the vehicle position acquisition portion 21 and the communication information acquisition portion 24 according to the first embodiment. The sensing information acquisition portion 22b acquires detection results (sensing information) successively detected by the periphery monitoring sensor 5b. The map data acquisition portion 23b is similar to the map data acquisition portion 23a according to the fourth embodiment except for the acquisition of map data stored in the map DB 4b instead of the map DB 4a.

The travel environment recognition portion 25b is similar to the travel environment recognition portion 25a according to the fourth embodiment except for some processes. The travel environment recognition portion 25b according to the present embodiment recognizes the subject vehicle's travel environment similar to the travel environment recognition portion 25b according to the fourth embodiment. To do this, however, the travel environment recognition portion 25b uses sensing information acquired by the sensing information acquisition portion 22b in place of the sensing information acquisition portion 22a and map data acquired by the map data acquisition portion 23b in place of the map data acquisition portion 23a. The travel environment recognition portion 25b recognizes at least peripheral objects and road markings in the detection range ahead of and sideways of the subject vehicle based on the sensing information acquired by the sensing information acquisition portion 22b.

The travel environment recognition portion 25b includes a surrounding vehicle identification portion 253b as a sub-function block. The surrounding vehicle identification portion 253b identifies the size of a surrounding vehicle around the subject vehicle. The surrounding vehicle size may be identified from the sensing information acquired by the sensing information acquisition portion 22b. Then, the surrounding vehicle identification portion 253b may identify the surrounding vehicle size from this sensing information. The communication information acquisition portion 24 may identify the surrounding vehicle size by using the information acquired from the surrounding vehicle. Then, the surrounding vehicle identification portion 253b may identify the surrounding vehicle size from this information.

The surrounding vehicle identification portion 253b may identify the surrounding vehicle size assumed to be equal to the surrounding vehicle's vehicle class or vehicle length recognized by the travel environment recognition portion 25b. The surrounding vehicle identification portion 253b may identify the surrounding vehicle size based on the classification such as the surrounding vehicle's car model or vehicle class recognized by the travel environment recognition portion 25b. The surrounding vehicle identification portion 253b may reference the correspondence relationship between the classification and values of vehicle length, for example, of the surrounding vehicle, and identify the values of vehicle length, for example, of the surrounding vehicle as the surrounding vehicle size. In this case, the surrounding vehicle identification portion 253b may be able to use the correspondence relationship previously stored in the non-volatile memory of the autonomous driving device 2b.

The surrounding vehicle size identified by the surrounding vehicle identification portion 253b is assumed to maintain at least an approximate correlation with the surrounding vehicle length. The vehicle length favorably represents the surrounding vehicle size identified by the surrounding vehicle identification portion 253b. However, even the vehicle height, vehicle width, or vehicle class maintains an approximate correlation with the vehicle length. The surrounding vehicle size may correspond to the vehicle height, vehicle width, or vehicle class, for example.

The autonomous driving portion 26b performs processes concerning the replacement for driving operations by the driver. As illustrated in FIG. 9, the autonomous driving portion 26b includes sub-function blocks such as a travel planning portion 27b, a verification portion 28b, and an autonomous driving function portion 29b.

The travel planning portion 27b is similar to the travel planning portion 27a according to the fourth embodiment except for the generation of travel plans to drive the subject vehicle according to autonomous driving through the use of the travel environment recognized by the travel environment recognition portion 25b in place of the travel environment recognition portion 25a.

The verification portion 28b evaluates the safety of travel plans generated by the travel planning portion 27b. For example, the verification portion 28b may evaluate the travel plan safety by using the mathematical formula model as described in the fourth embodiment. According to the present embodiment, the object-to-object distance may apply to distances from the subject vehicle in the front-back direction and the lateral direction, for example.

The verification portion 28b includes sub-function blocks such as a safety distance setting portion 281b and a safety distance adjustment portion 283b. The safety distance setting portion 281b may be similar to the safety distance setting portion 281 according to the first embodiment. Similar to the first embodiment, the safety distance setting portion 281b may use an RSS (Responsibility Sensitive Safety) model as a mathematical formula model, for example. The safety distance setting portion 281b sets at least the safety distance ahead of and to the right and left (sideways) of the subject vehicle.

Similar to the safety distance setting portion 281 according to the first embodiment, for example, the safety distance setting portion 281a may calculate the shortest possible distance for the subject vehicle to stop as the safety distance ahead of the subject vehicle as a reference based on the information about the subject vehicle's behavior. Similar to the safety distance setting portion 281 according to the first embodiment, when a moving object is recognized ahead of the subject vehicle, the safety distance setting portion 281b may calculate the forward safety distance, namely, a distance that enables the subject vehicle and the forward moving object to stop without contact based on the information about the behavior of the subject vehicle and the forward moving object.

Similar to the safety distance setting portion 281 according to the first embodiment, the safety distance setting portion 281b may calculate the safety distance in the lateral direction as a reference from the subject vehicle based on the behavior information about the subject vehicle. In this case, the safety distance is equal to the shortest distance traveled by the subject vehicle in the lateral direction until the horizontal speed can be zeroed. Similar to the safety distance setting portion 281 according to the first embodiment, when a moving object is recognized in the lateral direction of the subject vehicle, the safety distance setting portion 281b may calculate the safety distance in the direction toward the moving object based on the information about the behavior of the subject vehicle and the moving object. In this case, the safety distance is equal to a distance traveled by the subject vehicle and the moving object in the lateral direction until the horizontal speeds of the subject vehicle and the moving object can be zeroed without contact.

The safety distance adjustment portion 283b adjusts the safety distance set by the safety distance setting portion 281b. The safety distance adjustment portion 283b adjusts the safety distance set by the safety distance setting portion 281b ahead of and/or to the right and left of the subject vehicle according to the surrounding vehicle size identified by the surrounding vehicle identification portion 253b. In this case, the safety distance is adjusted so that subject vehicle does not enter a range estimated to be occupied by the surrounding vehicle making a turn.

For example, the safety distance adjustment portion 283b specifies a required distance based on the leading vehicle size identified by the surrounding vehicle identification portion 253b. The required distance needs to be ensured to prevent an entry into the range estimated to be occupied by the surrounding vehicle making a turn. For example, the safety distance adjustment portion 283b may specify the required distance by using the correspondence relationship between the surrounding vehicle size and the required distance previously stored in the non-volatile memory of the autonomous driving device 2b. The correspondence relationship between the surrounding vehicle size and the required distance may be previously acquired by experiments or simulations, for example.

When the surrounding vehicle makes a turn, the range estimated to be occupied by the surrounding vehicle depends on the situation while the surrounding vehicle turns. Therefore, the safety distance adjustment portion 283b may specify the required distance including a margin large enough to be capable of satisfying multiple situations. The safety distance adjustment portion 283b may specify the required distance according to situations when the surrounding vehicle makes a turn. In this case, it may be favorable to use the correspondence relationship between the surrounding vehicle size and the required distance corresponding to the situations. The situations of the surrounding vehicle making a turn include turning at intersections and curved roads, for example. It is favorable to vary the situations of the surrounding vehicle making a turn depending on whether the surrounding vehicle makes a right or left turn. The situation of the surrounding vehicle making a turn may be estimated from the travel environment recognized by the travel environment recognition portion 25b. In terms of turning at curved roads, it may be favorable to specify the required distance corresponding to each of the curvature radiuses for curves. In terms of turning at intersections, the required distance may be specified on the assumption that a turning angle is 90 degrees, for example.

Figure 10:
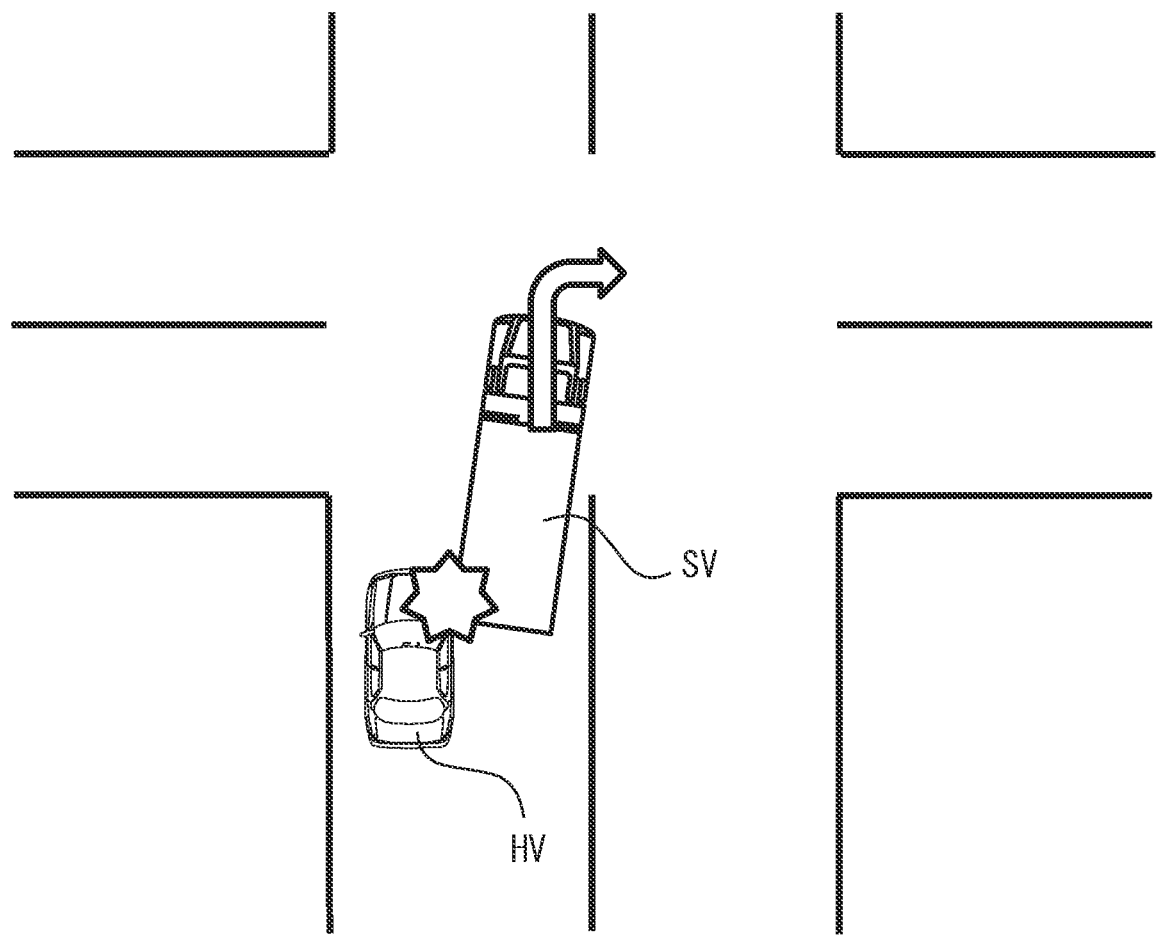
FIG. 10 is a diagram illustrating a situation where a surrounding vehicle makes a turn.
Figure 11:
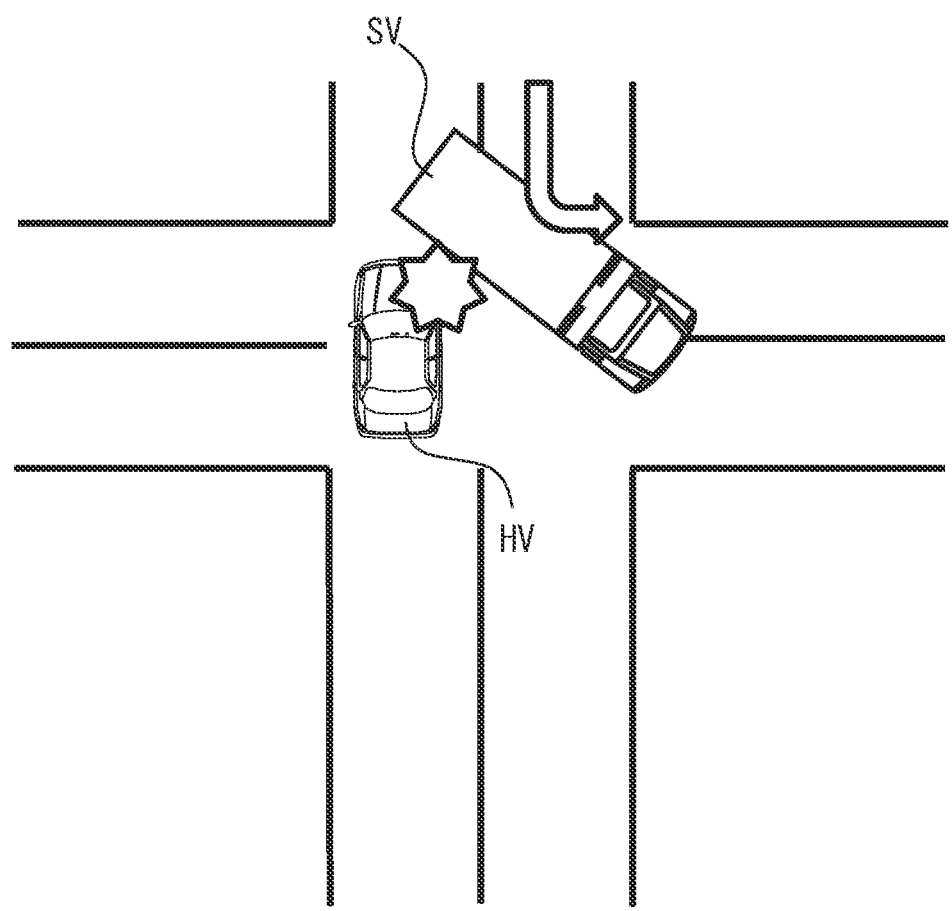
FIG. 11 is a diagram illustrating a situation where a surrounding vehicle makes a turn.

FIGS. 10 through 14 illustrate the situations of the surrounding vehicle making a turn. In FIGS. 10 through 14, HV denotes the subject vehicle and SV denotes the surrounding vehicle. FIG. 10 illustrates an example where the surrounding vehicle SV makes a right turn at an intersection. The surrounding vehicle SV is assumed to be a parallel traveling vehicle regarding the subject vehicle HV. According to the example of FIG. 10, depending on the length of the surrounding vehicle SV, the body of the surrounding vehicle SV may largely swing to the left of the surrounding vehicle SV, possibly causing an approach to the subject vehicle HV. FIG. 11 illustrates an example where the surrounding vehicle SV makes a left turn at an intersection. The surrounding vehicle SV is assumed to be an oncoming vehicle regarding the subject vehicle HV. According to the example of FIG. 11, depending on the length of the surrounding vehicle SV, the body of the surrounding vehicle SV may largely swing to the right of the surrounding vehicle SV, possibly causing an approach to the subject vehicle HV.

Figure 12:
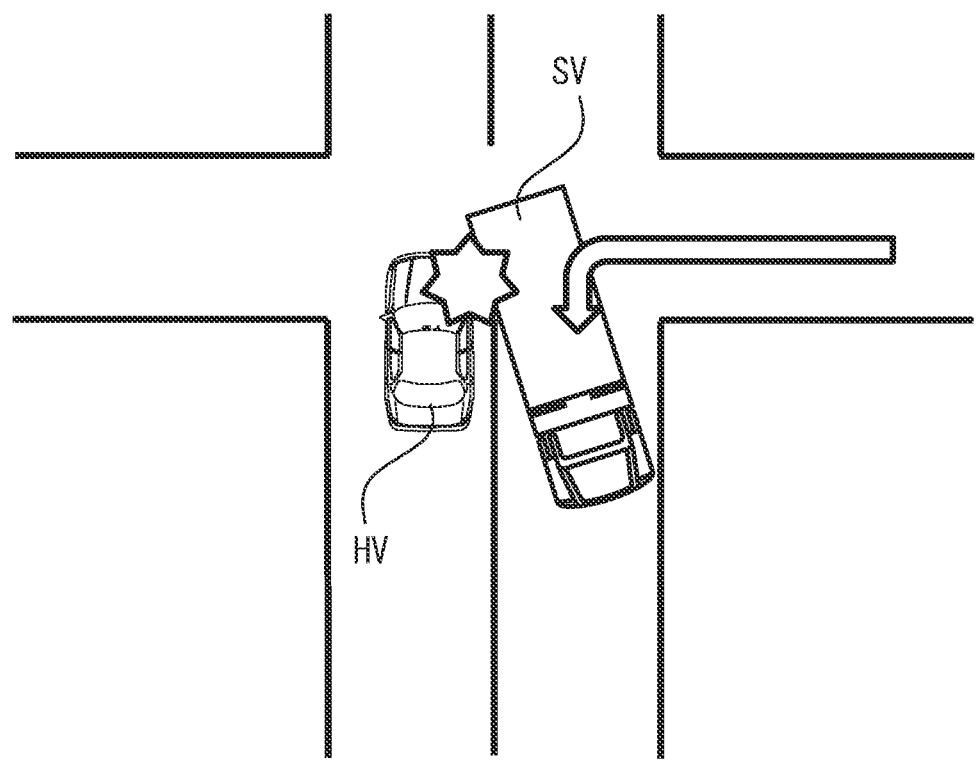
FIG. 12 is a diagram illustrating a situation where a surrounding vehicle makes a turn.
Figure 13:
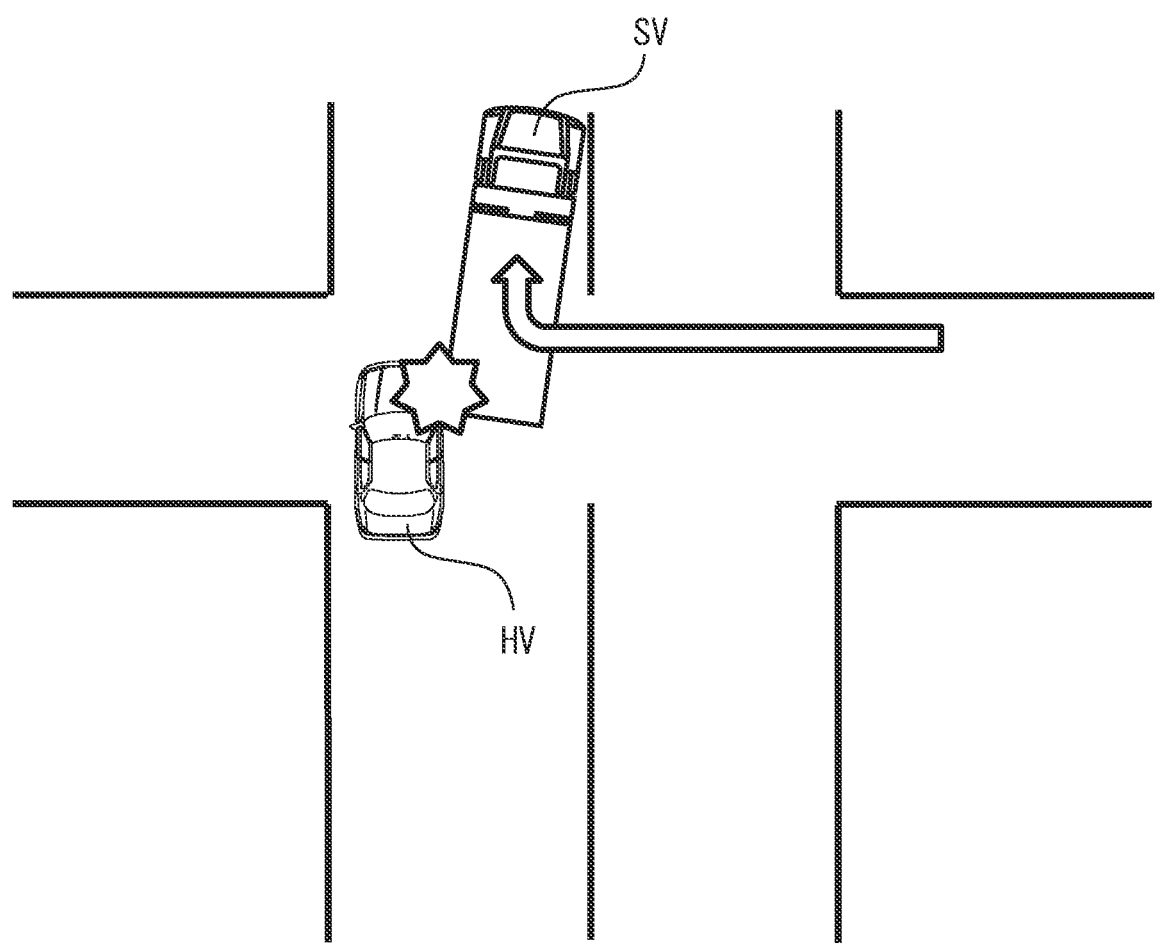
FIG. 13 is a diagram illustrating a situation where a surrounding vehicle makes a turn.
Figure 14:
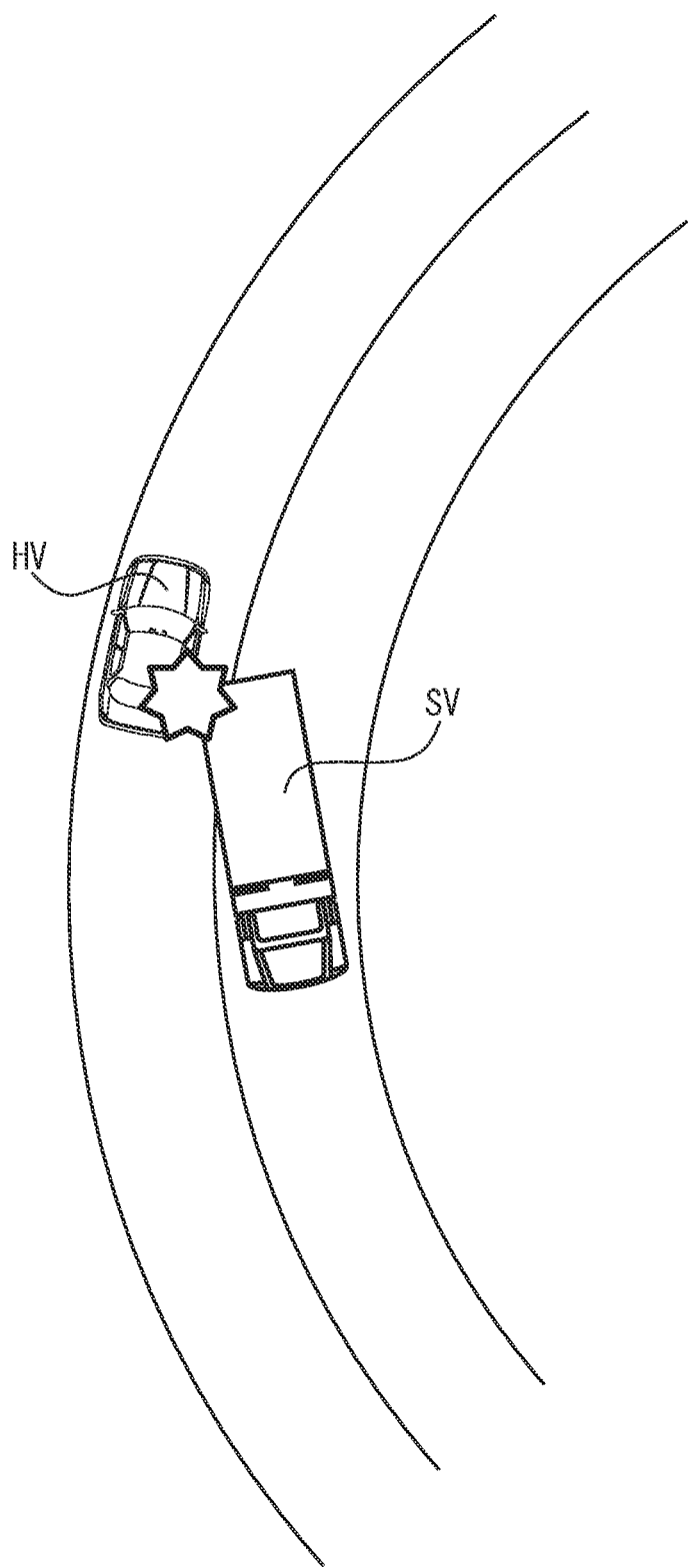
FIG. 14 is a diagram illustrating a situation where a surrounding vehicle makes a turn.

FIG. 12 shows an example where the surrounding vehicle SV makes a left turn to enter the lane adjacent to the subject vehicle HV. According to the example of FIG. 12, depending on the length of the surrounding vehicle SV, the body of the surrounding vehicle SV may largely swing to the right of the surrounding vehicle SV, possibly causing an approach to the subject vehicle HV. FIG. 13 shows an example where the surrounding vehicle SV makes a right turn to enter the lane adjacent to the subject vehicle HV. According to the example of FIG. 13, depending on the length of the surrounding vehicle SV, the body of the surrounding vehicle SV may largely swing to the left of the surrounding vehicle SV, possibly causing an approach to the subject vehicle HV. FIG. 14 shows an example where the surrounding vehicle SV makes a left turn to pass through a left-hand curve. The surrounding vehicle SV is assumed to be an oncoming vehicle for the subject vehicle HV. According to the example of FIG. 14, depending on the length of the surrounding vehicle SV, the body of the surrounding vehicle SV may largely swing to the right of the surrounding vehicle SV, possibly causing an approach to the subject vehicle HV.

The required distance may be smaller than the safety distance set by the safety distance setting portion 281b. Then, the safety distance adjustment portion 283b may maintain the safety distance set by the safety distance setting portion 281b. This is because, if the safety distance is satisfied, the required distance can also be satisfied. The required distance may be larger than or equal to the safety distance set by the safety distance setting portion 281b. Then, the safety distance adjustment portion 283b adjusts the safety distance set by the safety distance setting portion 281b to the required distance. Therefore, it is possible to adjust the safety distance to the required distance and provide the safety distance with a margin according to the surrounding vehicle size only when the required distance is larger than or equal to the safety distance set by the safety distance setting portion 281b.

There may exist surrounding vehicles necessitating the required distance in more than one of the directions such as ahead of and to the right and left of the subject vehicle. In this case, the safety distance adjustment portion 283b may perform the above-described processes on the safety distances set by the safety distance setting portion 281b corresponding to those directions by using the required distances for the surrounding vehicles identified in the corresponding directions.

There may exist multiple surrounding vehicles necessitating the required distance in the same direction such as ahead of or to the left or right of the subject vehicle. In this case, the safety distance adjustment portion 283b may perform the above-described processes on the safety distance set by the safety distance setting portion 281b corresponding to the direction by using the longest required distance for the surrounding vehicles.

The safety distance adjusted using the required distance may be applied to all or part of directions ahead of and to the left and right of the subject vehicle. When the surrounding vehicle makes a turn as illustrated in FIGS. 10 through 14, for example, a margin needs to be provided for the safety distance on the right or left of the subject vehicle where the surrounding vehicle exists. Therefore, the adjustment using the required distance may be limited to the safety distance on the right or left of the subject vehicle where the surrounding vehicle exists. It is possible to reduce unnecessary processes by limiting the adjustment using the required distance to the safety distance requiring a margin in the direction to the surrounding vehicle that makes a turn.

The safety distance adjustment portion 283b may specify the required distance and then adjust the safety distance as needed successively such as at a predetermined cycle or when detecting a specific trigger. The specific trigger may be activated when turning of the surrounding vehicle is detected or estimated, for example. It is possible to avoid unnecessarily performing the above-described processes when the surrounding vehicle makes no turn.

For example, the safety distance adjustment portion 283b may detect turning of the surrounding vehicle based on the condition that the yaw rate of the surrounding vehicle recognized by the travel environment recognition portion 25b is larger than or equal to a threshold for identifying the presence or absence of turning. The safety distance adjustment portion 283b may estimate the turning of the surrounding vehicle based on the condition that the surrounding vehicle recognized by the travel environment recognition portion 25b is positioned near an intersection. Alternatively, the safety distance adjustment portion 283b may estimate the turning of the surrounding vehicle based on the condition that the curvature of the subject vehicle's travel section recognized by the travel environment recognition portion 25b is larger than or equal to a threshold for identifying curved roads. The description below explains examples where the safety distance adjustment portion 283b specifies the required distance and then adjusts the safety distance as needed when detecting a specific trigger.

The verification portion 28b evaluates the safety of travel plans generated by the travel planning portion 27b similarly to the verification portion 28a according to the fourth embodiment except that the safety distance to be used is set by the safety distance setting portion 281b in place of the safety distance setting portion 281a.

The autonomous driving function portion 29b performs the autonomous driving similarly to the autonomous driving function portion 29a according to the fourth embodiment except that travel plans to be used are output from the verification portion 28b in place of the verification portion 28a.

<Safety Distance Adjustment Process in the Autonomous Driving Device 2b>

Figure 15:
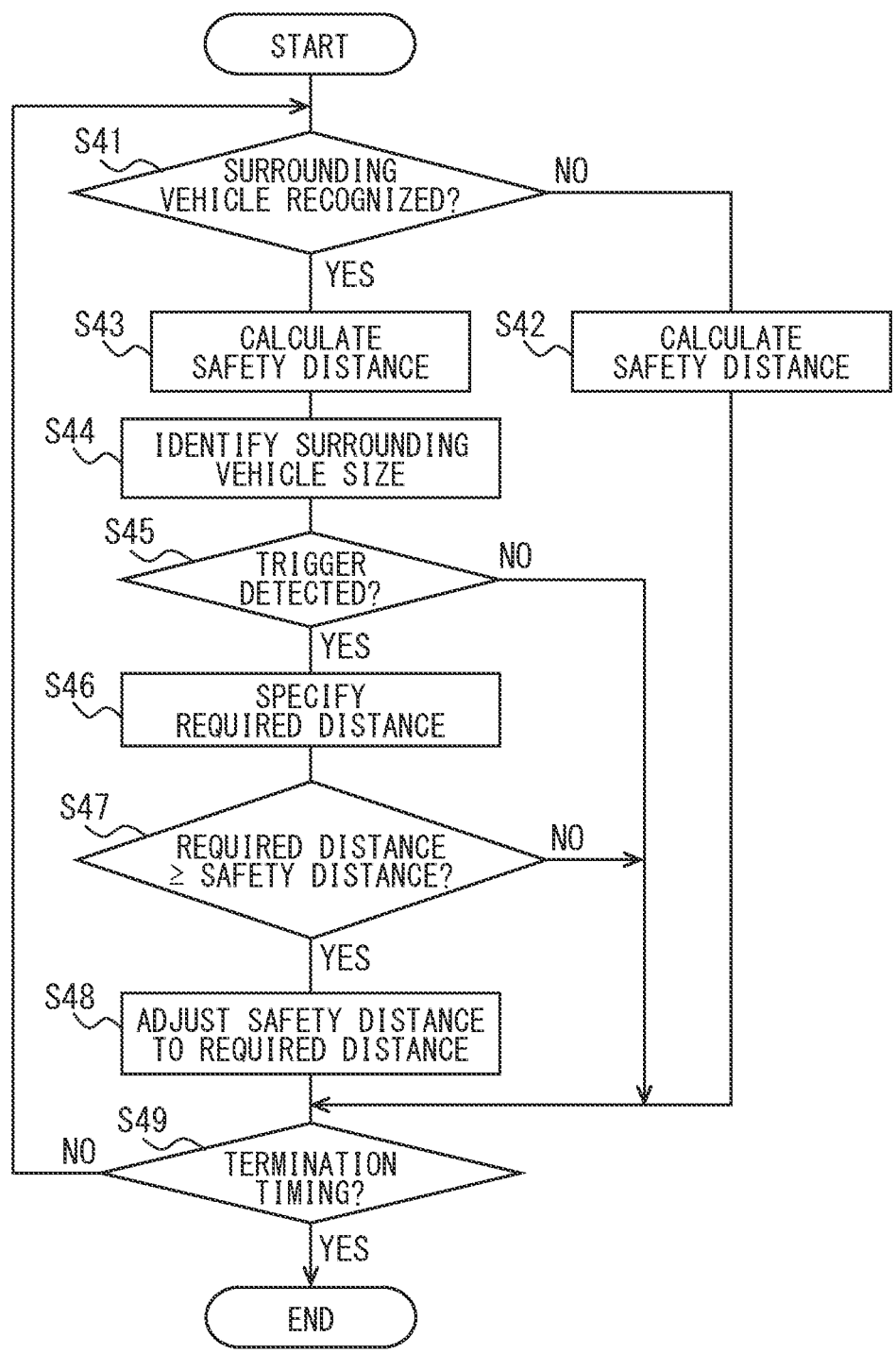
FIG. 15 is a flowchart illustrating a flow of the safety distance adjustment process in the autonomous driving device.

The flowchart in FIG. 15 is used to explain an example flow of the safety distance adjustment process in the autonomous driving device 2b. Execution of steps included in the safety distance adjustment process by the computer is comparable to execution of the driving assist method.

The flowchart in FIG. 15 may start when the subject vehicle's power switch is turned on to start the autonomous driving. It may be possible to switch between manual operation and autonomous driving of the subject vehicle. In this case, the flowchart may start when the power switch is turned on while the autonomous driving is enabled. Moreover, the flowchart may start when the setting to perform autonomous driving during manual operation is active and the manual operation changes to the autonomous driving. The flowchart in FIG. 15 assumes that the travel environment recognition portion 25b successively recognizes the subject vehicle's travel environment.

At step S41, the travel environment recognition portion 25b may recognize a surrounding vehicle (YES at S41). Then, the process proceeds to step S43. The travel environment recognition portion 25b may not recognize any surrounding vehicle (NO at S41). Then, the process proceeds to step S42.

At step S42, the safety distance setting portion 281b calculates the safety distance based on the information about the behavior of the subject vehicle. At S42, the process calculates the forward safety distance, namely, the shortest distance to stop the subject vehicle. At S42, the process calculates the forward safety distance, namely, the shortest distance enabling the subject vehicle to travel until the horizontal speed is zeroed. The process sets the calculated safety distance as the safety distance ahead of and to the right and left of the subject vehicle, and then proceeds to step S49.

At step S43, the safety distance setting portion 281b calculates the safety distance based on the information about the behavior of the subject vehicle and the recognized surrounding vehicle. At S43, the surrounding vehicle may be a forward moving object for the subject vehicle. Then, the process calculates the forward safety distance, namely, a distance enabling the subject vehicle and the forward moving object to stop without contact. At S43, the surrounding vehicle may be a moving object in the lateral direction from the subject vehicle, Then, the process calculates the forward safety distance, namely, a distance enabling the subject vehicle and the moving object to move in the lateral direction until the horizontal speeds of the subject vehicle and the moving object can be zeroed without contact. At S43, the process may calculate the safety distance similarly to S42 in the direction where no surrounding vehicle is recognized. At S43, the process sets the calculated safety distance as the safety distance and then proceeds to step S44.

At step S44, the surrounding vehicle identification portion 253b identifies the size of the recognized surrounding vehicle. The process at S44 may be performed before the process at S43. The process at S44 may be performed concurrently with the recognition of the surrounding vehicle in the travel environment recognition portion 25b.

At step S45, the process may detect a specific trigger (YES at S45). Then, the process proceeds to step S46. The process may not detect a specific trigger (NO at S45). Then, the process proceeds to step S49. The specific trigger may be activated when the turning of the surrounding vehicle is detected or estimated, for example. The specific trigger may be activated when at least part of the situations described by reference to FIGS. 10 to 15 is detected or estimated. For example, the safety distance adjustment portion 283b may detect the specific trigger by using the travel environment recognized by the travel environment recognition portion 25b.

At step S46, the safety distance adjustment portion 283b specifies the required distance based on the surrounding vehicle size identified at S44. As above, the safety distance adjustment portion 283b may specify the required distance also according to the situation detected as the specific trigger at S45.

At step S47, the required distance specified at S46 may be larger than or equal to the safety distance set by the safety distance setting portion 281b (YES at S47). Then, the process proceeds to step S48. The required distance specified at S46 may be smaller than the safety distance set by the safety distance setting portion 281b (NO at S47). Then, the process proceeds to step S49. At step S48, the safety distance adjustment portion 283b adjusts the safety distance, set by the safety distance setting portion 281b, to the required distance specified at S46.

At step S49, the safety distance adjustment process may reach the termination timing (YES at S49). Then, the safety distance adjustment process terminates. The safety distance adjustment process may not reach the termination timing (NO at S49). Then, the process returns to step S41 and is repeated. Examples of the termination timing of the safety distance adjustment process include turning off the power switch of the subject vehicle or changing the operation to the manual operation. The flowchart of FIG. 15 is just an example, and the order of the process may be partially changed.

Overview of the Seventh Embodiment

The seventh embodiment adjusts the safety distance ahead of or to the side of a target vehicle so that the vehicle does not enter the range estimated to be occupied by a turning surrounding vehicle according to the surrounding vehicle size. The safety distance is the minimum distance between the vehicle and an obstacle to avoid an approach between the vehicle and the obstacle. The safety distance can provide a distance to avoid contact with the turning surrounding vehicle. It is possible to avoid contact with even a long surrounding vehicle when making a turn. Consequently, it is possible to more easily avoid an approach to moving objects.

Eighth Embodiment

According to the configuration of the seventh embodiment, the vehicle system 1b is used for autonomous driving vehicles that perform the autonomous driving of automation level 3 or higher. However, the configuration is not limited thereto. For example, the vehicle system 1*b* may be used for autonomous driving vehicles corresponding to automation level 2 or lower.

For example, suppose the vehicle system 1*b* is used for vehicles that perform the operation assistance of automation level 1 or 2. Acceleration/deceleration and/or steering is automatically performed so that the inter-vehicular distance ahead of and/or to the side of a surrounding vehicle becomes equal to a predetermined value. This inter-vehicular distance may be replaced with the above-described safety distance. Even in this case, it is possible to avoid contact with the surrounding vehicle when making a turn by increasing the inter-vehicular distance to the surrounding vehicle according to the surrounding vehicle size. Consequently, it is possible to more easily avoid an approach to moving objects.

Suppose the vehicle system 1*b* is used for autonomous driving vehicles corresponding to automation level 0. Special attention is given when the inter-vehicular distance ahead of and/or to the side of a surrounding vehicle becomes smaller than or equal to a predetermined value. This inter-vehicular distance may be replaced with the above-described safety distance. In this case, it is favorable to increase the inter-vehicular distance as a condition to give attention according to the surrounding vehicle size. It is possible to increase the inter-vehicular distance the driver specifies toward the surrounding vehicle in response to calling for attention according to the surrounding vehicle size. It is possible to increase the inter-vehicular distance to the surrounding vehicle according to the surrounding vehicle size and thereby avoid an approach to the surrounding vehicle when making a turn. Consequently, it is possible to more easily avoid an approach to moving objects.

Ninth Embodiment

<Outline Configuration of Vehicle System 1*c*>

Figure 16:
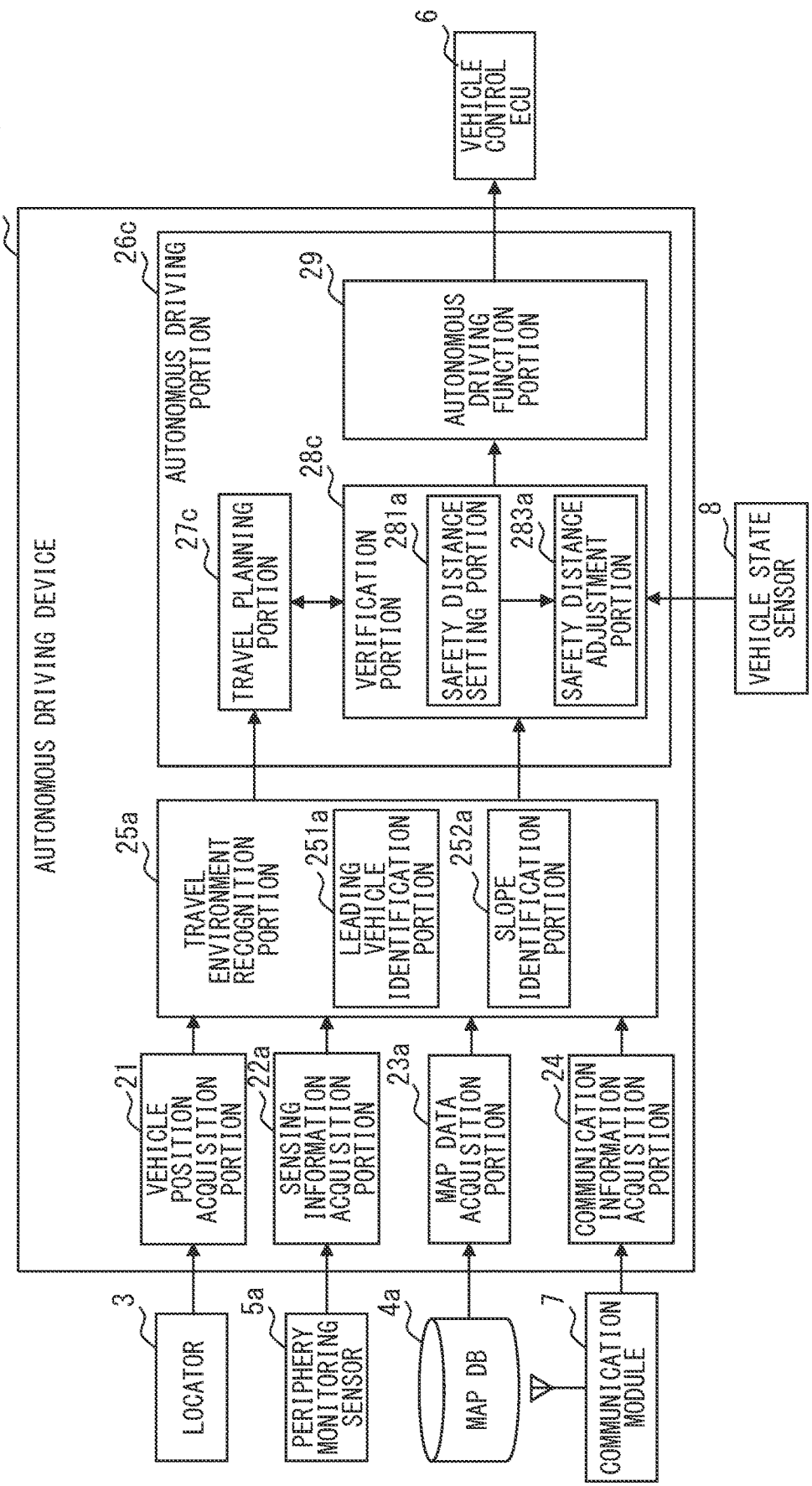
FIG. 16 is a diagram illustrating a schematic configuration of a vehicle system and an autonomous driving device.

The description below explains the ninth embodiment of the present disclosure by reference to the drawings. A vehicle system 1*c* illustrated in FIG. 16 is used for an autonomous driving vehicle. The autonomous driving vehicle is interpreted similarly to the first embodiment. For example, the ninth embodiment may use the vehicle system 1*c* for autonomous driving vehicles that perform the autonomous driving of automation level 3 or higher.

As illustrated in FIG. 16, the vehicle system 1*c* includes an autonomous driving device 2*c*, the locator 3, the map DB 4*a*, the periphery monitoring sensor 5*a*, the vehicle control ECU 6, the communication module 7, and the vehicle state sensor 8. Vehicles that use the vehicle system 1*c* are not necessarily limited to automobiles. However, the description below explains examples of using the vehicle system 1*c* for automobiles. The vehicle system 1*c* is similar to the vehicle system 1*a* according to the fourth embodiment except that the autonomous driving device 2*a* is replaced with the autonomous driving device 2*c*.

The autonomous driving device 2*c* includes a processor, memory, I/O, and a bus connecting these, for example, and performs processes related to autonomous driving by executing a control program stored in the memory. The memory is a non-transitory tangible storage medium to permanently store computer-readable programs and data. The non-transitory tangible storage medium is available as semiconductor memory or a magnetic disk, for example. The details of the autonomous driving device 2*c* is described below.

<Outline Configuration of Autonomous Driving Device 2*c*>

The description below explains an outline configuration of the autonomous driving device 2*c* by reference to FIG. 16. As illustrated in FIG. 16, the autonomous driving device 2*c* includes functional blocks such as the vehicle position acquisition portion 21, the sensing information acquisition portion 22*a*, the map data acquisition portion 23*a*, the communication information acquisition portion 24, the travel environment recognition portion 25*a*, and an autonomous driving portion 26*c*. The autonomous driving device 2*c* is similar to the autonomous driving device 2*a* according to the fourth embodiment except that the autonomous driving portion 26*a* is replaced with the autonomous driving portion 26*c*. All or part of the functions executed by the autonomous driving device 2*c* may be configured as hardware through the use of one or more ICs, for example. All or part of the functional blocks included in the autonomous driving device 2*c* may be provided as a combination of software executed by the processor and hardware members. The autonomous driving device 2*c* is comparable to the in-vehicle device.

The autonomous driving portion 26*c* performs processes concerning the replacement for driving operations by the driver. As illustrated in FIG. 16, the autonomous driving portion 26*c* includes sub-function blocks such as a travel planning portion 27*c*, a verification portion 28*c*, and an autonomous driving function portion 29. The autonomous driving portion 26*c* is similar to the autonomous driving portion 26*a* according to the fourth embodiment except that the travel planning portion 27*a* and the verification portion 28*a* are replaced with the travel planning portion 27*c* and the verification portion 28*c*, and the autonomous driving function portion 29*a* is replaced with the autonomous driving function portion 29. Execution of processes of the travel planning portion 27*a* and the verification portion 28*a* by the computer is comparable to execution of the driving assist method.

The travel planning portion 27*c* is similar to the travel planning portion 27*a* according to the fourth embodiment except that a travel plan provides at least subject vehicle positioning while traveling based on a driving policy. The travel planning portion 27*c* is also similar to the travel planning portion 27*a* in that the autonomous driving generates travel plans to drive the subject vehicle by using the travel environment recognized by the travel environment recognition portion 25*a*. The driving policy is comparable to at least one of the strategies and rules that define the control behavior of vehicles. The driving policy may be expressed as a guideline for planning the subject vehicle positioning while traveling. The driving policy may be also expressed as a mapping from environmental recognition results to acceleration instruction values for vehicle control. The concept of the driving policy may be extended to include permission and rejection of travel plans based on the evaluation of driving rule determination information described below.

The travel planning portion 27*c* plans the subject vehicle positioning while traveling according to a blind area reduction driving policy. The blind area reduction driving policy forces a blind area entry situation to occur less frequently. The blind area entry situation occurs when a different vehicle other than the subject vehicle causes a moving object other than the different vehicle to be positioned in the blind area for the detection range of the periphery monitoring sensor 5*a*. In examples according to the present embodiment, the blind area reduction driving policy uses the adjustment in the safety distance adjustment portion 283*a* (to be described) to force the blind area entry situation to occur less frequently. The blind area entry situation does not necessarily signify that a moving object is entirely located in the blind area for the detection range of the periphery monitoring sensor 5a. For example, the blind area entry situation also applies to a case where part of a moving object is located in the blind area for the detection range of the periphery monitoring sensor 5a so that the travel environment recognition portion 25a cannot recognize the moving object.

The verification portion 28c evaluates the safety of travel plans generated by the travel planning portion 27c in the same manner as the verification portion 28a according to the fourth embodiment. As described in the fourth embodiment, the verification portion 28c may evaluate the safety of travel plans by using the mathematical formula model described in the first embodiment. An RSS model may be used as the mathematical formula model, for example. Similar to the verification portion 28a according to the fourth embodiment, the verification portion 28c includes sub-function blocks such as the safety distance setting portion 281a and the safety distance adjustment portion 283a.

The verification portion 28c is similar to the verification portion 28a according to the fourth embodiment except that a travel plan is evaluated based on the driving rule determination information and it is determined whether to permit the travel plan based on the evaluation. This evaluation may simply indicate the result of determining whether the subject vehicle traveling according to the travel plan follows or deviates from the driving rules. The evaluation may numerically indicate the possibility that the subject vehicle traveling according to the travel plan may deviate from the driving rules.

The driving rule determination information determines whether the subject vehicle traveling according to the travel plan follows or deviates from the driving rules. The driving rule determination information may be stored, in memory, as data that can be referenced during a process allowing the verification portion 28c to perform the evaluation. For example, a trained model including a neural network may provide the process allowing the verification portion 28c to perform the evaluation. Then, the driving rule determination information may be incorporated into the trained model. In this case, the driving rules may be supplied as training data to be used when the trained model is learned. The driving rule can include at least one of the following: the longitudinal speed rule, the longitudinal position rule, the horizontal speed rule, the horizontal position rule, the driving direction priority rule, the signal-based rule, the traffic sign-based rule, and the route priority rule. The driving rules may be configured in compliance with the traffic rules. As an example configuration compliant with the traffic rules, the driving rule may be consistent with the traffic rule without any unignorable contradiction to the traffic rule. As another example configuration compliant with the traffic rules, the driving rule may be equal to the traffic rule itself. The driving rule may include the mathematical formula model described in the first embodiment. The traffic rules may include rules dependent on traveling areas and those independent of traveling areas. The rules dependent on traveling areas include traffic rules dependent on traveling areas. The traffic rules may be stipulated by law. The traffic rule may be acquired from those stored in the database installed on the subject vehicle or may be acquired from outside the subject vehicle via the communication module 7. The traffic rules to be acquired may apply to a traveling area around the vehicle position measured by the locator 3. The rules independent of traveling areas include rules to allow or disallow the travel depending on traffic signal colors, for example.

The driving rules may include a rule that keeps the inter-vehicular distance larger than or equal to the safety distance. In this case, the safety distance to be used may be adjusted by the safety distance adjustment portion 283a. The rule to keep the inter-vehicular distance larger than or equal to the safety distance is an example of rules to keep the state that does not violate a safety envelope. The safety envelope defines a physical margin around the autonomous driving vehicle. According to the concept of the safety envelope, the autonomous driving vehicle includes one or more boundaries around the subject vehicle and one or more violations on these boundaries allow the autonomous driving vehicle to cause different responses.

As above, the travel planning portion 27c plans the subject vehicle positioning while traveling by performing adjustments in the safety distance adjustment portion 283a according to the driving policy that forces the blind area entry situation to occur less frequently. The positioning according to such a driving policy contributes to the improvement of recognition situations and recognition accuracy of moving objects around the subject vehicle through the use of the periphery monitoring sensor 5a. The driving policy according to the present embodiment allows the verification portion 28c to evaluate the driving rule determination information and thereby provides scenes to reduce an unidentified area, namely, a blind area leaving the possible existence of moving objects around the subject vehicle that travels according to the travel plan. Consequently, the verification portion 28c can improve the accuracy of determination when performing an evaluation based on the driving rule determination information. The travel planning portion 27c plans the positioning of the subject vehicle while traveling so that the subject vehicle is positioned regarding the leading vehicle to ensure the safety distance adjusted by the safety distance adjustment portion 283a.

A travel plan set by the travel planning portion 27c may satisfy the driving rule. Then, the verification portion 28c permits this travel plan. The verification portion 28c outputs the permitted travel plan to the autonomous driving function portion 29. A travel plan scheduled by the travel planning portion 27c may not satisfy the driving rule. Then, the verification portion 28c disallows this travel plan. The verification portion 28c does not output the disallowed travel plan to the autonomous driving function portion 29. The verification portion 28c may allow the travel planning portion 27c to correct the disallowed travel plan that was set by the travel planning portion 27c.

The autonomous driving function portion 29 is similar to the autonomous driving function portion 29 according to the first embodiment except for the conformity to travel plans output from the verification portion 28c instead of the verification portion 28.

Overview of the Ninth Embodiment

The ninth embodiment schedules at least the subject vehicle positioning while traveling as a travel plan according to the driving policy that forces the blind area entry situation to occur less frequently. The blind area entry situation occurs when a different vehicle causes a moving object other than the different vehicle to be positioned in the blind area for the detection range of the periphery monitoring sensor. It is possible to provide the travel plan of the subject vehicle positioning while traveling so that the blind area entry situation occurs less frequently. The travel plan is evaluated based on the driving rule determination information configured corresponding to the traffic rules and is determined whether to permit this travel plan. It is highly possible to more accurately recognize moving objects around the subject vehicle and evaluate travel plans based on the driving rule determination information. Consequently, it is possible to reduce the potential possibility for the subject vehicle to deviate from the traffic rules.

The ninth embodiment plans the subject vehicle positioning while traveling so that the forward safety distance for the subject vehicle can ensure the size-dependent distance, depending on the leading vehicle sizes. The size-dependent distance makes the leading vehicle range smaller than or equal to the predetermined range. The leading vehicle range is an angular range that is included in the detection range for the periphery monitoring sensor 5a and is estimated to encompass the leading vehicle. It is possible to reduce the blind area caused by the leading vehicle in the detection range for the periphery monitoring sensor 5a and force the blind area entry situation to occur less frequently. Because the blind area entry situation occurs less frequently, it is possible to reduce the potential possibility for the subject vehicle to deviate from the traffic rules.

The configuration of the ninth embodiment may be combined with the configuration of the fifth embodiment and/or the sixth embodiment. The ninth embodiment may plan the subject vehicle positioning while traveling so that the travel planning portion 27c also includes the functions of the safety distance setting portion 281a and the safety distance adjustment portion 283a and the positioning ensures the safety distance adjusted by the safety distance adjustment portion 283a.

Tenth Embodiment

As described below, the tenth embodiment may plan the subject vehicle positioning while traveling according to a blind area reduction driving policy different from that described in the ninth embodiment to force the blind area entry situation to occur less frequently.

<Outline Configuration of Vehicle System 1d>

Figure 17:
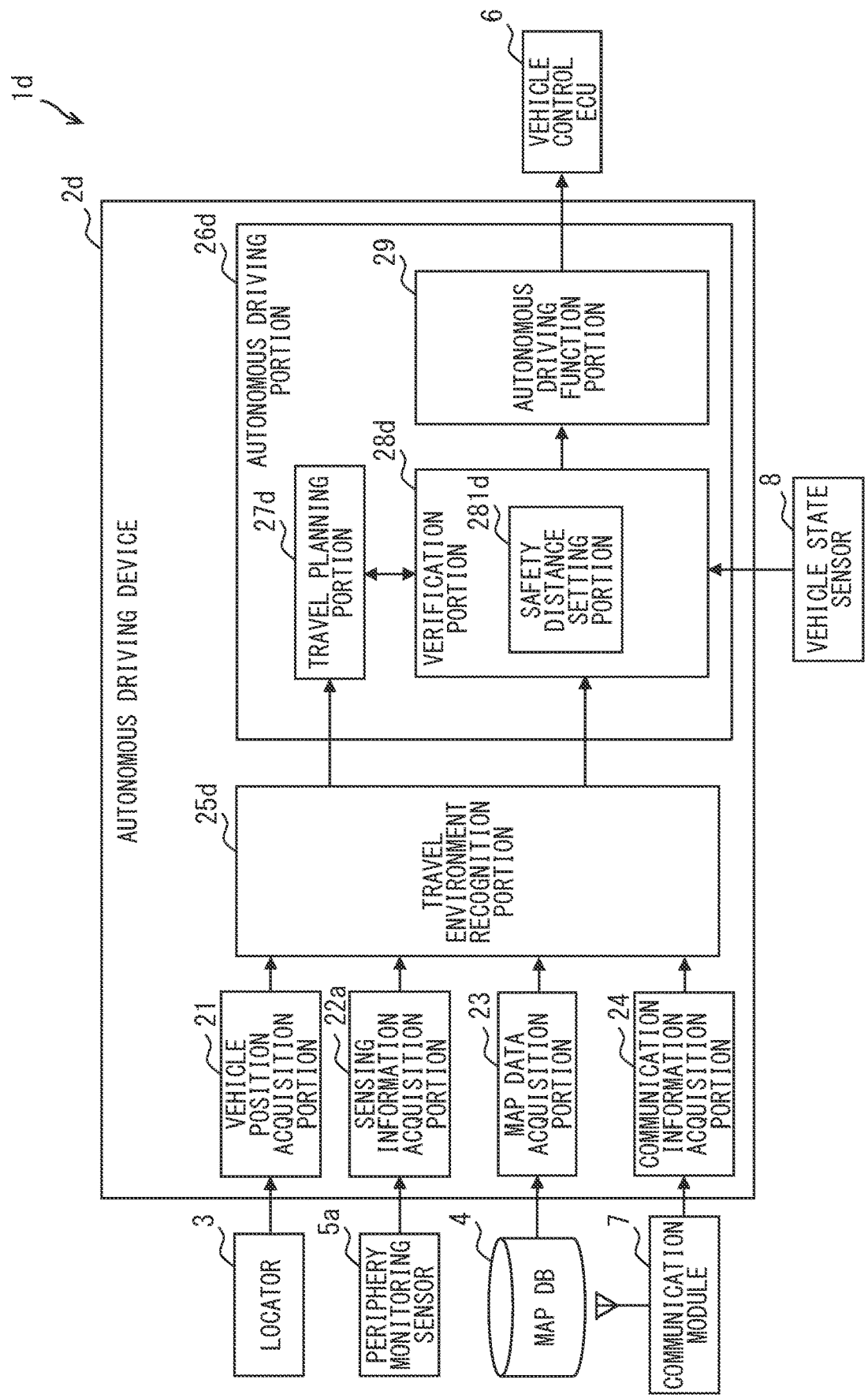
FIG. 17 is a diagram illustrating a schematic configuration of a vehicle system and an autonomous driving device.

The description below explains the tenth embodiment by reference to the drawings. A vehicle system 1d illustrated in FIG. 17 is used for an autonomous driving vehicle. The autonomous driving vehicle is interpreted similarly to the first embodiment. For example, the tenth embodiment may use the vehicle system 1d for autonomous driving vehicles that perform the autonomous driving of automation level 3 or higher.

As illustrated in FIG. 17, the vehicle system 1d includes an autonomous driving device 2d, the locator 3, the map DB 4, the periphery monitoring sensor 5a, the vehicle control ECU 6, the communication module 7, and the vehicle state sensor 8. Vehicles that use the vehicle system 1d are not necessarily limited to automobiles. However, the description below explains examples of using the vehicle system 1d for automobiles. The vehicle system 1d is similar to the vehicle system 1c according to the ninth embodiment except that the autonomous driving device 2c is replaced with the autonomous driving device 2d and the map DB 4a is replaced with the map DB 4.

The map DB 4 is equal to the map DB 4 according to the first embodiment. The autonomous driving device 2d is similar to the autonomous driving device 2c according to the ninth embodiment except for different processes to be performed. The details of the autonomous driving device 2d is described below.

<Outline Configuration of Autonomous Driving Device 2d>

The description below explains an outline configuration of the autonomous driving device 2d by reference to FIG. 17. As illustrated in FIG. 17, the autonomous driving device 2d includes functional blocks such as the vehicle position acquisition portion 21, the sensing information acquisition portion 22a, the map data acquisition portion 23, the communication information acquisition portion 24, a travel environment recognition portion 25d, and an autonomous driving portion 26d. The autonomous driving device 2d is similar to the autonomous driving device 2c according to the ninth embodiment except that the map data acquisition portion 23a is replaced with the map data acquisition portion 23, the travel environment recognition portion 25 is replaced with the travel environment recognition portion 25d, and the autonomous driving portion 26c is replaced with the autonomous driving portion 26d. All or part of the functions executed by the autonomous driving device 2d may be configured as hardware through the use of one or more ICs, for example. All or part of the functional blocks included in the autonomous driving device 2d may be provided as a combination of software executed by the processor and hardware members. The autonomous driving device 2d is comparable to the in-vehicle device.

The map data acquisition portion 23 is equal to the map data acquisition portion 23 according to the first embodiment. The travel environment recognition portion 25d is similar to the travel environment recognition portion 25 according to the first embodiment except that sensing information to be used is acquired by the sensing information acquisition portion 22a in place of the sensing information acquisition portion 22. The travel environment recognition portion 25d recognizes the position of a lane division line (or simply a division line) as the position of a road marking around the subject vehicle and thereby recognizes positions of the subject vehicle and different vehicles based on the division line. The travel environment recognition portion 25d may also recognize whether the subject vehicle's cruising path is a straight road or a curved road based on the road shape information in the map data or division line shapes recognized from the sensing information.

The autonomous driving portion 26d performs processes concerning the replacement for driving operations by the driver. As illustrated in FIG. 17, the autonomous driving portion 26d includes sub-function blocks such as a travel planning portion 27d, a verification portion 28d, and the autonomous driving function portion 29. The autonomous driving portion 26d is similar to the autonomous driving portion 26c according to the ninth embodiment except that the travel planning portion 27c and the verification portion 28c are replaced with the travel planning portion 27d and the verification portion 28d. Execution of processes of the travel planning portion 27d and the verification portion 28d by the computer is comparable to execution of the driving assist method.

Similar to the verification portion 28c according to the ninth embodiment, the verification portion 28d evaluates the safety of travel plans generated by the travel planning portion 27d. Similar to the verification portion 28c according to the ninth embodiment, the verification portion 28d evaluates the travel plans based on the driving rule determination information and determines whether to permit the travel plans based on the evaluation. The verification portion 28d includes a safety distance setting portion 281d as a sub-function block.

The safety distance setting portion 281d is similar to the safety distance setting portion 281 according to the first embodiment except for the setting of at least the safety distance for the subject vehicle in the lateral direction. The lateral direction of the subject vehicle can be expressed as a sideways direction of the subject vehicle. The safety distance for the subject vehicle in the lateral direction is hereinafter referred to as a lateral safety distance.

The travel planning portion 27d is similar to the travel planning portion 27c according to the ninth embodiment except for differences in the blind area reduction driving policy observed to plan the subject vehicle positioning while traveling. The travel planning portion 27d plans the positioning of the subject vehicle according to the driving policy that moves the travel position of the subject vehicle from the cruising lane center to the cruising lane boundary on condition of ensuring the lateral safety distance and thereby forces the blind area entry situation to occur less frequently. This process may be performed on the condition that the travel environment recognition portion 25d recognizes a leading vehicle regarding the subject vehicle. In other words, this process may be performed on the condition that a leading vehicle regarding the subject vehicle is detected in the detection range of the periphery monitoring sensor 5a. The process may use the lateral safety distance set by the safety distance setting portion 281d.

For example, the travel environment recognition portion 25d may recognize the subject vehicle's cruising path as a straight road. Then, the travel planning portion 27d may move the travel position to the right or left boundary of the subject vehicle's cruising lane on condition of ensuring the lateral safety distance. For example, it may be favorable to predetermine the movement to the right or left boundary of the subject vehicle's cruising lane.

Figure 18:
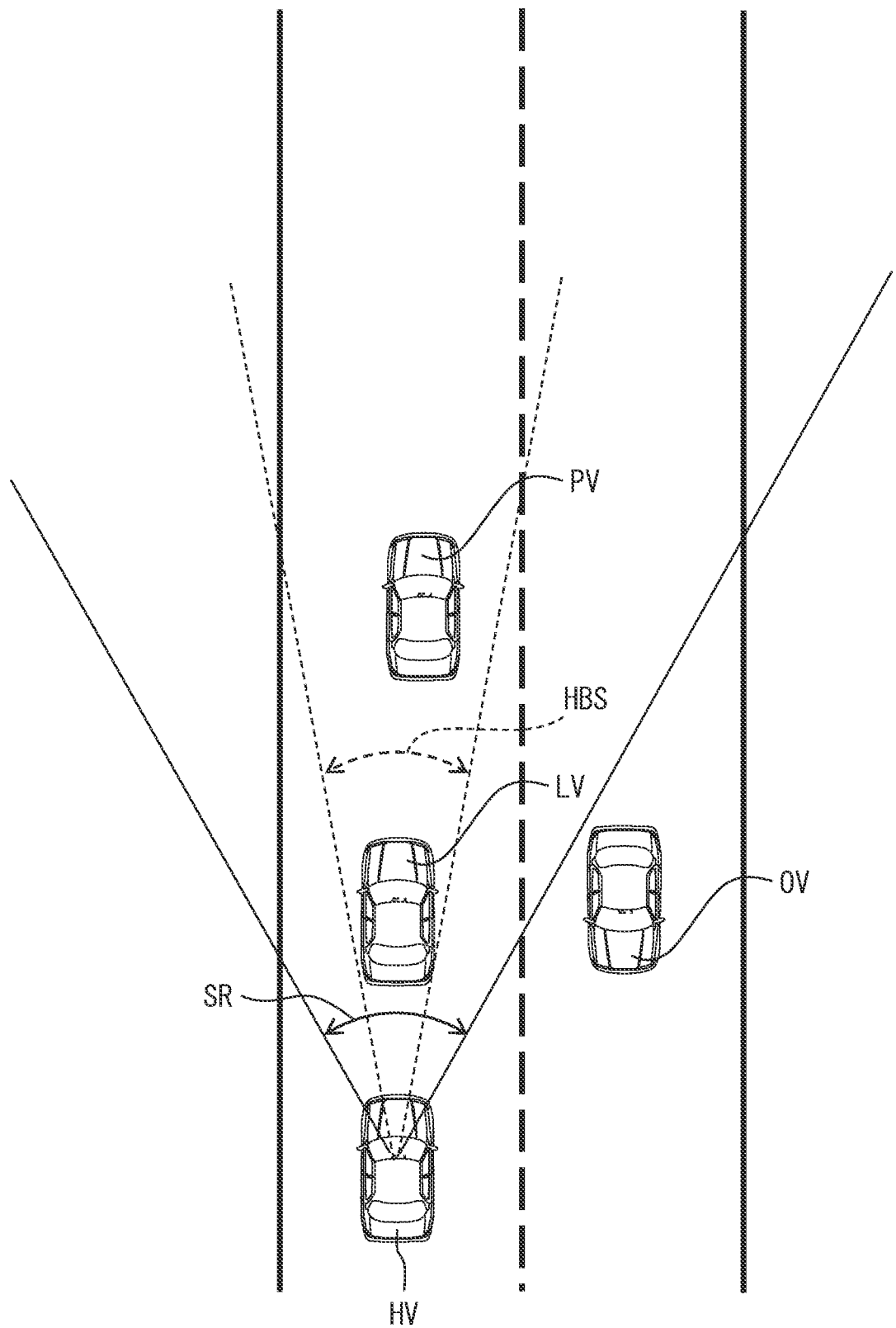
FIG. 18 is a diagram illustrating an effect of the configuration according to a tenth embodiment.
Figure 19:
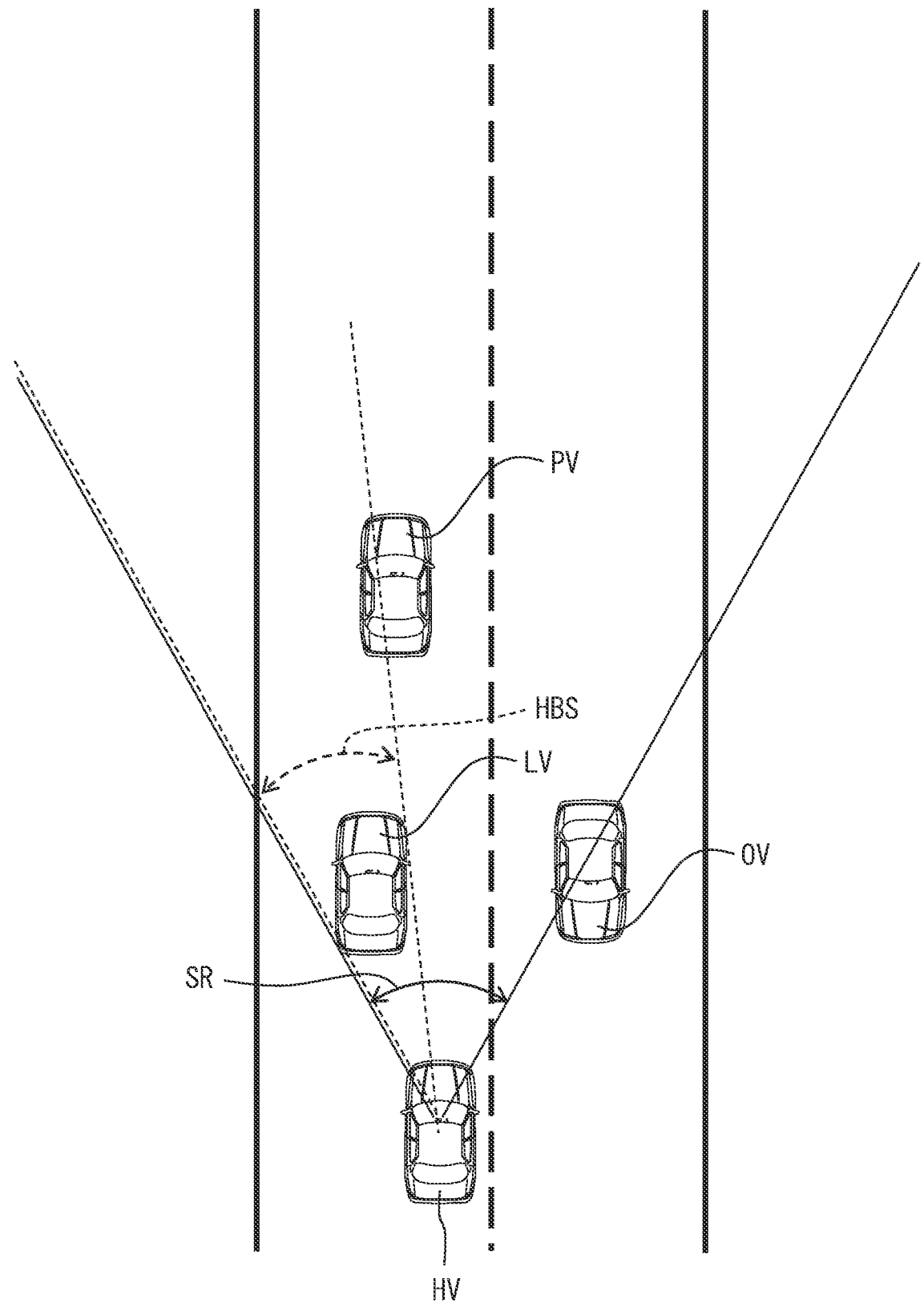
FIG. 19 is a diagram illustrating an effect of the configuration according to the tenth embodiment.

On straight roads, it is possible to force the blind area entry situation to occur less frequently by moving the traveling position of the subject vehicle from the cruising lane center to the cruising lane boundary. The description below explains this effect by reference to FIGS. 18 and 19. In FIGS. 18 and 19, HV denotes the subject vehicle, LV denotes the leading vehicle, PV denotes the further leading vehicle preceding the leading vehicle, and OV denotes the oncoming vehicle. In FIGS. 18 and 19, SR denotes the detection range of the periphery monitoring sensor 5a. In FIGS. 18 and 19, HBS denotes a blind area as part of the detection range SR caused by the leading vehicle LV As illustrated in FIG. 18, the leading vehicle LV on a straight road may allow the whole of the further leading vehicle PV to be positioned in the range HBS that causes a blind area in the detection range SR for the periphery monitoring sensor 5a of the subject vehicle HV. Even in such a case, the travel position of the subject vehicle HV may be moved toward the cruising lane boundary as illustrated in FIG. 19. It is possible to avoid a situation where the whole of the further leading vehicle PV is located in the range HBS as a blind area in the detection range SR of the periphery monitoring sensor 5a. The travel positioning of the subject vehicle HV may be moved toward the cruising lane boundary by planning the position closest to the boundary on condition of ensuring the lateral safety distance for the oncoming vehicle OV, for example.

The travel environment recognition portion 25d may recognize the subject vehicle's cruising path as a curved road. Then, the travel planning portion 27d may favorably move the travel position of the subject vehicle from the cruising lane center toward the radially inner circumference side of the curved road on condition of ensuring the lateral safety distance.

On curved roads, it is possible to force the blind area entry situation to occur less frequently by moving the travel position of the subject vehicle to the inner circumference of the curved road. The description below explains this effect by reference to FIGS. 20 and 21. The reference symbols in FIGS. 20 and 21 are equal to those in FIGS. 18 and 19.

Figure 20:
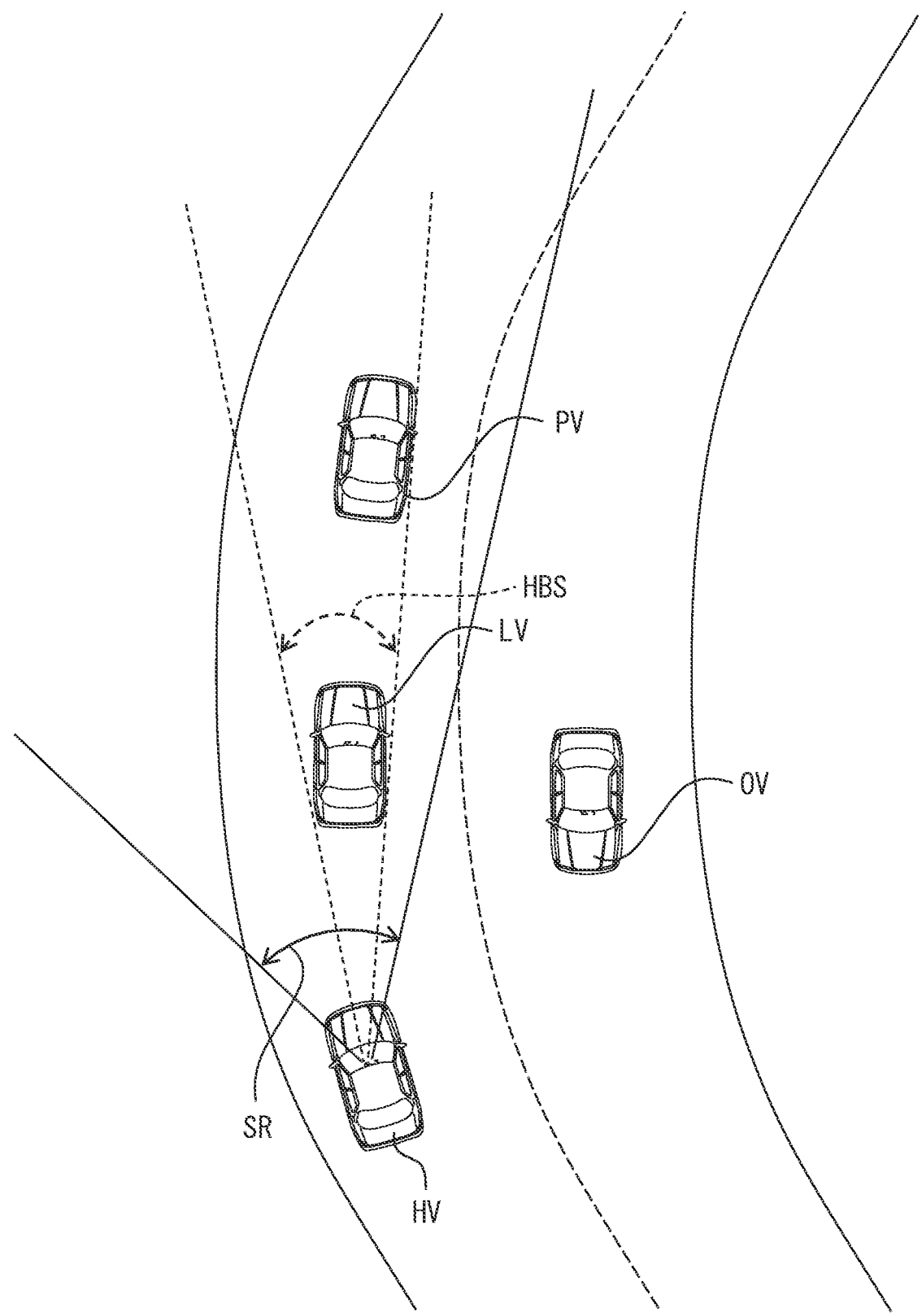
FIG. 20 is a diagram illustrating an effect of the configuration according to the tenth embodiment.
Figure 21:
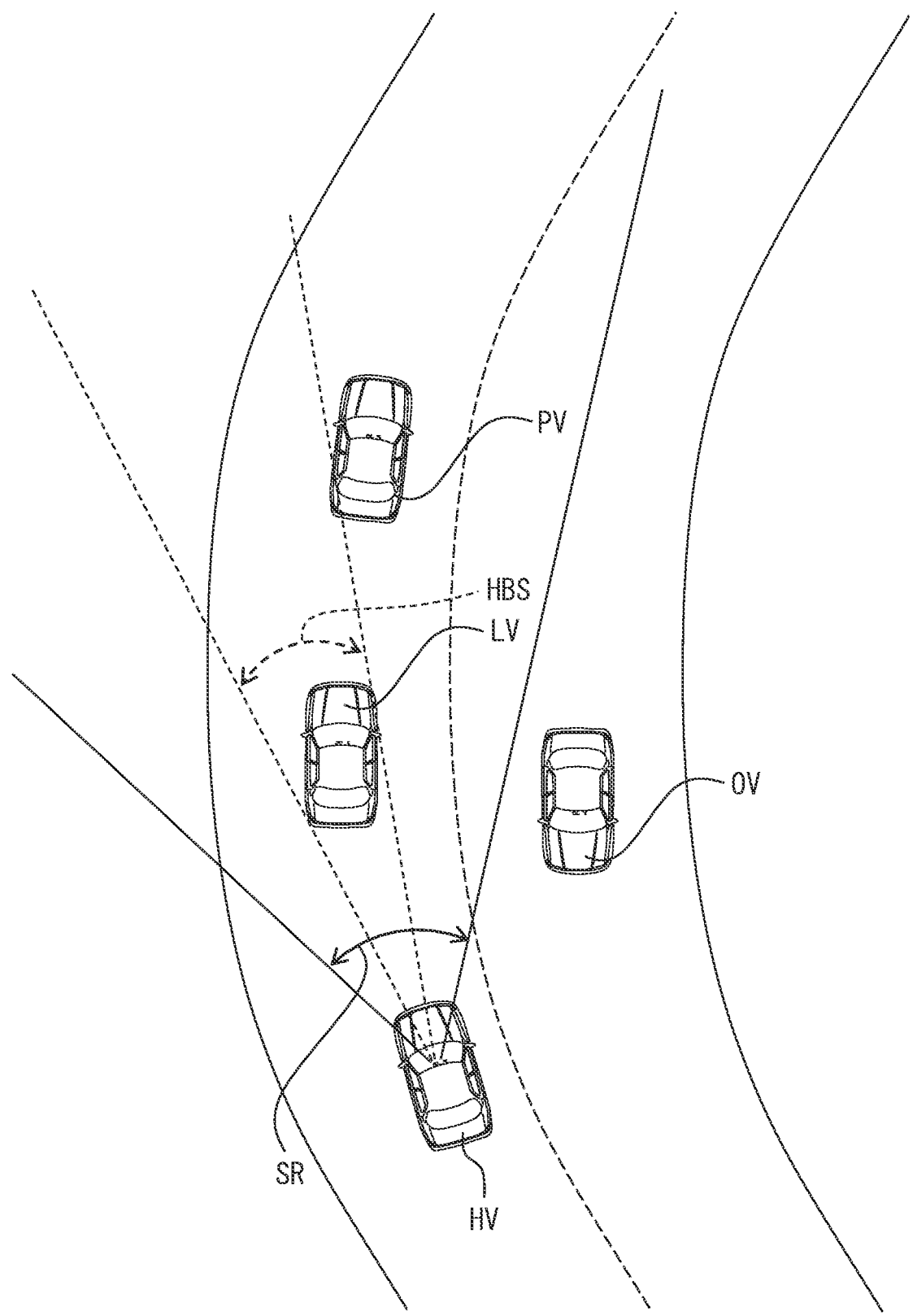
FIG. 21 is a diagram illustrating an effect of the configuration according to the tenth embodiment.

As illustrated in FIG. 20, the leading vehicle LV on a curved road may allow the whole of the further leading vehicle PV to be positioned in the range HBS that causes a blind area in the detection range SR for the periphery monitoring sensor 5a of the subject vehicle HV. Even in such a case, the travel position of the subject vehicle HV may be moved toward the inner circumference boundary of the cruising lane on the curved road as illustrated in FIG. 21. It is possible to avoid a situation where the whole of the further leading vehicle PV is positioned in the range HBS as a blind area in the detection range SR of the periphery monitoring sensor 5a. The travel positioning of the subject vehicle HV may be moved toward the inner circumference boundary of the cruising lane on the curved road by planning the position closest to the boundary on condition of ensuring the lateral safety distance for the oncoming vehicle OV, for example.

A travel plan made by the travel planning portion 27d may satisfy the driving rule. Then, the verification portion 28d permits this travel plan. The verification portion 28d outputs the permitted travel plan to the autonomous driving function portion 29. A travel plan scheduled by the travel planning portion 27d may not satisfy the driving rule. Then, the verification portion 28d disallows this travel plan. The verification portion 28d does not output the disallowed travel plan to the autonomous driving function portion 29. The verification portion 28d may allow the travel planning portion 27d to correct the disallowed travel plan that was scheduled by the travel planning portion 27d.

Overview of the Tenth Embodiment

Similar to the ninth embodiment, the tenth embodiment schedules at least the subject vehicle positioning while traveling as a travel plan according to the driving policy that forces the blind area entry situation to occur less frequently. The blind area entry situation occurs when a different vehicle causes a moving object other than the different vehicle to be positioned in the blind area for the detection range of the periphery monitoring sensor. Similar to the ninth embodiment, it is possible to reduce the potential possibility for the subject vehicle to deviate from the traffic rules.

The tenth embodiment can move the traveling position of the subject vehicle from the cruising lane center toward the cruising lane boundary, reduce a blind area in the detection range of periphery monitoring sensor 5a due to a leading vehicle, and force the blind area entry situation to occur less frequently. Because the blind area entry situation occurs less frequently, it is possible to reduce the potential possibility for the subject vehicle to deviate from the traffic rules.

The configuration of the tenth embodiment provides the example where the detection range of the periphery monitoring sensor 5a exists at least ahead of the subject vehicle. However, the configuration is not limited thereto. For example, the configuration is also applicable when the detection range of the periphery monitoring sensor 5a exists at the rear of the subject vehicle. In this case, it is possible to move the travel position of the subject vehicle from the cruising lane center toward the cruising lane boundary, reduce a blind area in the detection range of the periphery monitoring sensor 5a due to the nearest succeeding vehicle, and force the blind area entry situation to occur less frequently.

The configuration of the tenth embodiment may be combined with the configuration of the sixth embodiment. The tenth embodiment may plan the subject vehicle positioning while traveling so that the travel planning portion 27d also includes the functions of the safety distance setting portion 281d and the positioning ensures the safety distance set by the safety distance setting portion 281d.

Eleventh Embodiment

As described below, the eleventh embodiment may plan the subject vehicle positioning while traveling according to a blind area reduction driving policy different from those described in the ninth and tenth embodiments to force the blind area entry situation to occur less frequently.
<Outline Configuration of Vehicle System 1e>

Figure 22:
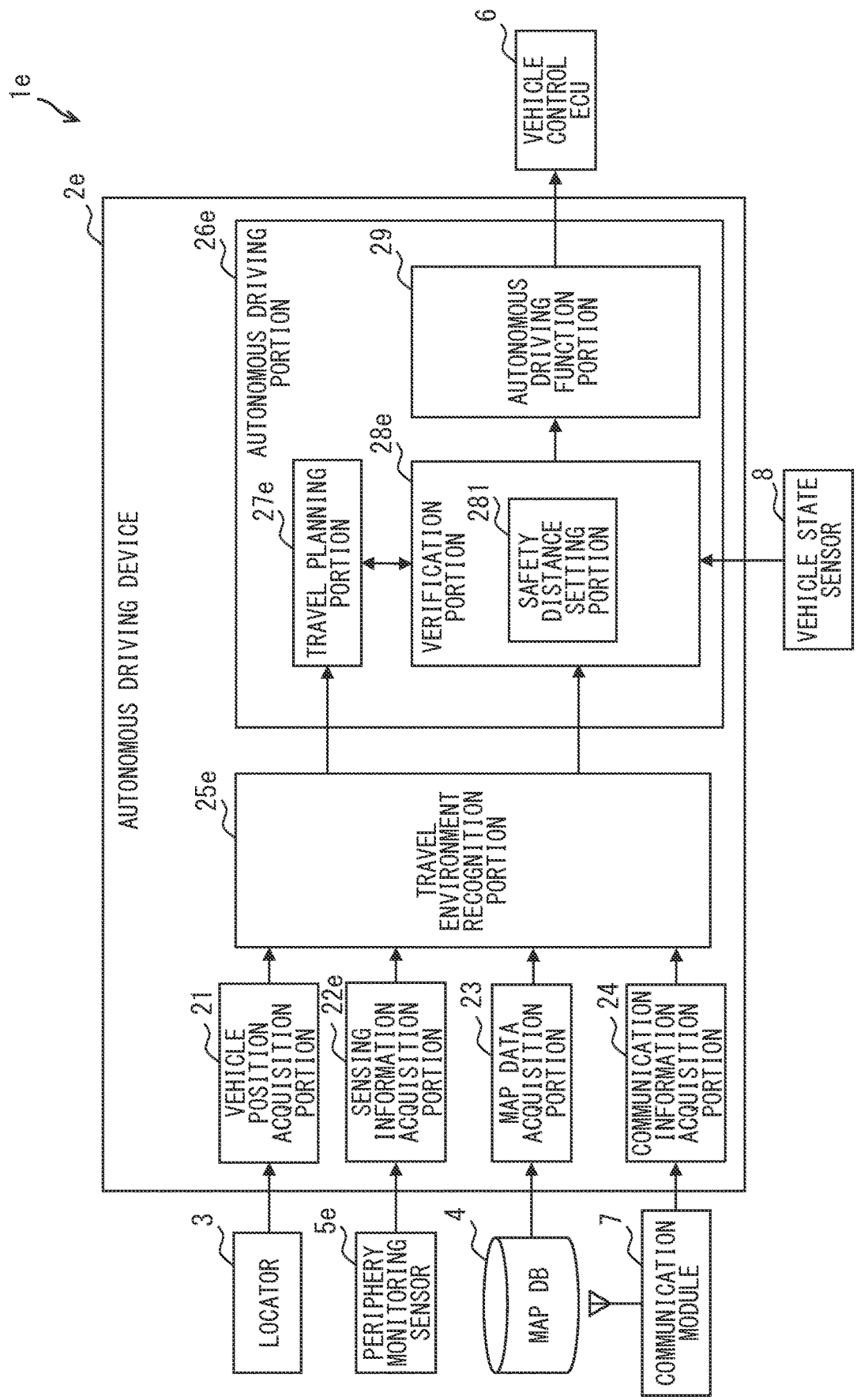
FIG. 22 is a diagram illustrating a schematic configuration of a vehicle system and an autonomous driving device.

The description below explains the eleventh embodiment by reference to the drawings. A vehicle system 1e illustrated in FIG. 22 is used for an autonomous driving vehicle. The autonomous driving vehicle is interpreted similarly to the first embodiment. For example, the eleventh embodiment may use the vehicle system 1e for autonomous driving vehicles that perform the autonomous driving of automation level 3 or higher.

As illustrated in FIG. 22 the vehicle system 1e includes an autonomous driving device 2e, the locator 3, the map DB 4, a periphery monitoring sensor 5e, the vehicle control ECU 6, the communication module 7, and the vehicle state sensor 8. Vehicles that use the vehicle system 1e are not necessarily limited to automobiles. However, the description below explains examples of using the vehicle system 1e for automobiles. The vehicle system 1e is similar to the vehicle system 1c according to the ninth embodiment except that the autonomous driving device 2c is replaced with the autonomous driving device 2e, the periphery monitoring sensor 5a is replaced with the periphery monitoring sensor 5e, and the map DB 4a is replaced with the map DB 4.

The periphery monitoring sensor 5e is similar to the periphery monitoring sensor 5 according to the first embodiment except that the detection range corresponds to a predetermined range at least sideways of the subject vehicle. A lateral detection range, namely, the detection range on the side of the subject vehicle may correspond to a predetermined range on at least one of the right and left sides of the subject vehicle. The lateral detection range is not limited to one type of sensor. For example, the lateral detection range may be a combination of detection ranges resulting from multiple types of sensors that provide different detection ranges.

The map DB 4 is equal to the map DB 4 according to the first embodiment. The autonomous driving device 2e is similar to the autonomous driving device 2c according to the ninth embodiment except for different processes to be performed. The details of the autonomous driving device 2e is described below.
<Outline Configuration of Autonomous Driving Device 2e>

The description below explains an outline configuration of the autonomous driving device 2e by reference to FIG. 22. As illustrated in FIG. 22, the autonomous driving device 2e includes functional blocks such as the vehicle position acquisition portion 21, a sensing information acquisition portion 22e, the map data acquisition portion 23, the communication information acquisition portion 24, a travel environment recognition portion 25e, and an autonomous driving portion 26e. The autonomous driving device 2e is similar to the autonomous driving device 2c according to the ninth embodiment except that the sensing information acquisition portion 22a is replaced with the sensing information acquisition portion 22e, the map data acquisition portion 23a is replaced with the map data acquisition portion 23, the travel environment recognition portion 25a is replaced with the travel environment recognition portion 25e, and the autonomous driving portion 26c is replaced with the autonomous driving portion 26e. All or part of the functions executed by the autonomous driving device 2e may be configured as hardware through the use of one or more ICs, for example. All or part of the functional blocks included in the autonomous driving device 2e may be provided as a combination of software executed by the processor and hardware members. The autonomous driving device 2e is comparable to the in-vehicle device.

The sensing information acquisition portion 22e is similar to the sensing information acquisition portion 22a according to the ninth embodiment except for the acquisition of sensing information detected by the periphery monitoring sensor 5e instead of the periphery monitoring sensor 5a. The map data acquisition portion 23 is equal to the map data acquisition portion 23 according to the first embodiment.

Similar to the travel environment recognition portion 25 according to the first embodiment, the travel environment recognition portion 25e recognizes the travel environment of the subject vehicle based on subject vehicle positions acquired by the vehicle position acquisition portion 21; sensing information acquired by the sensing information acquisition portion 22e; map data acquired by the map data acquisition portion 23; and information about surrounding vehicles acquired by the communication information acquisition portion 24. The travel environment recognition portion 25e recognizes peripheral objects and road markings at least in the lateral detection range from the sensing information acquired by the sensing information acquisition portion 22e.

The autonomous driving portion 26e performs processes concerning the replacement for driving operations by the driver. As illustrated in FIG. 22, the autonomous driving portion 26e includes sub-function blocks such as a travel planning portion 27e, a verification portion 28e, and the autonomous driving function portion 29. The autonomous driving portion 26e is similar to the autonomous driving portion 26c according to the ninth embodiment except that the travel planning portion 27c and the verification portion 28c are replaced with the travel planning portion 27e and the verification portion 28e. Execution of processes of the travel planning portion 27e and the verification portion 28e by the computer is comparable to execution of the driving assist method.

The travel planning portion 27e is similar to the travel planning portion 27c according to the ninth embodiment except for differences in the blind area reduction driving policy observed to plan the positioning of the subject vehicle. The travel planning portion 27d plans the positioning of the subject vehicle according to the driving policy that shifts longitudinal positions of the subject vehicle regarding a different vehicle traveling in the lane adjacent to the subject vehicle's cruising lane. The longitudinal position corresponds to a direction following the subject vehicle's cruising lane. The travel environment recognition portion 25e may successively recognize positions of the different vehicle traveling in the adjacent lane. It is favorable to shift longitudinal positions of the subject vehicle regarding the different vehicle traveling in the adjacent lane to be able to ensure the above-described safety distance to vehicles around the subject vehicle in the longitudinal direction.

Figure 23:
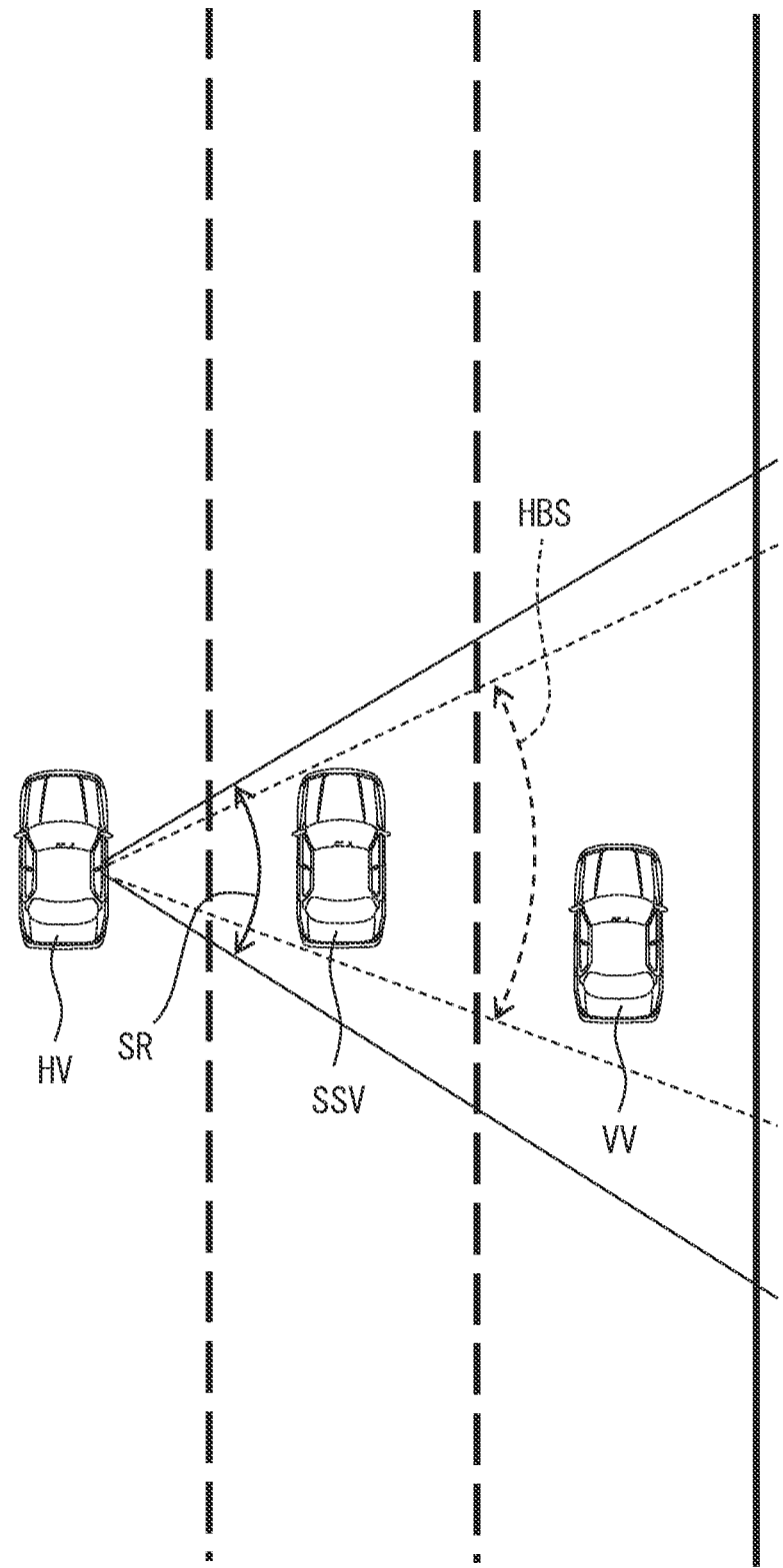
FIG. 23 is a diagram illustrating an effect of the configuration according to an eleventh embodiment.
Figure 24:
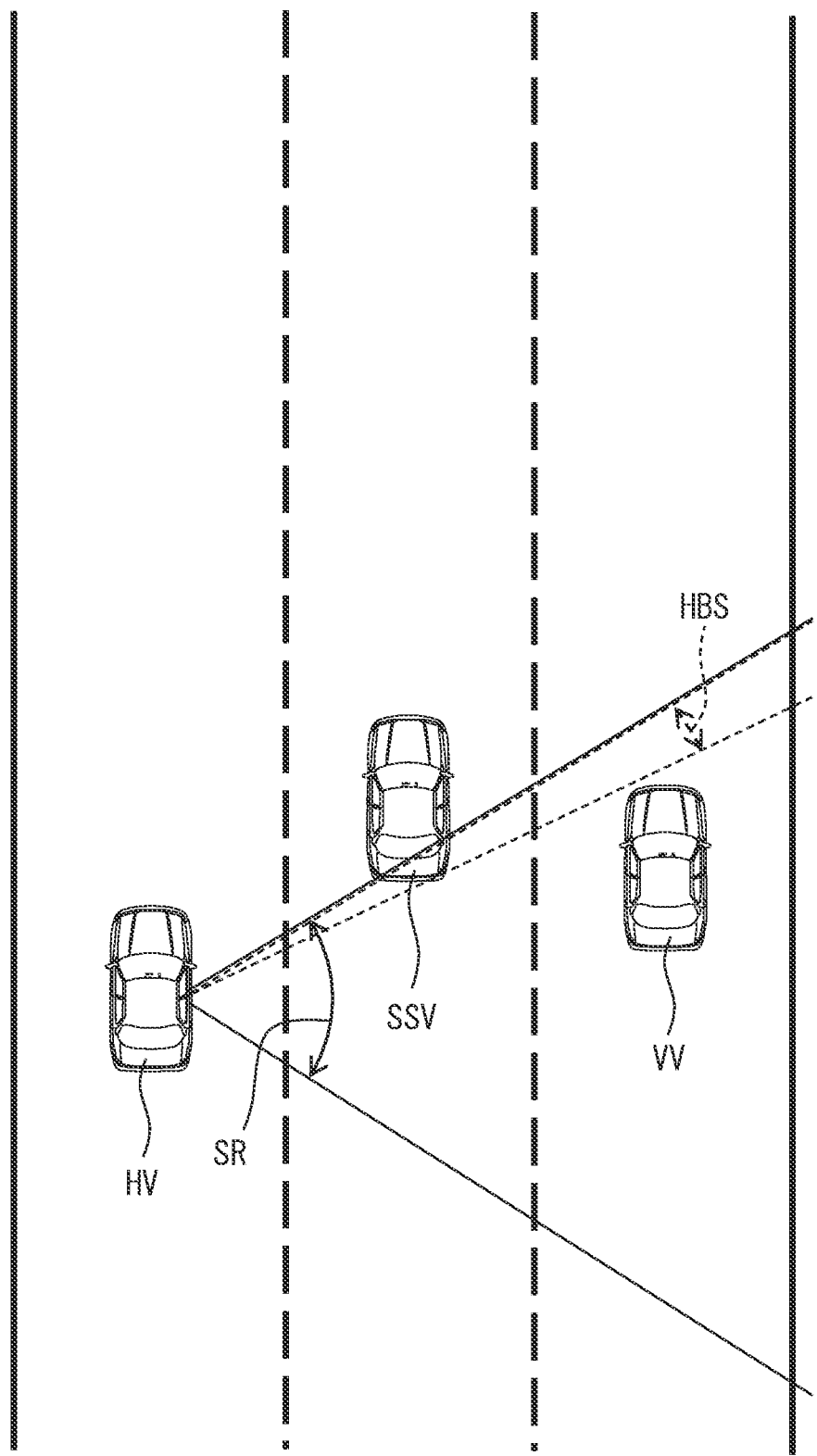
FIG. 24 is a diagram illustrating an effect of the configuration according to the eleventh embodiment.

It is possible to force the blind area entry situation to occur less frequently by shifting longitudinal positions of the subject vehicle regarding the different vehicle traveling in the adjacent lane. The description below explains this effect by reference to FIGS. 23 and 24. In FIGS. 23 and 24, HV denotes the subject vehicle, SSV denotes a parallel traveling vehicle in the adjacent lane, and VV denotes a surrounding vehicle traveling in a lane further adjacent to the adjacent lane. In FIGS. 23 and 24, SR denotes the detection range of the periphery monitoring sensor 5e. In FIGS. 23 and 24, HBS denotes a blind area in the detection range SR caused by the parallel traveling vehicle SSV.

As illustrated in FIG. 23, the parallel traveling vehicle SSV may cause the whole of the surrounding vehicle VV to be positioned in the range HBS. The surrounding vehicle VV travels in the lane across the adjacent lane from the subject vehicle lane. The range HBS causes a blind area in the detection range SR for the periphery monitoring sensor 5e of the subject vehicle HV. Even in such a case, the travel position of the subject vehicle HV may be shifted in the longitudinal direction regarding the parallel traveling vehicle SSV as illustrated in FIG. 24. It is possible to avoid a situation where the whole of the surrounding vehicle VV is positioned in the range HBS as a blind area in the detection range SR of the periphery monitoring sensor 5e. The travel positioning of the subject vehicle HV may be shifted in the longitudinal direction by planning positions to be able to ensure the safety distance to vehicles around the subject vehicle HV in the longitudinal direction, for example.

The travel planning portion 27e may perform positioning to shift the subject vehicle position in the longitudinal direction regarding a different vehicle traveling in the adjacent lane under the condition that the subject vehicle travels on a road including three or more lanes on one side and at least two of the three or more lanes exist contiguously next to the subject vehicle lane. It is possible to more accurately recognize the surrounding vehicle that travels in the lane extending in the same direction as the subject vehicle and is likely to be positioned in a blind area due to a parallel traveling vehicle. The travel planning portion 27e may perform positioning to shift the subject vehicle position in the longitudinal direction regarding a different vehicle traveling in the adjacent lane under the condition that there is another lane adjacent to the subject vehicle lane. In this case, it is possible to more accurately recognize moving objects on a sidewalk, for example, that is likely to be a blind area due to a parallel traveling vehicle.

Similar to the verification portion 28c according to the ninth embodiment, the verification portion 28e evaluates the safety of travel plans generated by the travel planning portion 27e. Similar to the verification portion 28c according to the ninth embodiment, the verification portion 28e evaluates a travel plan based on the possibility of deviation from the traffic rule and determines whether to permit this travel plan based on the evaluation. The verification portion 28e may include the safety distance setting portion 281 as a sub-function block, for example.

The travel plan scheduled by the travel planning portion 27e may satisfy the driving rule. Then, the verification portion 28e permits this travel plan. The verification portion 28e outputs the permitted travel plan to the autonomous driving function portion 29. The travel plan scheduled by the travel planning portion 27e may not satisfy the driving rule. Then, the verification portion 28e disallows this travel plan.

The verification portion 28e does not output the disallowed travel plan to the autonomous driving function portion 29. The verification portion 28e may allow the travel planning portion 27e to correct the disallowed travel plan that was scheduled by the travel planning portion 27e.

Overview of the Eleventh Embodiment

Similar to the ninth embodiment, the eleventh embodiment schedules at least the subject vehicle positioning while traveling as a travel plan according to the driving policy that forces the blind area entry situation to occur less frequently. The blind area entry situation occurs when a different vehicle causes a moving object other than the different vehicle to be positioned in the blind area for the detection range of the periphery monitoring sensor. Similar to the ninth embodiment, it is possible to reduce the potential possibility for the subject vehicle to deviate from the traffic rules.

The eleventh embodiment plans the subject vehicle positioning while traveling to be able to shift the subject vehicle position in the longitudinal direction regarding a different vehicle traveling in the adjacent lane. It is possible to reduce a blind area in the detection range of the periphery monitoring sensor 5e due to a parallel traveling vehicle and force the blind area entry situation to occur less frequently. Because the blind area entry situation occurs less frequently, it is possible to reduce the potential possibility for the subject vehicle to deviate from the traffic rules.

The configuration of the eleventh embodiment may be combined with the configuration of the sixth embodiment. The eleventh embodiment may plan the subject vehicle positioning while traveling so that the travel planning portion 27e also includes the functions of the safety distance setting portion 281 and the positioning ensures the safety distance set by the safety distance setting portion 281.

Twelfth Embodiment

As described below, the twelfth embodiment may plan the subject vehicle positioning while traveling according to a blind area reduction driving policy different from those described in the ninth through eleventh embodiments to force the blind area entry situation to occur less frequently.
<Outline Configuration of Vehicle System 1f>

Figure 25:
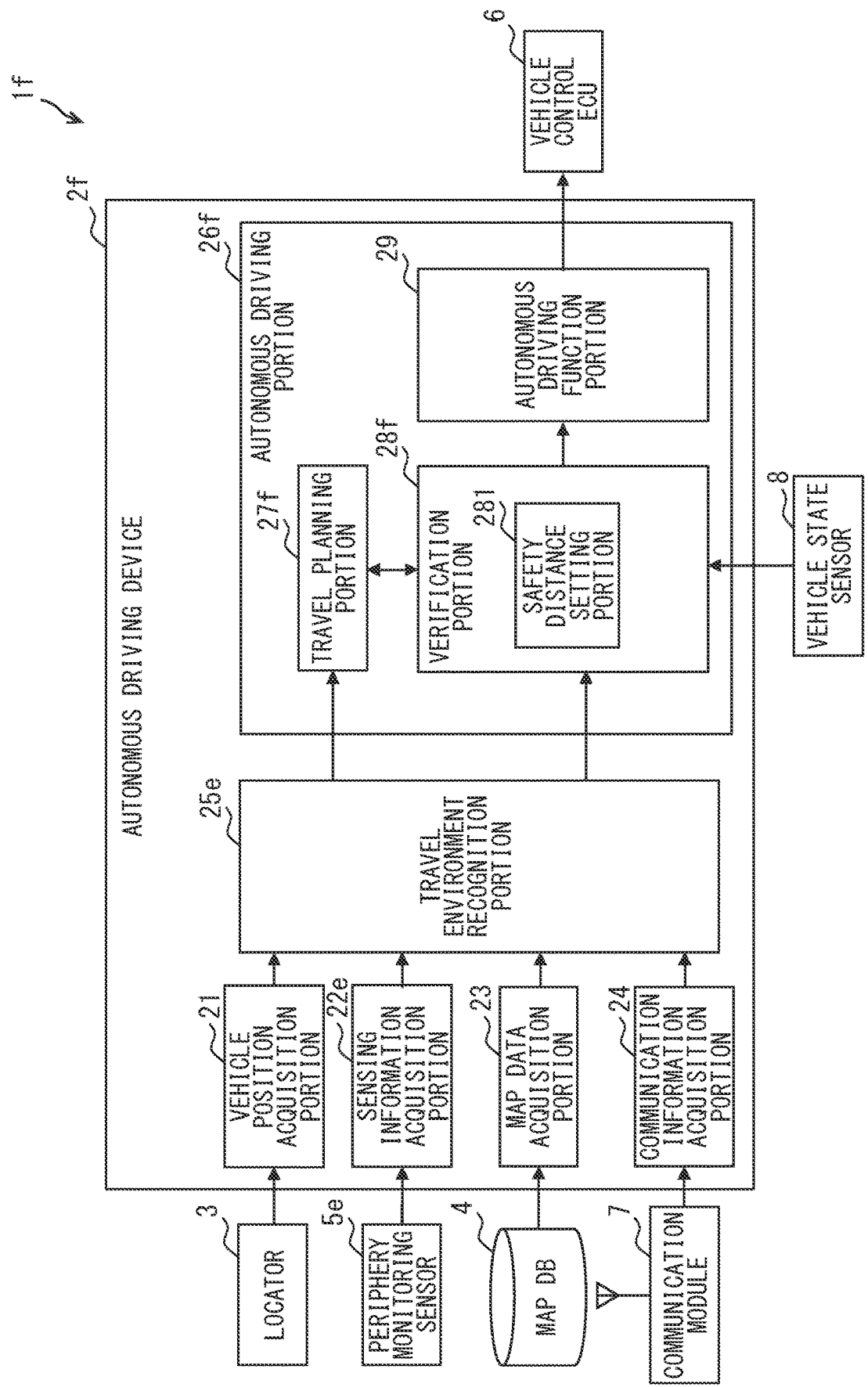
FIG. 25 is a diagram illustrating a schematic configuration of a vehicle system and an autonomous driving device.

The description below explains the twelfth embodiment by reference to the drawings. A vehicle system 1f illustrated in FIG. 25 is used for an autonomous driving vehicle. The autonomous driving vehicle is interpreted similarly to the first embodiment. For example, the twelfth embodiment may use the vehicle system 1f for autonomous driving vehicles that perform the autonomous driving of automation level 3 or higher. As illustrated in FIG. 25, the vehicle system 1f includes an autonomous driving device 2f, the locator 3, the map DB 4, the periphery monitoring sensor 5e, the vehicle control ECU 6, the communication module 7, and the vehicle state sensor 8. Vehicles that use the vehicle system 1f are not necessarily limited to automobiles. However, the description below explains examples of using the vehicle system 1f for automobiles. The vehicle system 1f is similar to the vehicle system 1e according to the eleventh embodiment except that the autonomous driving device 2e is replaced with the autonomous driving device 2f.

The autonomous driving device 2f is similar to the autonomous driving device 2e according to the eleventh embodiment except for different processes to be performed. The details of the autonomous driving device 2f is described below.

<Outline Configuration of Autonomous Driving Device 2f>

The description below explains an outline configuration of the autonomous driving device 2f by reference to FIG. 25. As illustrated in FIG. 25, the autonomous driving device 2f includes functional blocks such as the vehicle position acquisition portion 21, the sensing information acquisition portion 22e, the map data acquisition portion 23, the communication information acquisition portion 24, the travel environment recognition portion 25e, and an autonomous driving portion 26f. The autonomous driving device 2f is similar to the autonomous driving device 2e according to the eleventh embodiment except that the autonomous driving portion 26e is replaced with the autonomous driving portion 26f. All or part of the functions executed by the autonomous driving device 2f may be configured as hardware through the use of one or more ICs, for example. All or part of the functional blocks included in the autonomous driving device 2f may be provided as a combination of software executed by the processor and hardware members. The autonomous driving device 2f is comparable to the in-vehicle device.

The autonomous driving portion 26f performs processes concerning the replacement for driving operations by the driver. As illustrated in FIG. 25, the autonomous driving portion 26f includes sub-function blocks such as a travel planning portion 27f, a verification portion 28f, and the autonomous driving function portion 29. The autonomous driving portion 26f is similar to the autonomous driving portion 26e according to the eleventh embodiment except that the travel planning portion 27e and the verification portion 28e are replaced with the travel planning portion 27f and the verification portion 28f. Execution of processes of the travel planning portion 27f and the verification portion 28f by the computer is comparable to execution of the driving assist method.

The travel planning portion 27f is similar to the travel planning portion 27e according to the eleventh embodiment except for differences in the blind area reduction driving policy observed to plan the subject vehicle positioning while traveling. The travel planning portion 27f plans the positioning of the subject vehicle according to the driving policy ensuring that part of the lateral detection range, is larger than or equal to a predetermined range under the condition that the part of the lateral detection range is not obstructed by a parallel traveling vehicle, namely, a different vehicle traveling in the lane adjacent to the subject vehicle's cruising lane. The predetermined range may be fixed, for example. The predetermined range may be set to any adjustable values smaller than or equal to 100% of the lateral detection range. For example, suppose the lateral detection range of the periphery monitoring sensor 5e corresponds to an angular range of 110 degrees horizontally. Then, 50% of the lateral detection range corresponds to the angular range of 55 degrees horizontally. The part of the lateral detection range not obstructed by parallel traveling vehicles is hereinafter referred to as a non-obstructed range.

The travel planning portion 27f plans positioning of the subject vehicle to ensure the non-obstructed range larger than or equal to the predetermined range by using the installation position of the periphery monitoring sensor 5e regarding the subject vehicle, the lateral detection range of the periphery monitoring sensor 5a, and positions of the parallel traveling vehicle regarding the subject vehicle. An example is to place a region corresponding to the position of the parallel traveling vehicle recognized by the travel environment recognition portion 25e and the lateral detection range of the subject vehicle in a road surface coordinate system whose origin is the actual subject vehicle position. The plan may shift the subject vehicle position from the origin in the longitudinal direction along the subject vehicle's cruising lane, search for a position to ensure the non-obstructed range, in the lateral detection range for the subject vehicle, be larger than or equal to the predetermined range, and position the subject vehicle at the searched position. It may be favorable to shift the subject vehicle position in the longitudinal direction to be able to ensure the above-described safety distance to vehicles around the subject vehicle in the longitudinal direction.

Figure 26:
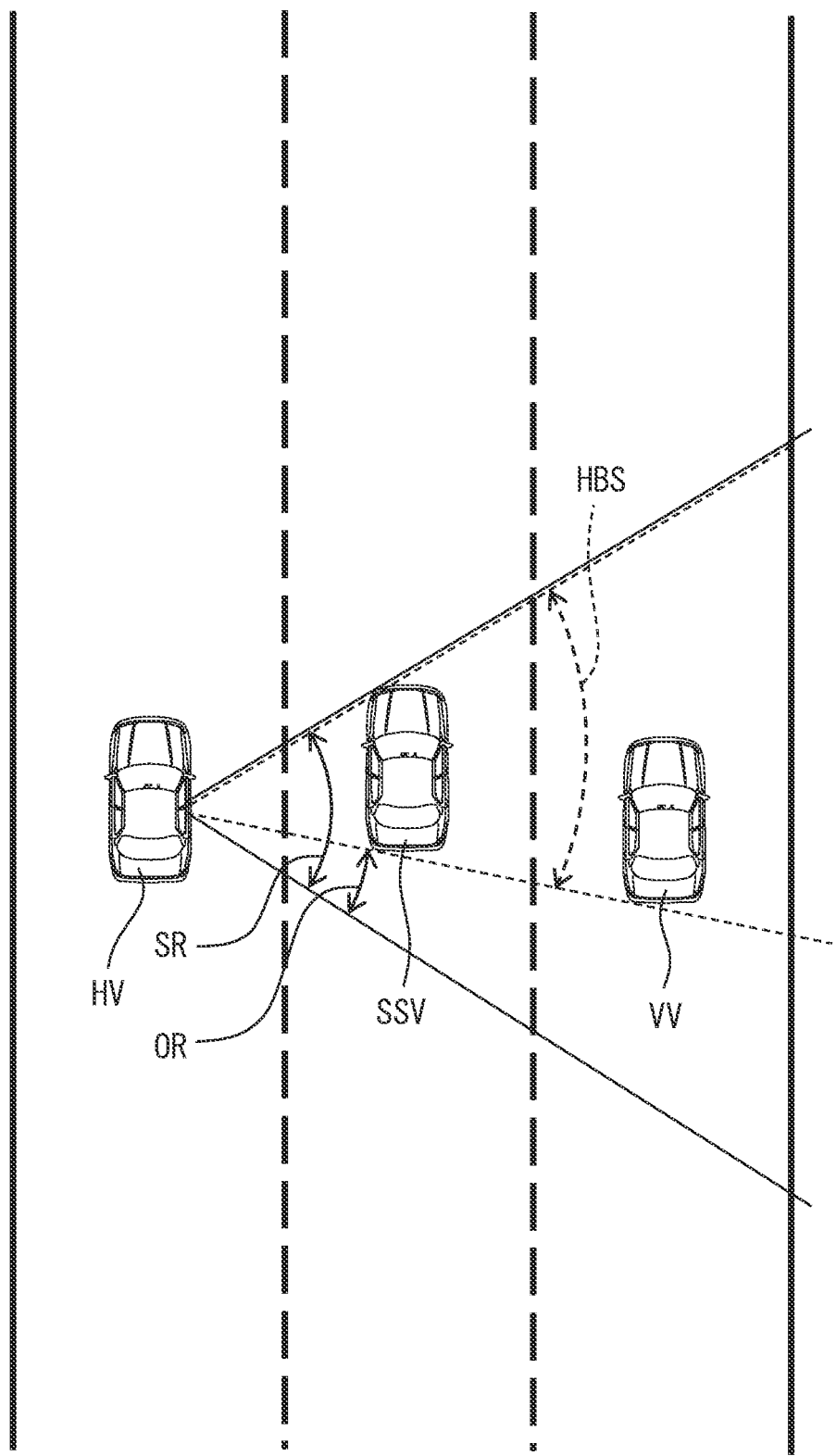
FIG. 26 is a diagram illustrating an effect of the configuration according to a twelfth embodiment.
Figure 27:
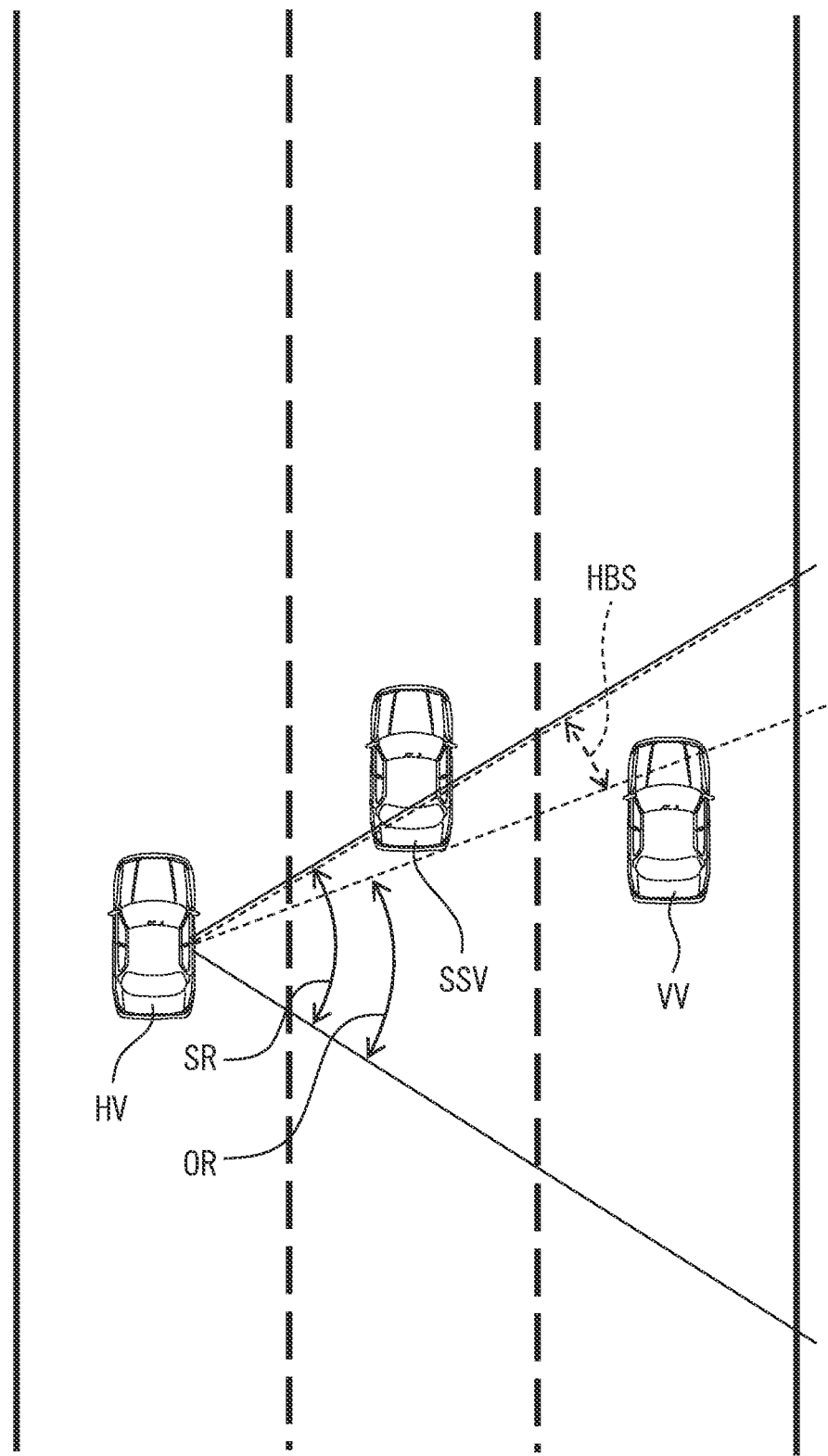
FIG. 27 is a diagram illustrating an effect of the configuration according to the twelfth embodiment.

It is possible to force the blind area entry situation to occur less frequently by ensuring the non-obstructed range larger than or equal to the predetermined range under the condition that the non-obstructed range is included in the lateral detection range and is not hindered by parallel traveling vehicles. The description below explains this effect by reference to FIGS. 26 and 27. In FIGS. 26 and 27, HV denotes the subject vehicle, SSV denotes the parallel traveling vehicle in the adjacent lane, and VV denotes the surrounding vehicle traveling in the lane further adjacent to the adjacent lane. In FIGS. 26 and 27, SR denotes the detection range of the periphery monitoring sensor 5e. In FIGS. 26 and 27, HBS denotes the blind area in the detection range SR caused by the parallel traveling vehicle SSV. In FIGS. 26 and 27, OR denotes the non-obstructed range. The same applies to FIGS. 28 and 29 described later.

As illustrated in FIG. 26, the parallel traveling vehicle SSV may cause the whole of the surrounding vehicle VV to be positioned in the range HBS. The surrounding vehicle VV travels in the lane across the adjacent lane from the subject vehicle lane. The range HBS causes a blind area in the detection range SR for the periphery monitoring sensor 5e of the subject vehicle HV. Even in such a case, as illustrated in FIG. 27, the travel position of the subject vehicle HV is settled to ensure the non-obstructed range larger than or equal to the predetermined range. It is possible to avoid a situation where the whole of the surrounding vehicle VV is positioned in the range HBS as the blind area in the detection range SR of the periphery monitoring sensor 5e.

The travel planning portion 27f may perform the process to settle the travel position of the subject vehicle HV to be able to ensure the non-obstructed range larger than or equal to the predetermined range under the condition that the subject vehicle travels on a road including three or more lanes on one side and at least two of the three or more lanes exist contiguously next to the subject vehicle lane. It is possible to more accurately recognize the surrounding vehicle that travels in the lane extending in the same direction as the subject vehicle and is likely to be positioned in a blind area due to a parallel traveling vehicle. The travel planning portion 27f may perform the process to settle the travel position of the subject vehicle HV to be able to ensure the non-obstructed range larger than or equal to the predetermined range under the condition that there is another lane adjacent to the subject vehicle lane. In this case, it is possible to more accurately recognize moving objects on a sidewalk, for example, that is likely to be a blind area due to a parallel traveling vehicle.

It may be favorable to change the predetermined range according to the behaviors scheduled for the subject vehicle. It is possible to more accurately set the predetermined range that ensures a favorable non-obstructed range depending on operational behaviors scheduled for the subject vehicle even if the favorable non-obstructed range varies with operational behaviors scheduled for the subject vehicle.

Figure 28:
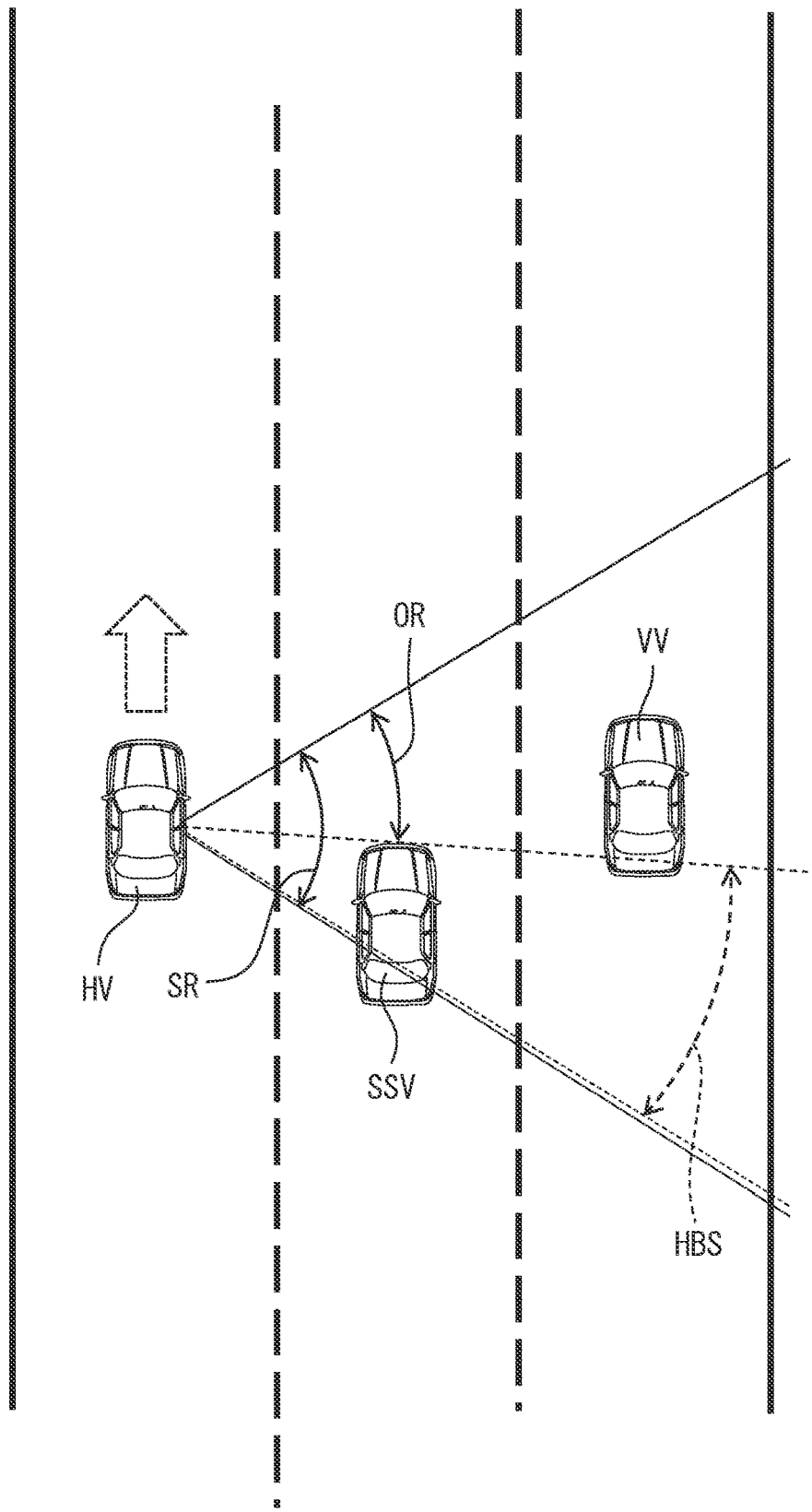
FIG. 28 is a diagram illustrating an example of changing a predetermined range according to a planned operational behavior for the subject vehicle.

For example, suppose the operational behavior scheduled for the subject vehicle is to continuously travel along the subject vehicle lane. In this case, attention needs to be paid to only moving objects that are relatively close to the subject vehicle and therefore are highly likely to approach the subject vehicle. When the operational behavior scheduled for the subject vehicle is to travel along a road, it may be favorable to ensure a relatively narrow non-obstructed range OR as illustrated in FIG. 28 to be able to detect the surrounding vehicle VV relatively closed to the subject vehicle HV. Therefore, it may be favorable to provide a relatively narrow predetermined range when the operational behavior scheduled for the subject vehicle is to travel along a road. For example, it may be favorable to provide the predetermined range equal to 50% of the lateral detection range.

Figure 29:
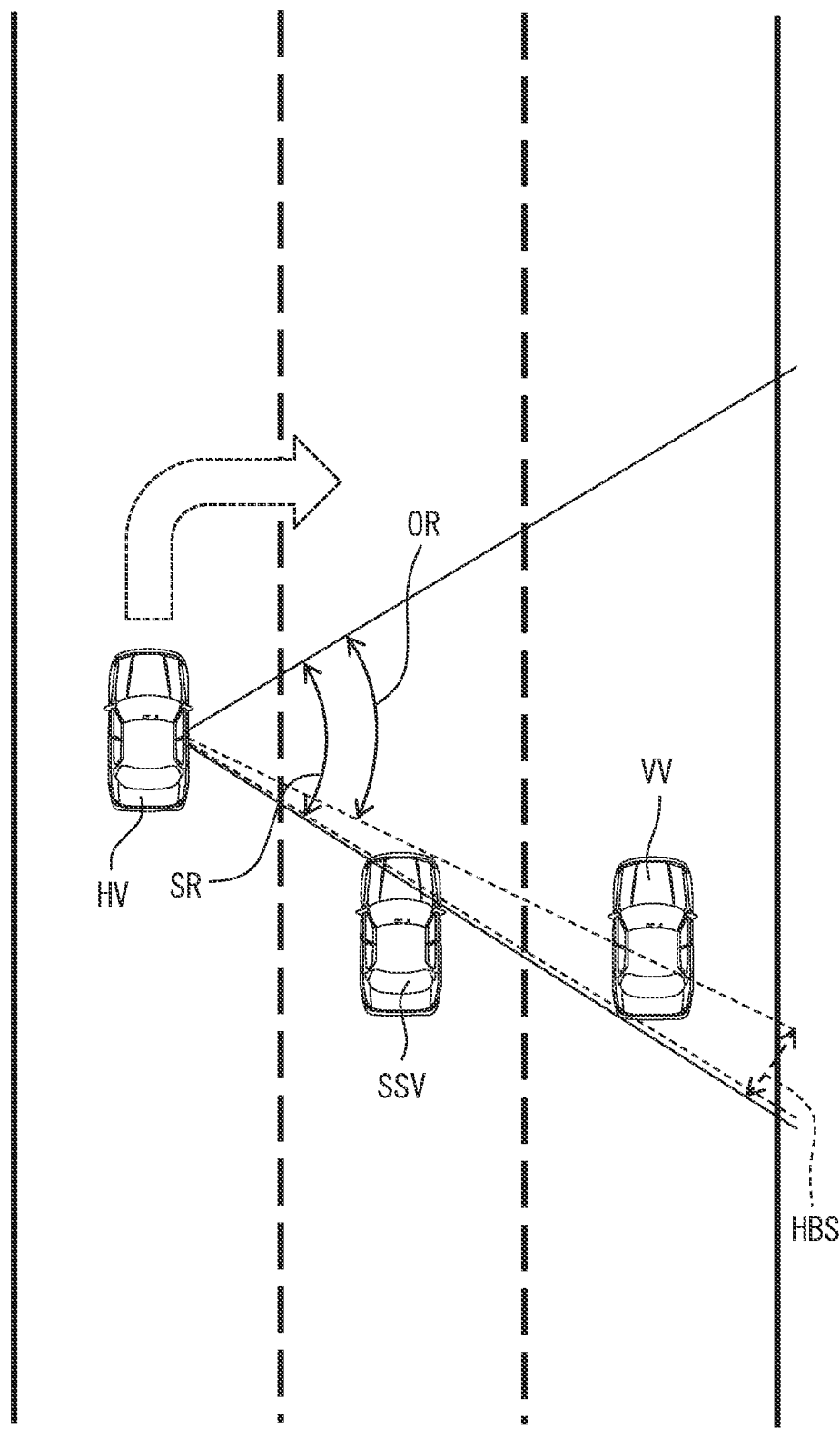
FIG. 29 is a diagram illustrating an example of changing a predetermined range according to the planned operational behavior for the subject vehicle.

Suppose the operational behavior scheduled for the subject vehicle is to change the course for sensing on the periphery monitoring sensor 5e. In this case, attention needs to be paid to moving objects that exist in a range relatively far from the subject vehicle and are highly likely to approach the subject vehicle. When the operational behavior scheduled for the subject vehicle is the course change, it may be necessary to ensure a relatively wide non-obstructed range OR as illustrated in FIG. 29 to be able to detect the surrounding vehicle VV relatively far from the subject vehicle HV. When the operational behavior scheduled for the subject vehicle is the above-described course change, it may be favorable to provide a predetermined range wider than that for the travel along a road. For example, it may be favorable to provide the predetermined range equal to 80% of the lateral detection range. The course change includes turning right or left and lane changes.

Similar to the verification portion 28c according to the ninth embodiment, the verification portion 28f evaluates the safety of travel plans generated by the travel planning portion 27f. Similar to the verification portion 28c according to the ninth embodiment, the verification portion 28f evaluates a travel plan based on the driving rule determination information and determines whether to permit this travel plan based on the evaluation. The verification portion 28f may include the safety distance setting portion 281 as a sub-function block, for example.

The travel plan scheduled by the travel planning portion 27f may satisfy the driving rule. Then, the verification portion 28f permits this travel plan. The verification portion 28f outputs the permitted travel plan to the autonomous driving function portion 29. The travel plan scheduled by the travel planning portion 27f may not satisfy the driving rule. Then, the verification portion 28f disallows this travel plan. The verification portion 28f does not output the disallowed travel plan to the autonomous driving function portion 29. The verification portion 28f may allow the travel planning portion 27f to correct the disallowed travel plan that was scheduled by the travel planning portion 27f.

Overview of the Twelfth Embodiment

Similar to the ninth embodiment, the twelfth embodiment schedules at least the subject vehicle positioning while traveling as a travel plan according to the driving policy that forces the blind area entry situation to occur less frequently. The blind area entry situation occurs when a different vehicle causes a moving object other than the different vehicle to be positioned in the blind area for the detection range of the periphery monitoring sensor. Similar to the ninth embodiment, it is possible to reduce the potential possibility for the subject vehicle to deviate from the traffic rules.

The twelfth embodiment plans the subject vehicle positioning while traveling to be able to ensure that the part of the lateral detection range, not hindered by parallel traveling vehicles, is larger than or equal to the predetermined range. It is possible to reduce a blind area in the detection range of the periphery monitoring sensor 5e due to a parallel traveling vehicle and force the blind area entry situation to occur less frequently. Because the blind area entry situation occurs less frequently, it is possible to reduce the potential possibility for the subject vehicle to deviate from the traffic rules.

The configuration of the twelfth embodiment may be combined with the configuration of the sixth embodiment. The twelfth embodiment may plan the subject vehicle positioning while traveling so that the travel planning portion 27f also includes the functions of the safety distance setting portion 281 and the positioning ensures the safety distance set by the safety distance setting portion 281.

Thirteenth Embodiment

The configuration according to the twelfth embodiment changes the non-obstructed range ensured in the lateral detection range according to the operational behavior scheduled for the subject vehicle. However, the configuration is not limited thereto. As described below, for example, the thirteenth embodiment may change a sensing range ensured not to be hindered by surrounding vehicles according to the operational behavior scheduled for the subject vehicle.

The thirteenth embodiment describes examples where the sensing range of the periphery monitoring sensor 5e applies at least from the front to the side of the subject vehicle. When the operational behavior scheduled for the subject vehicle is to change lanes, the travel planning portion 27f may plan the positioning so that at least the sensing range on the side of the subject vehicle is not hindered by surrounding vehicles. When the operational behavior scheduled for the subject vehicle is to travel a curved road, the travel planning portion 27f may plan the positioning so that at least the sensing range diagonally ahead of the subject vehicle is not hindered by surrounding vehicles. When the operational behavior scheduled for the subject vehicle is passing on a passing lane, the travel planning portion 27f may plan the positioning so that at least the sensing range ahead of the subject vehicle is not hindered by surrounding vehicles. When the operational behavior scheduled for the subject vehicle is traveling through traffic congestion, the travel planning portion 27f may plan the positioning so that at least the sensing range on the side of the subject vehicle is not hindered by surrounding vehicles.

In the above-described examples, the positioning may be planned not only so that the sensing range is not hindered by surrounding vehicles, but also so that the extent of the sensing range hindered by surrounding vehicles is smaller than or equal to a predetermined level. The configuration of the thirteenth embodiment may be combined with configurations other than the twelfth embodiment.

Fourteenth Embodiment

As described below, the fourteenth embodiment may force the blind area entry situation to occur less frequently by planning the subject vehicle positioning while traveling according to a blind area reduction driving policy different from those described in the ninth through twelfth embodiments.

<Outline Configuration of Vehicle System 1g>

Figure 30:
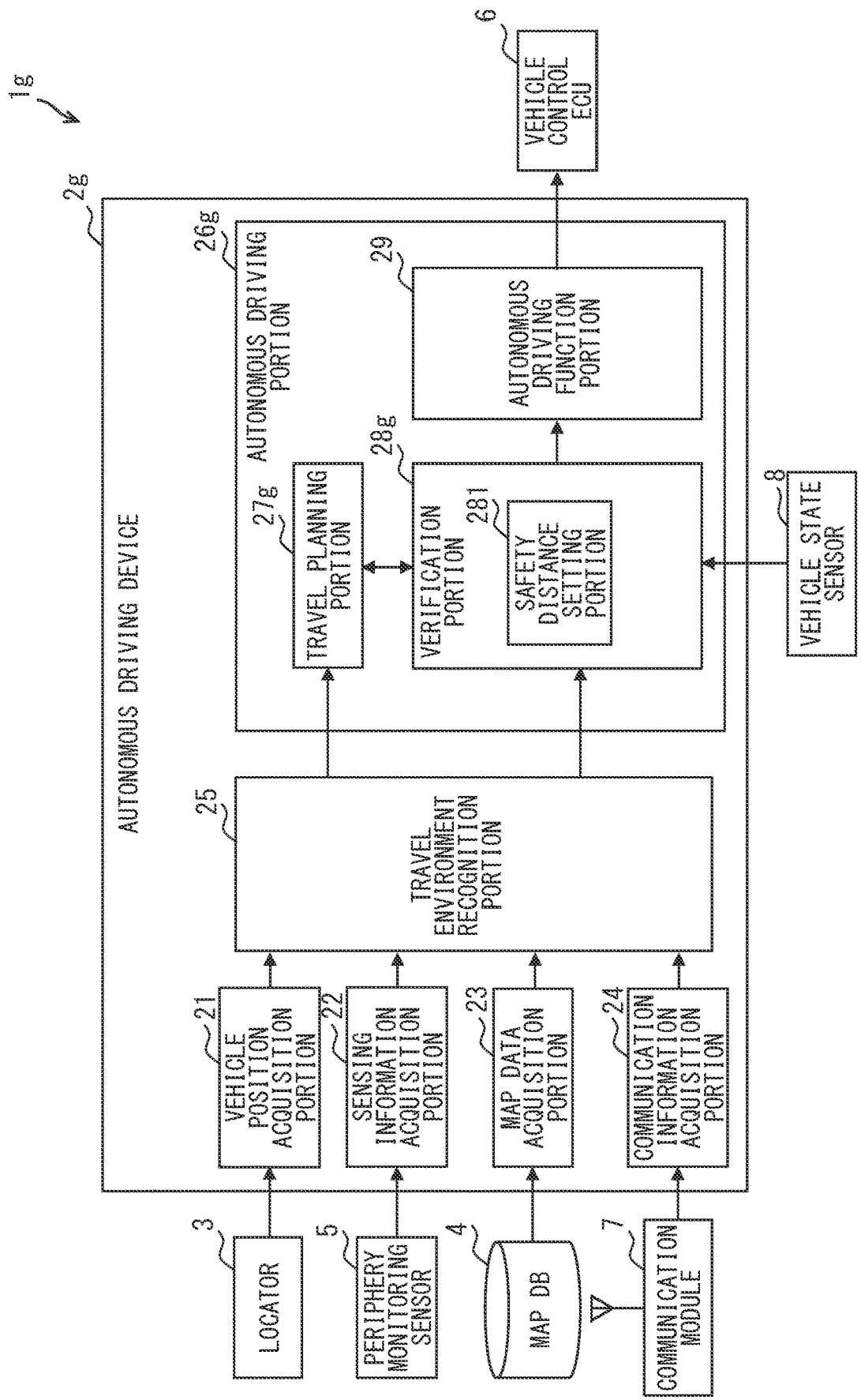
FIG. 30 is a diagram illustrating a schematic configuration of a vehicle system and an autonomous driving device.

The description below explains the fourteenth embodiment by reference to the drawings. A vehicle system 1g illustrated in FIG. 30 is used for an autonomous driving vehicle. The autonomous driving vehicle is interpreted similarly to the first embodiment. For example, the fourteenth embodiment may use the vehicle system 1g for autonomous driving vehicles that perform the autonomous driving of automation level 3 or higher.

As illustrated in FIG. 30, the vehicle system 1g includes an autonomous driving device 2g, the locator 3, the map DB 4, the periphery monitoring sensor 5, the vehicle control ECU 6, the communication module 7, and the vehicle state sensor 8. Vehicles that use the vehicle system 1g are not necessarily limited to automobiles. However, the description below explains examples of using the vehicle system 1g for automobiles. The vehicle system 1g is similar to the vehicle system 1c according to the ninth embodiment except that the autonomous driving device 2c is replaced with autonomous driving device 2e, the periphery monitoring sensor 5a is replaced with the periphery monitoring sensor 5, and the map DB 4a is replaced with map DB 4.

The periphery monitoring sensor 5 is equal to the periphery monitoring sensor 5 according to the first embodiment. The map DB 4 is equal to the map DB 4 according to the first embodiment. The autonomous driving device 2g is similar to the autonomous driving device 2c according to the ninth embodiment except for different processes to be performed. The details of the autonomous driving device 2g is described below.

<Outline Configuration of Autonomous Driving Device 2g>

The description below explains an outline configuration of the autonomous driving device 2g by reference to FIG. 30. As illustrated in FIG. 30, the autonomous driving device 2g includes functional blocks such as the vehicle position acquisition portion 21, the sensing information acquisition portion 22, the map data acquisition portion 23, the communication information acquisition portion 24, the travel environment recognition portion 25, and an autonomous driving portion 26g. The autonomous driving device 2g is similar to the autonomous driving device 2c according to the ninth embodiment except that the sensing information acquisition portion 22a is replaced with the sensing information acquisition portion 22, the map data acquisition portion 23a is replaced with the map data acquisition portion 23, the travel environment recognition portion 25a is replaced with the travel environment recognition portion 25e, and the autonomous driving portion 26c is replaced with the autonomous driving portion 26g. All or part of the functions executed by the autonomous driving device 2g may be configured as hardware through the use of one or more ICs, for example. All or part of the functional blocks included in the autonomous driving device 2g may be provided as a combination of software executed by the processor and hardware members. The autonomous driving device 2g is comparable to the in-vehicle device.

The sensing information acquisition portion 22 is equal to the sensing information acquisition portion 22 according to the first embodiment. The map data acquisition portion 23 is equal to the map data acquisition portion 23 according to the first embodiment. The travel environment recognition portion 25 is equal to the travel environment recognition portion 25 according to the first embodiment.

The autonomous driving portion 26g performs processes concerning the replacement for driving operations by the driver. As illustrated in FIG. 30, the autonomous driving portion 26g includes sub-function blocks such as a travel planning portion 27g, a verification portion 28g, and the autonomous driving function portion 29. The autonomous driving portion 26g is similar to the autonomous driving portion 26c according to the ninth embodiment except that the travel planning portion 27c and the verification portion 28c are replaced with the travel planning portion 27g and the verification portion 28g. Execution of processes of the travel planning portion 27g and the verification portion 28g by the computer is comparable to execution of the driving assist method.

The travel planning portion 27g is similar to the travel planning portion 27c according to the ninth embodiment except for differences in the blind area reduction driving policy observed to plan the subject vehicle positioning while traveling. The travel planning portion 27g plans the positioning of the subject vehicle according to the driving policy that prevents a relative position of the subject vehicle to a different vehicle other than the subject vehicle from keeping for a specified time period or longer. The specified time period may be set to any values.

It is possible to force the blind area entry situation to occur less frequently by preventing the positional relationship between the subject vehicle and a different vehicle other than the subject vehicle from maintaining for a specified time period or longer. The description below explains this effect by reference to FIGS. 23 and 24 as described above. In FIGS. 23 and 24, SR denotes the detection range for the periphery monitoring sensor 5 of the subject vehicle HV. As illustrated in FIG. 23, the parallel traveling vehicle SSV widens the range HBS according to the positional relationship between the subject vehicle HV and the parallel traveling vehicle SSV. The range HBS causes a blind area in the detection range SR for the periphery monitoring sensor 5 of the subject vehicle HV. The surrounding vehicle VV is highly likely to be unrecognizable in this blind area if the subject vehicle HV keeps this positional relationship with the parallel traveling vehicle SSV. However, as illustrated in FIG. 24, the travel position of the subject vehicle HV may be changed to be able to change the positional relationship between the subject vehicle HV and the parallel traveling vehicle SSV. It is possible to narrow the range HBS as a blind area caused by the parallel traveling vehicle SSV in the detection range SR for the periphery monitoring sensor 5 of the subject vehicle HV. Consequently, it is possible to force the blind area entry situation to occur less frequently. Positioning to change the positional relationship between the subject vehicle HV and the parallel traveling vehicle SSV may be provided to be able to ensure the safety distance to vehicles around the subject vehicle HV in the longitudinal direction.

The positioning of the subject vehicle regarding the different vehicle may be changed in the longitudinal or lateral direction to be able to prevent the positional relationship between the subject vehicle and the different vehicle from remaining the same for a specified period or longer.

Similar to the verification portion 28c according to the ninth embodiment, the verification portion 28g evaluates the safety of travel plans generated by the travel planning portion 27g. Similar to the verification portion 28c according to the ninth embodiment, the verification portion 28g evaluates a travel plan based on the driving rule determination information and determines whether to permit this travel plan based on the evaluation. The verification portion 28g may include the safety distance setting portion 281 as a sub-function block, for example.

The travel plan scheduled by the travel planning portion 27g may satisfy the driving rule. Then, the verification portion 28g permits this travel plan. The verification portion 28g outputs the permitted travel plan to the autonomous driving function portion 29. The travel plan scheduled by the travel planning portion 27g may not satisfy the driving rule. Then, the verification portion 28g disallows this travel plan. The verification portion 28g does not output the disallowed travel plan to the autonomous driving function portion 29. The verification portion 28g may allow the travel planning portion 27g to correct the disallowed travel plan that was scheduled by the travel planning portion 27g.

Overview of the Fourteenth Embodiment

Similar to the ninth embodiment, the fourteenth embodiment schedules at least the subject vehicle positioning while traveling as a travel plan according to the driving policy that forces the blind area entry situation to occur less frequently. The blind area entry situation occurs when a different vehicle causes a moving object other than the different vehicle to be positioned in the blind area for the detection range of the periphery monitoring sensor. Similar to the ninth embodiment, it is possible to reduce the potential possibility for the subject vehicle to deviate from the traffic rules.

The fourteenth embodiment plans the subject vehicle positioning while traveling to be able to prevent the positional relationship between the subject vehicle and a different vehicle other than the subject vehicle from remaining the same for a specified period or longer. The positional relationship between the subject vehicle and the different vehicle may increase a blind area caused by the different vehicle in the detection range for the periphery monitoring sensor 5. Even in such a case, it is possible to prevent the positional relationship from remaining the same and decrease the blind area. Consequently, it is possible to force the blind area entry situation to occur less frequently and reduce the potential possibility for the subject vehicle to deviate from the traffic rules.

The configuration of the fourteenth embodiment may be combined with the configuration of the sixth embodiment. The fourteenth embodiment may plan the subject vehicle positioning while traveling so that the travel planning portion 27g also includes the functions of the safety distance setting portion 281 and the positioning ensures the safety distance set by the safety distance setting portion 281.

Fifteenth Embodiment

As described below, the fifteenth embodiment may force the blind area entry situation to occur less frequently by planning the subject vehicle positioning while traveling according to a blind area reduction driving policy different from those described in the ninth through twelfth and fourteenth embodiments.

<Outline Configuration of Vehicle System 1h>

Figure 31:
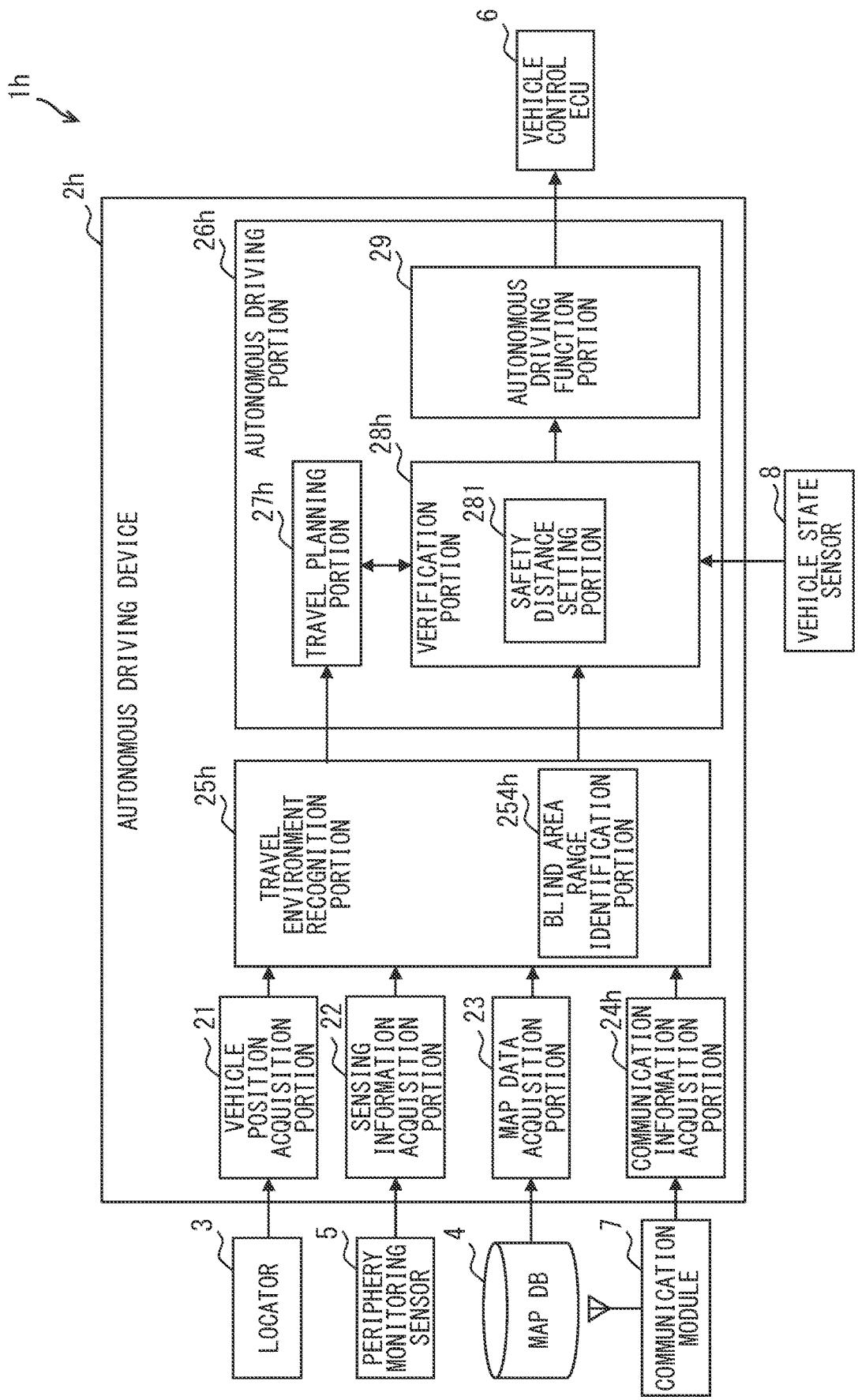
FIG. 31 is a diagram illustrating a schematic configuration of a vehicle system and an autonomous driving device.

The description below explains the fifteenth embodiment by reference to the drawings. A vehicle system 1h illustrated in FIG. 31 is used for an autonomous driving vehicle. The autonomous driving vehicle is interpreted similarly to the first embodiment. For example, the fifteenth embodiment may use the vehicle system 1h for autonomous driving vehicles that perform the autonomous driving of automation level 3 or higher.

As illustrated in FIG. 31, the vehicle system 1h includes an autonomous driving device 2h, the locator 3, the map DB 4, the periphery monitoring sensor 5, the vehicle control ECU 6, the communication module 7, and the vehicle state sensor 8. Vehicles that use the vehicle system 1h are not necessarily limited to automobiles. However, the description below explains examples of using the vehicle system 1h for automobiles. The vehicle system 1h is similar to the vehicle system 1c according to the ninth embodiment except that the autonomous driving device 2c is replaced with autonomous driving device 2h, the periphery monitoring sensor 5a is replaced with the periphery monitoring sensor 5, and the map DB 4a will be replaced with map DB 4.

The periphery monitoring sensor 5 is equal to the periphery monitoring sensor 5 according to the first embodiment. The map DB 4 is equal to the map DB 4 according to the first embodiment. The autonomous driving device 2h is similar to the autonomous driving device 2c according to the ninth embodiment except for different processes to be performed. The details of the autonomous driving device 2h is described below.

<Outline Configuration of Autonomous Driving Device 2h>

The description below explains an outline configuration of the autonomous driving device 2h by reference to FIG. 31. As illustrated in FIG. 31, the autonomous driving device 2h includes functional blocks such as a vehicle position acquisition portion 21, the sensing information acquisition portion 22, the map data acquisition portion 23, a communication information acquisition portion 24h, a travel environment recognition portion 25h, and an autonomous driving portion 26h. The autonomous driving device 2h is similar to the autonomous driving device 2c according to the ninth embodiment except that the sensing information acquisition portion 22a is replaced with the sensing information acquisition portion 22, the communication information acquisition portion 24 is replaced with the communication information acquisition portion 24h, the map data acquisition portion 23a is replaced with the map data acquisition portion 23, the travel environment recognition portion 25a is replaced with the travel environment recognition portion 25h, and the autonomous driving portion 26c is replaced with the autonomous driving portion 26h. All or part of the functions executed by the autonomous driving device 2h may be configured as hardware through the use of one or more ICs, for example. All or part of the functional blocks included in the autonomous driving device 2h may be provided as a combination of software executed by the processor and hardware members. The autonomous driving device 2h is comparable to the in-vehicle device.

The sensing information acquisition portion 22 is equal to the sensing information acquisition portion 22 according to the first embodiment. The map data acquisition portion 23 is equal to the map data acquisition portion 23 according to the first embodiment.

The communication information acquisition portion 24h is similar to the communication information acquisition portion 24 according to the first embodiment except that the surrounding vehicle information to be acquired includes positions of periphery monitoring sensors mounted on surrounding vehicles and sensing range information, for example The travel environment recognition portion 25h is similar to the travel environment recognition portion 25 according to the first embodiment except that the subject vehicle's travel environment to be recognized includes: a sensing range for a target different vehicle, namely, a surrounding vehicle regarding the subject vehicle; and a blind area range corresponding to a blind area in the sensing range caused by a vehicle other than the target different vehicle and the subject vehicle. The travel environment recognition portion 25h includes a blind area range identification portion 254h as a sub-function block. The blind area range identification portion 254h identifies the blind area range. For example, the blind area range identification portion 254h may identify the blind area range as follows. The blind area range identification portion 254h identifies an area corresponding to the position of the different vehicle other than the subject vehicle regarding the subject vehicle position based on the sensing information acquired by the sensing information acquisition portion 22, for example. The blind area range identification portion 254h identifies the area corresponding to the sensing range for the different vehicle regarding the subject vehicle position based on the information such as the identified different vehicle position, the installation position of the periphery monitoring sensor mounted on the different vehicle acquired by the communication information acquisition portion 24h, and the sensing range. The above-described blind area range is identified through the use of the information such as the area corresponding to the position of the different vehicle and the area corresponding to the sensing range for the different vehicle.

The autonomous driving portion 26h performs processes concerning the replacement for driving operations by the driver. As illustrated in FIG. 31, the autonomous driving portion 26h includes sub-function blocks such as a travel planning portion 27h, a verification portion 28h, and the autonomous driving function portion 29. The autonomous driving portion 26h is similar to the autonomous driving portion 26c according to the ninth embodiment except that the travel planning portion 27c and the verification portion 28c are replaced with the travel planning portion 27h and the verification portion 28h. Execution of processes of the travel planning portion 27h and the verification portion 28h by the computer is comparable to execution of the driving assist method.

The travel planning portion 27h is similar to the travel planning portion 27c according to the ninth embodiment except for differences in the blind area reduction driving policy observed to plan the subject vehicle positioning while traveling. The travel planning portion 27h plans the positioning of the subject vehicle according to the driving policy to prevent the subject vehicle from being frequently positioned within the blind area range as a blind area that is included in the sensing range for the target different vehicle and is caused by a vehicle other than the target different vehicle and the subject vehicle. The travel planning portion 27h may plan the positioning of the subject vehicle outside the blind area range identified by the blind area range identification portion 254h, if possible. The blind area range may encompass multiple surrounding vehicles around the subject vehicle. Then, the travel planning portion 27h may plan the positioning of the subject vehicle to be able to minimize the blind area range where the subject vehicle is positioned.

Figure 32:
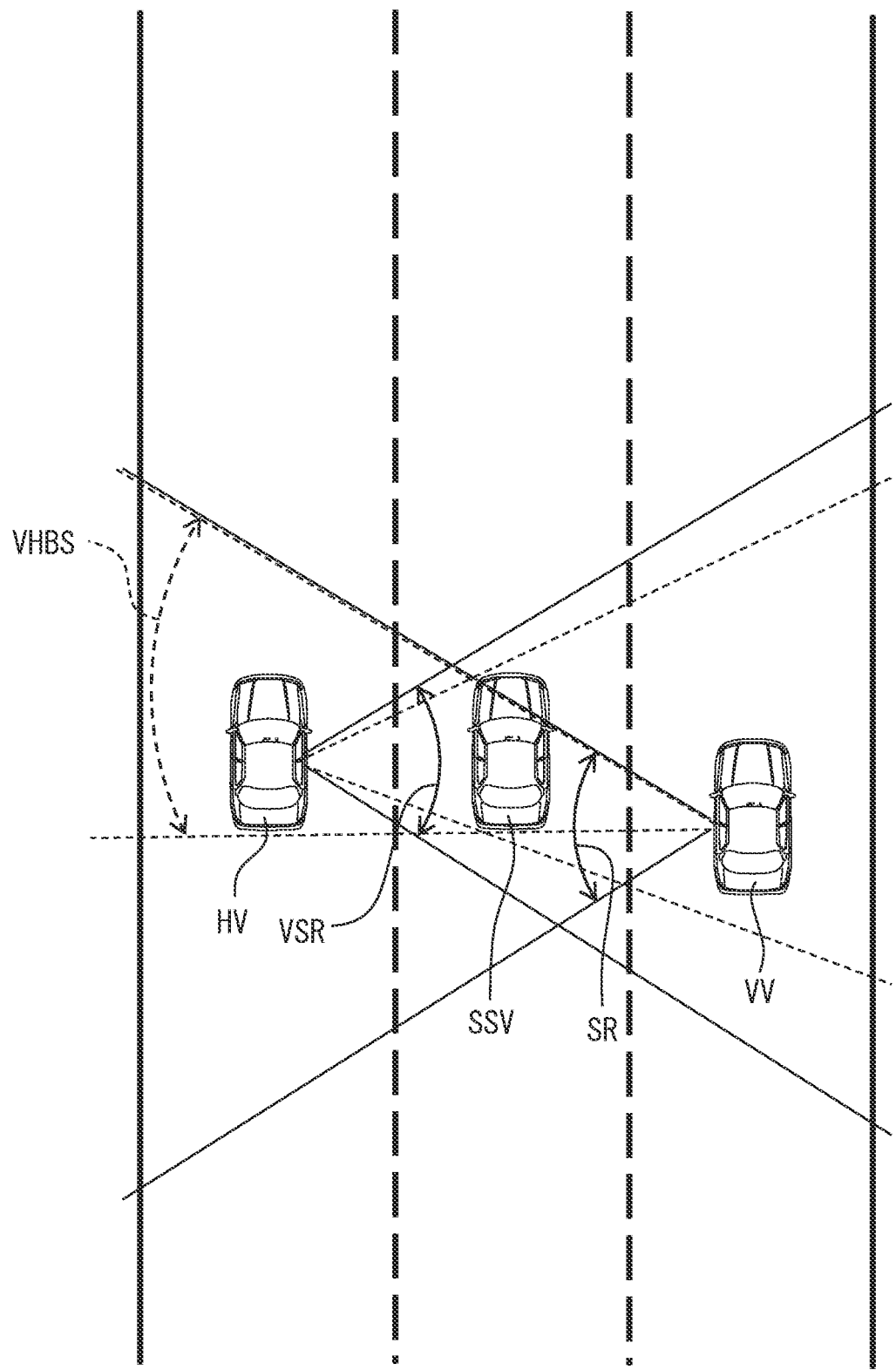
FIG. 32 is a diagram illustrating an effect of the configuration according to a fifteenth embodiment.
Figure 33:
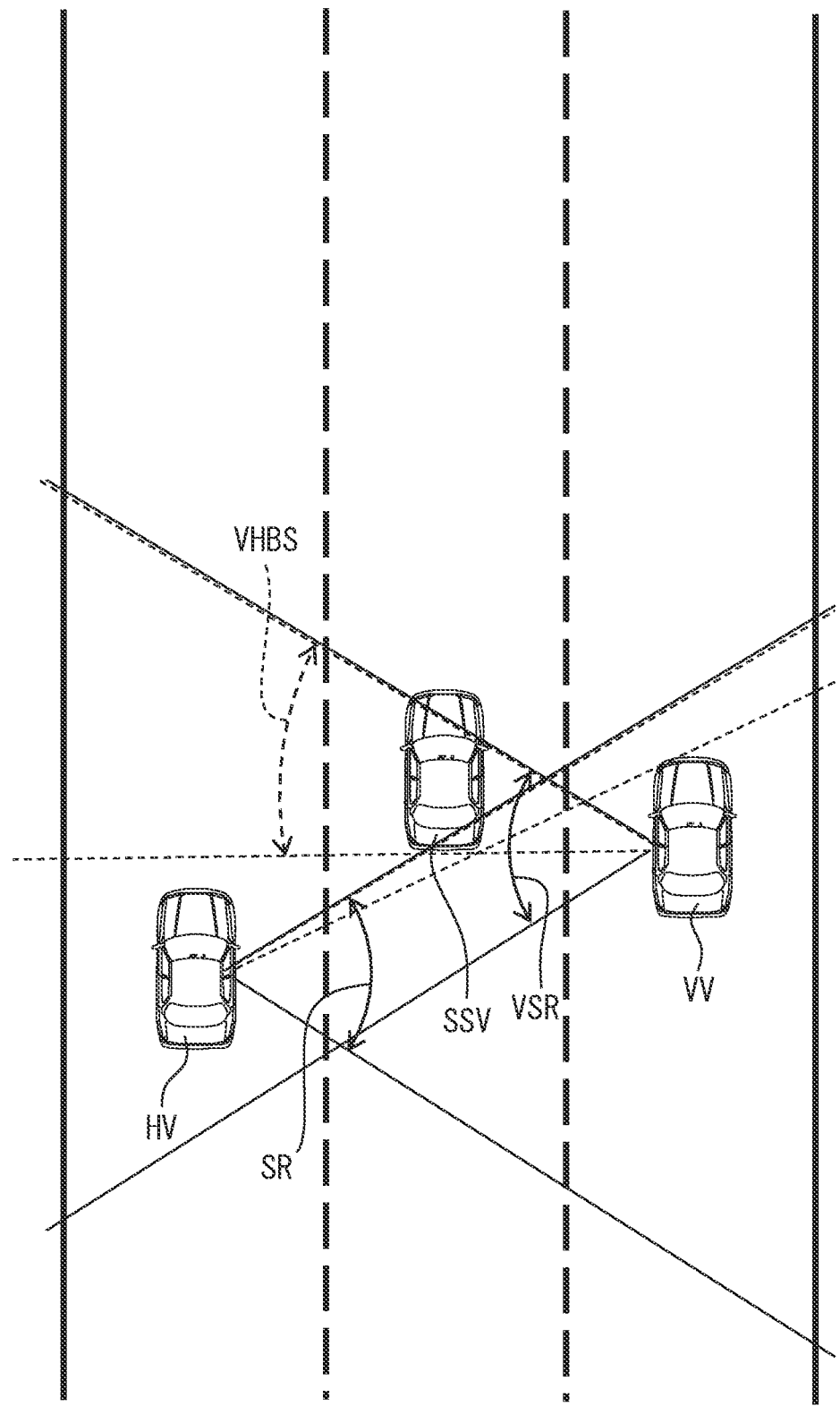
FIG. 33 is a diagram illustrating an effect of the configuration according to the fifteenth embodiment.

It is possible to force the blind area entry situation to occur less frequently by preventing the subject vehicle from being frequently positioned in the blind area range corresponding to a blind area that is included in the sensing range for the target different vehicle and is caused by a vehicle other than the target different vehicle and the subject vehicle. The description below explains this effect by reference to FIGS. 32 and 33. In FIGS. 32 and 33, HV denotes the subject vehicle, SSV denotes the parallel traveling vehicle in the adjacent lane, and VV denotes the surrounding vehicle traveling in the lane further adjacent to the adjacent lane. In FIGS. 32 and 33, SR denotes the detection range for the periphery monitoring sensor 5 of the subject vehicle HV. In FIGS. 32 and 33, HBS denotes the blind area in the detection range SR caused by the parallel traveling vehicle SSV. In FIGS. 32 and 33, VSR denotes the detection range (sensing range) for the periphery monitoring sensor of the surrounding vehicle VV. In FIGS. 32 and 33, VHBS denotes the range corresponding to the blind area in the detection range VSR caused by the parallel traveling vehicle SSV.

As illustrated in FIG. 32, the subject vehicle HV is positioned in the blind area range VHBS, caused by the parallel traveling vehicle SSV, in the sensing range for the surrounding vehicle VV. In this case, the surrounding vehicle VV is also highly likely to be positioned in the blind area range HBS, caused by the parallel traveling vehicle SSV, in the detection range for the periphery monitoring sensor 5 of the subject vehicle HV. However, as illustrated in FIG. 33, the travel position of the subject vehicle HV is changed so that the subject vehicle HV is positioned outside the blind area range VHBS, caused by the parallel traveling vehicle SSV, in the sensing range of the surrounding vehicle VV. In this case, the surrounding vehicle VV is also highly likely to be positioned outside the blind area range HBS, caused by the parallel traveling vehicle SSV, in the detection range for the periphery monitoring sensor 5 of the subject vehicle HV. Consequently, it is possible to force the blind area entry situation to occur less frequently. The positioning to change the travel position of the subject vehicle HV may be planned to be able to ensure the safety distance to vehicles around the subject vehicle HV in the longitudinal and lateral directions.

Similar to the verification portion 28c according to the ninth embodiment, the verification portion 28h evaluates the safety of travel plans generated by the travel planning portion 27h. Similar to the verification portion 28c according to the ninth embodiment, the verification portion 28h evaluates a travel plan based on the driving rules and determines whether to permit this travel plan based on the evaluation. The verification portion 28h may include the safety distance setting portion 281 as a sub-function block, for example.

The travel plan scheduled by the travel planning portion 27h may satisfy the driving rule. Then, the verification portion 28h permits this travel plan. The verification portion 28h outputs the permitted travel plan to the autonomous driving function portion 29. The travel plan scheduled by the travel planning portion 27h may not satisfy the driving rule. Then, the verification portion 28h disallows this travel plan. The verification portion 28h does not output the disallowed travel plan to the autonomous driving function portion 29. The verification portion 28h may allow the travel planning portion 27h to correct the disallowed travel plan that was scheduled by the travel planning portion 27h.

Overview of the Fifteenth Embodiment

Similar to the ninth embodiment, the fifteenth embodiment schedules at least the subject vehicle positioning while traveling as a travel plan according to the driving policy that forces the blind area entry situation to occur less frequently. The blind area entry situation occurs when a different vehicle causes a moving object other than the different vehicle to be positioned in the blind area for the detection range of the periphery monitoring sensor. Similar to the ninth embodiment, it is possible to reduce the potential possibility for the subject vehicle to deviate from the traffic rules.

The fifteenth embodiment plans the subject vehicle positioning while traveling to be able to prevent the subject vehicle from being frequently positioned in the blind area range as a blind area that is included in the sensing range for the target different vehicle and is caused by a vehicle other than the target different vehicle and the subject vehicle. Consequently, as above, it is possible to force the blind area entry situation to occur less frequently and reduce the potential possibility for the subject vehicle to deviate from the traffic rules.

The configuration of the fifteenth embodiment may be combined with the configuration of the sixth embodiment. The fifteenth embodiment may plan the subject vehicle positioning while traveling so that the travel planning portion 27h also includes the functions of the safety distance setting portion 281 and the positioning ensures the safety distance set by the safety distance setting portion 281.

Sixteenth Embodiment

The configuration according to the above-described embodiments calculates the default safety distance based on the mathematical formula model. However, the configuration is not limited thereto. The default safety distance may be calculated without the use of the mathematical formula model. The safety distance setting portion 281, 281a, or 281b may calculate the safety distance based on the other indexes such as TTC (Time To Collision) by using information about the behavior of the subject vehicle and moving objects around the subject vehicle, for example.

Seventeenth Embodiment

The configuration according to the above-described embodiments separates the autonomous driving device 2, 2a, 2b, 2c, 2d, 2e, 2f, 2g, or 2h from the vehicle control ECU 6. However, the configuration is not limited thereto. For example, the autonomous driving device 2, 2a, 2b, 2c, 2d, 2e, 2f, 2g, or 2h may also function as the vehicle control ECU 6. The autonomous driving device 2, 2a, 2b, 2c, 2d, 2e, 2f, 2g, or 2h may also function as the locator 3.

The present disclosure is not limited to the above-described embodiments but various modifications may be made within the scope of the appended claims. The technical scope of the present disclosure also covers an embodiment acquired by appropriately combining the technical arrangements disclosed in the different embodiments. The control portion and the method thereof described in the present disclosure may be provided by a dedicated computer configuring a processor that is programmed to perform one or more functions embodied by a computer program. Alternatively, the apparatus and the method thereof described in the present disclosure may be provided by a dedicated hardware logic circuit. Moreover, the apparatus and the method thereof described in the present disclosure may be provided by one or more dedicated computers configured by a combination of a processor to execute computer programs and one or more hardware logic circuits. The computer program as an instruction executed by the computer may be stored in a computer-readable non-transitory tangible storage medium.

The above-described embodiment may be summarized as follows.

First aspect: A driving assist method, comprising:
setting a minimum safety distance to an obstacle to avoid an approach between a vehicle and the obstacle;
identifying a size of a leading vehicle in front of the vehicle; and
adjusting the safety distance in a longitudinal direction of the vehicle according to the size of the identified leading vehicle so that an angular range within which the leading vehicle is expected be encompassed is equal to or smaller than a predetermined range, the angular range being included in a detection range of a periphery monitoring sensor (5a) that is configured to detect an obstacle around the vehicle.

Second aspect: A driving assist method, comprising:
setting a minimum safety distance to an obstacle to avoid an approach between a vehicle and the obstacle;
identifying a size of a surrounding vehicle around the vehicle; and
adjusting the safety distance in either a longitudinal direction or a lateral direction of the vehicle according to the size of the surrounding vehicle so that the vehicle does not enter a range that is expected to be occupied by the surrounding vehicle during turning.

Third aspect: An in-vehicle device, comprising:
a safety distance setting portion that is configured to set a minimum safety distance to an obstacle to avoid an approach between a vehicle capable of performing autonomous driving and the obstacle;
an obstacle identification portion that is configured to identify the obstacle around the vehicle;
a range specification portion that is configured to specify, when a front obstacle is identified, by the obstacle identification portion, as the obstacle to be passed, a required range within which an oncoming vehicle should not be located in order for the vehicle to complete passing the obstacle identified by the obstacle identification portion while maintaining the safety distance to the oncoming vehicle that is set by the safety distance setting portion; and
an autonomous driving function portion that is configured to automatically perform passing by the front obstacle when the oncoming vehicle does not located within the required range specified by the range specification portion.

Fourth aspect: The in-vehicle device according to the second aspect, wherein
the autonomous driving function portion does not automatically perform passing the front obstacle when an oncoming vehicle is located within the required range specified by the range specification portion.

Fifth aspect: The in-vehicle device according to the third aspect, wherein
the autonomous driving function portion is configured to automatically perform a lane change to an adjacent lane when the obstacle identification portion identifies a front obstacle to be passed and when the cruising lane for the vehicle is a multi-lane road on one side.

Sixth aspect: The in-vehicle device according to the third aspect, wherein
the range specification portion is configured to sequentially re-specify the required range when an oncoming vehicle is located within the specified required range, and
when a front obstacle specified by the obstacle identification portion as the obstacle to be passed is a stable object, when an oncoming vehicle is located within the required range specified by the range specification portion, and when a cruising path for the vehicle is either a one-lane road on one side or a two-way traffic road with no center line, the autonomous driving function portion is configured to control the vehicle to stop and then automatically perform passing the front obstacle in response to the oncoming vehicle being located outside of the required range that was re-specified by the range specification portion.

Seventh aspect: The in-vehicle device according to the third aspect, wherein when the obstacle identification portion is able to identify one or more oncoming vehicles as an obstacle for the vehicle, the range specification portion is configured to specify the required range using information about an oncoming vehicle nearest to the vehicle among the one or more oncoming vehicles identified by the obstacle identification portion.

Eighth aspect: The in-vehicle device according to the third aspect, wherein when the obstacle identification portion is not able to identify an oncoming vehicle as an obstacle for the vehicle, the range specification portion is configured to specify the required range using information about a predetermined virtual oncoming vehicle.

Ninth aspect: The in-vehicle device according to the third aspect, wherein the safety distance set by the safety distance setting portion is calculated based on a predetermined mathematical formula model and serves as a basis for evaluating safety between the vehicle and the obstacle.

Tenth aspect: A driving assist method, comprising:

setting a minimum safety distance to an obstacle to avoid an approach between a vehicle capable of performing autonomous driving and the obstacle;

identifying the obstacle around the vehicle;

upon identifying a front obstacle as the obstacle to be passed, specifying a required range within which an oncoming vehicle should not be located in order for the vehicle to complete passing the specified front obstacle while maintaining the set safety distance to the oncoming vehicle; and automatically performing passing the front obstacle when the oncoming vehicle does not located within the specified required range.

The invention claimed is:

1. An in-vehicle device, comprising:
   at least one processor;
   a non-transitory computer-readable storage medium; and
   a set of computer-executable instructions stored on the non-transitory computer-readable storage medium that cause the at least one processor to:
   plan, as a travel plan, positioning of a vehicle during traveling according to a driving policy;
   evaluate the travel plan based on driving rule determination information in conformity with a traffic rule;
   determine whether to permit the travel plan based on an evaluation result; and
   perform autonomous driving according to the travel plan based on the travel plan being permitted, wherein
   the positioning of the vehicle is planned according to the driving policy that is set to reduce a frequency of occurrence of a blind area entry situation under which a different vehicle other than the vehicle causes a moving object other than the different vehicle to be positioned within a blind area of a detection range for a periphery monitoring sensor that is configured to monitor surroundings of the vehicle.

2. The in-vehicle device according to claim 1, wherein
   the positioning of the vehicle is planned according to the driving policy that is set to reduce the frequency of occurrence of the blind area entry situation by offsetting a travel position of the vehicle from a center of a cruising lane toward a boundary of the cruising lane to the extent that a lateral safety distance, which is a minimum safety distance of the vehicle to an obstacle in a lateral direction to avoid an approach to the obstacle, can be maintained.

3. The in-vehicle device according to claim 2, wherein
   when the vehicle travels in a curved road, the positioning of the vehicle is planned according to the driving policy that is set to reduce the frequency of occurrence of the blind area entry situation by offsetting the travel position of the vehicle from the center of the cruising lane toward a radially inner circumference side of the curved road to the extent that the lateral safety distance can be maintained.

4. The in-vehicle device according to claim 1, wherein
   the positioning of the vehicle is planned according to the driving policy that is set to reduce the frequency of occurrence of the blind area entry situation by shifting a position of the vehicle in a longitudinal direction along the cruising lane with respect to the different vehicle that is traveling in an adjacent lane of the cruising lane of the vehicle.

5. The in-vehicle device according to claim 1, wherein
   the positioning of the vehicle is planned according to the driving policy that is set to reduce the frequency of occurrence of the blind area entry situation by maintaining a non-obstructed range, which is a range in a lateral detection range for the periphery monitoring sensor of the vehicle and which is not obstructed by the different vehicle traveling in the adjacent lane of the cruising lane of the vehicle, to be equal to or larger than a predetermined range.

6. The in-vehicle device according to claim 5, wherein
   the predetermined range is adjusted according to a planned operational behavior of the vehicle.

7. The in-vehicle device according to claim 1, wherein
   the positioning of the vehicle is planned according to the driving policy that is set to reduce the frequency of occurrence of the blind area entry situation by preventing a relative position of the vehicle to the different vehicle from keeping for a specified time period or longer.

8. The in-vehicle device according to claim 1, wherein
   the vehicle is a subject vehicle,
   a target different vehicle is a different vehicle other than the subject vehicle,
   the set of computer-executable instructions further cause the at least one processor to:
   identify a blind area range within a detection range for a periphery monitoring sensor mounted in the target different vehicle, the blind area range being caused by a vehicle other than the target different vehicle and the subject vehicle, and
   plan positioning of the subject vehicle according to the driving policy that is set to reduce the frequency of occurrence of the blind area entry situation by reducing a frequency of the subject vehicle being positioned within the blind area range.

9. The in-vehicle device according to claim 1,
   the set of computer-executable instructions further cause the at least one processor to:
   set a minimum safety distance to an obstacle to avoid an approach between the vehicle and the obstacle;
   identify a size of a leading vehicle in front of the vehicle; and
   adjust the safety distance in a longitudinal direction of the vehicle according to the size of the leading vehicle so that an angular range is equal to or smaller than a predetermined range, wherein the angular range is included in a detection range for a periphery monitoring sensor that is configured to detect an obstacle around the vehicle and the leading vehicle is expected to be encompassed within the angular range, wherein the driving policy is to adjust the safety distance ahead of the vehicle according to the size of the leading vehicle so that an angular range estimated to encompass the leading vehicle is smaller than or equal to a predetermined range, the angular range being included in a detection range of a periphery monitoring sensor to detect obstacles around the vehicle, and the positioning of the vehicle is planned according to the driving policy that is set to reduce the frequency of occurrence of the blind area entry situation by adjusting the safety distance.

10. The in-vehicle device according to claim 9, wherein the predetermined range is set so that a frequency of the leading vehicle being encompassed within a detection range of the periphery monitoring sensor is equal to or greater than a threshold during manual operation of the vehicle by a model driver.

11. The in-vehicle device according to claim 9, wherein the set of computer-executable instructions further cause the at least one processor to:

identify whether a cruising path of the vehicle is either an uphill slope or a downhill slope, wherein the safety distance that is set as the size of the leading vehicle increases regardless of whether the cruising path is determined to be either the uphill slope or the downhill slope.

12. The in-vehicle device according to claim 9, wherein when the vehicle and the leading vehicle has a distance therebetween to cause the angular range to be equal to or smaller than the predetermined range and when the distance is greater than the safety distance, the safety distance is increased as the size of the leading vehicle increases.

13. The in-vehicle device according to claim 12, wherein when the vehicle and the leading vehicle has a distance therebetween to cause the angular range to be equal to or smaller than the predetermined range and when the distance is equal to or less than the safety distance the safety distance is not adjusted according to the size of the leading vehicle.

14. The in-vehicle device according to claim 9, wherein the vehicle is an autonomous driving vehicle, the set of computer-executable instructions further cause the at least one processor to:

automatically perform a swerving action to avoid an approach between the vehicle and the obstacle when a distance between the vehicle and the obstacle is smaller than the safety distance, and when the safety distance, is adjusted the swerving action is automatically performed if a distance between the vehicle and the obstacle is smaller than the adjusted safety distance.

15. The in-vehicle device according to claim 9, wherein the safety distance is a distance that is calculated based on a predetermined mathematical formula model and serves as a basis for evaluating safety between the vehicle and the obstacle.

16. An in-vehicle device, comprising:
at least one processor;
a non-transitory computer-readable storage medium; and
a set of computer-executable instructions stored on the non-transitory computer-readable storage medium that cause the at least one processor to:
set a minimum safety distance between a vehicle and an obstacle to avoid an approach between the vehicle and the obstacle;
identify a size of a leading vehicle in front of the vehicle; and
adjust the safety distance in a longitudinal direction of the vehicle according to the size of the leading vehicle so that an angular range within which the leading vehicle is expected to be encompassed is equal to or smaller than a predetermined range, the angular range being included in a detection range of a periphery monitoring sensor that is configured to detect an obstacle around the vehicle.

17. An in-vehicle device, comprising:
at least one processor;
a non-transitory computer-readable storage medium; and
a set of computer-executable instructions stored on the non-transitory computer-readable storage medium that cause the at least one processor to:
set a minimum safety distance to an obstacle to avoid an approach between a vehicle and the obstacle;
identify a size of a surrounding vehicle around the vehicle; and
adjust the safety distance in a longitudinal direction or a lateral direction of the vehicle according to the size of the surrounding vehicle so that the vehicle does not enter a range expected to be occupied by the surrounding vehicle during turning.

18. The in-vehicle device according to claim 17, wherein the safety distance in the lateral direction of the vehicle is adjusted according to the size of the surrounding vehicle in a lane adjacent to the vehicle so that the vehicle does not enter the range expected to be occupied by the surrounding vehicle during turning.

19. A driving assist method, comprising:
planning, as a travel plan, at least positioning of a subject vehicle during traveling according to a driving policy that is set to reduce a frequency of occurrence of a blind area entry situation under which a different vehicle other than the subject vehicle causes a moving object other than the different vehicle to be positioned within a blind area of a detection range for a periphery monitoring sensor that is configured to monitor surroundings of the subject vehicle;
evaluating the travel plan based on driving rule determination information in conformity with a traffic rule;
determining whether to allow the travel plan based on an evaluation result; and
performing autonomous driving according to the travel plan based on the travel plan being allowed.

* * * * *